(12) United States Patent
Guo et al.

(10) Patent No.: US 12,707,471 B2
(45) Date of Patent: Aug. 11, 2026

(54) METHOD AND APPARATUS FOR BEAM MANAGEMENT FOR MULTI-STREAM TRANSMISSION

(71) Applicant: Samsung Electronics Co., Ltd., Suwon-si (KR)

(72) Inventors: Li Guo, Allen, TX (US); Md Saifur Rahman, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 710 days.

(21) Appl. No.: 18/165,221

(22) Filed: Feb. 6, 2023

(65) Prior Publication Data

US 2023/0180259 A1 Jun. 8, 2023

Related U.S. Application Data

(63) Continuation of application No. 16/947,986, filed on Aug. 26, 2020, now Pat. No. 11,582,734, which is a (Continued)

(51) Int. Cl.

| | |
|---|---|
| ***H04W 72/23*** | (2023.01) |
| ***H04L 5/00*** | (2006.01) |
| ***H04W 72/044*** | (2023.01) |

(52) U.S. Cl.

CPC ........... *H04W 72/23* (2023.01); *H04L 5/0051* (2013.01); *H04W 72/046* (2013.01)

(58) Field of Classification Search

None

See application file for complete search history.

(56) References Cited

U.S. PATENT DOCUMENTS

| | | | |
|---|---|---|---|
| 10,193,677 | B2 | 1/2019 | Seo |
| 2010/0054358 | A1 | 3/2010 | Ko et al. |

(Continued)

FOREIGN PATENT DOCUMENTS

| | | | |
|---|---|---|---|
| CN | 102165714 | A | 8/2011 |
| CN | 104685802 | A | 6/2015 |
| WO | 2016159673 | A1 | 10/2016 |

OTHER PUBLICATIONS

"3rd Generation Partnership Project; Technical Specification Group Radio Access Network; Evolved Universal Terrestrial Radio Access (E-UTRA); Physical channels and modulation (Release 14)", 3GPP TS 36.211 V14.0.0, Sep. 2016, 170 pages.

(Continued)

*Primary Examiner* — Clemence S Han

(57) ABSTRACT

Methods and apparatuses for measurement information reporting. A method of a user equipment (UE) includes method receiving a configuration for a set of resources comprising non-zero-power channel state information reference signal (NZP CSI-RS) resources or synchronization signal and physical broadcast channel (SS/PBCH) block resources and receiving NZP CSI-RS in the NZP CSI-RS resources or SS/PBCH blocks in the SS/PBCH block resources from the set of resources. The method includes measuring signal-to-interference and noise ratio (SINR) values based on the NZP CSI-RS or the SS/PBCH blocks; and transmitting, for a subset of resources from the set of resources, a largest of the SINR values, differential SINR values relative to the largest SINR value, and NZP CSI-RS resource indexes (CRIs) or SS/PBCH block indexes for at least some of the NZP CSI-RS resources or the SS/PBCH blocks resources from the subset of resources.

14 Claims, 26 Drawing Sheets

Related U.S. Application Data continuation of application No. 16/360,940, filed on Mar. 21, 2019, now abandoned.

(60) Provisional application No. 62/730,867, filed on Sep. 13, 2018, provisional application No. 62/715,029, filed on Aug. 6, 2018, provisional application No. 62/687,567, filed on Jun. 20, 2018, provisional application No. 62/686,388, filed on Jun. 18, 2018, provisional application No. 62/681,780, filed on Jun. 7, 2018, provisional application No. 62/670,281, filed on May 11, 2018, provisional application No. 62/649,186, filed on Mar. 28, 2018, provisional application No. 62/647,258, filed on Mar. 23, 2018.

(56) References Cited

U.S. PATENT DOCUMENTS

| | | | | |
|---|---|---|---|---|
| 2015/0223208 | A1 | 8/2015 | Park et al. | |
| 2018/0302889 | A1 | 10/2018 | Guo | |
| 2018/0368142 | A1 | 12/2018 | Liou | |
| 2019/0058517 | A1 | 2/2019 | Kang | |
| 2019/0081678 | A1 | 3/2019 | Park | |
| 2019/0173740 | A1 | 6/2019 | Zhang | |
| 2019/0229792 | A1* | 7/2019 | John Wilson | H04W 72/23 |
| 2019/0230545 | A1* | 7/2019 | Liou | H04W 24/10 |
| 2019/0253904 | A1 | 8/2019 | Tsai | |
| 2019/0254120 | A1 | 8/2019 | Zhang | |
| 2019/0260445 | A1* | 8/2019 | John Wilson | H04W 72/56 |
| 2019/0260524 | A1 | 8/2019 | Nam | |
| 2019/0261281 | A1* | 8/2019 | Jung | H04W 52/346 |
| 2019/0268053 | A1 | 8/2019 | John Wilson | |
| 2020/0288479 | A1* | 9/2020 | Xi | H04L 5/0092 |
| 2020/0322013 | A1 | 10/2020 | Gao | |
| 2020/0359459 | A1* | 11/2020 | Kakishima | H04L 5/0094 |
| 2020/0374960 | A1* | 11/2020 | Deenoo | H04B 7/088 |
| 2020/0389883 | A1* | 12/2020 | Faxér | H04L 5/0053 |
| 2020/0404559 | A1 | 12/2020 | Koskela | |
| 2020/0404690 | A1* | 12/2020 | Lee | H04W 72/0453 |

OTHER PUBLICATIONS

"3rd Generation Partnership Project; Technical Specification Group Radio Access Network; Evolved Universal Terrestrial Radio Access (E-UTRA); Multiplexing and channel coding (Release 14)", 3GPP TS 36.212 V14.0.0, Sep. 2016, 148 pages.
"3rd Generation Partnership Project; Technical Specification Group Radio Access Network; Evolved Universal Terrestrial Radio Access (E-UTRA); Physical layer procedures (Release 14)", 3GPP TS 36.213 V14.0.0, Sep. 2016, 406 pages.
"3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.0.0, Sep. 2016, 96 pages.
"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.0.0, Sep. 2016, 644 pages.
"3rd Generation Partnership Project; Technical Specification Group Radio Access Network; NR; Physical channels and modulation (Release 15)", 3GPP TS 38.211 V15.0.0, Dec. 2017, 73 pages.
"3rd Generation Partnership Project; Technical Specification Group Radio Access Network; NR; Multiplexing and channel coding (Release 15)", 3GPP TS 38.212 V15.0.0, Dec. 2017, 82 pages.
"3rd Generation Partnership Project; Technical Specification Group Radio Access Network; NR; Physical layer procedures (Release 15)", 3GPP TS 38.213 V15.0.0, Dec. 2017, 56 pages.
"3rd Generation Partnership Project; Technical Specification Group Radio Access Network; NR; Physical layer procedures for data (Release 15)", 3GPP TS 38.214 V15.0.0, Dec. 2017, 71 pages.
"3rd Generation Partnership Project; Technical Specification Group Radio Access Network; NR; Medium Access Control (MAC) protocol specification (Release 15)", 3GPP TS 38.321 V15.0.0, Dec. 2017, 55 pages.
"3rd Generation Partnership Project; Technical Specification Group Radio Access Network; NR; Radio Resource Control (RRC) protocol specification (Release 15)", 3GPP TS 38.331 V15.0.0, Dec. 2017, 188 pages.
ISA/KR, International Search Report and Written Opinion of the International Searching Authority, International Application No. PCT/KR2019/003454, dated Jul. 3, 2019, 8 pages.
Ericsson, "On beam indication, measurement, and reporting," R1-1718433, 3GPP TSG-RAN WG1 #90bis, Prague, Czech Republic, Oct. 9-13, 2017, 9 pages.
Mediatek Inc., "Remaining issues on TRS," R1-1801670, 3GPP TSG-RAN WG1 Meeting #92, Athens, Greece, Feb. 26-Mar. 2, 2018, 6 pages.
Samsung, "Remaining details on QCL," R1-1720315, 3GPP TSG RAN WG1#91, Reno, USA, Nov. 27-Dec. 1, 2017, 11 pages.
ZTE, Sanechips, "Discussion on beam management," R1-1719533, 3GPP TSG RAN WG1 Meeting #91, Reno, USA, Nov. 27-Dec. 1, 2017, 11 pages.
Samsung, "Terminology mismatch for CSI framework", 3GPP TSG RAN WG1 NR-AH1, Jan. 22-26, 2018, R1-1800426, 5 pages.
Ericsson, "Basic beam recovery", 3GPP TSG RAN WG1 Meeting 90bis, Oct. 9-13, 2017, R1-1718434, 8 pages.
Supplementary European Search Report dated Mar. 4, 2021 in connection with European Patent Application No. EP 19 77 1305, 10 pages.
European Patent Office, Communication pursuant to Article 94(3) EPC dated Jul. 8, 2022 regarding Application No. 19771305.0, 9 pages.
Qualcomm, "Beam management offline summary", RAN1 #89, R1-1711965, May 2017, 11 pages.
Ericsson, "On beam indication, measurement, and reporting", 3GPP TSG-RAN WG1 NR Ad Hoc #3, R1-1716350, Sep. 2017, 13 pages.
Intel Corporation et al., "New WID on Enhancements to MIMO operation for NR", 3GPP TSG RAN Meeting #78, RP-172745, Dec. 2017, 5 pages.
China National Intellectual Property Administration, First Office Action issued Sep. 8, 2023 regarding Application No. 201980021566.3, 14 pages.
European Patent Office, Communication pursuant to Article 94(3) EPC issued Aug. 2, 2024 regarding Application No. 23208777.5, 7 pages.
Extended European Search Report issued Mar. 6, 2024 regarding Application No. 23208777.5, 11 pages.
ZTE et al., "Summary of remaining issues on CSI measurement", 3GPP TSG RAN WG1 Meeting AH1801, R1-1801183, Jan. 2018, 23 pages.
Huawei et al., "Discussion on CSI configuration framework", 3GPP TSG RAN WG1 Meeting #92, R1-1802076, Feb. 2018, 9 pages.

* cited by examiner 800
810
Received
820
Filter
FFT 830
RE mapping 840
IDFT 850
Control of Reception BW
845
860
Demodulator
870
Decoder
880
Data Bits

1450

Slot n 1411 1413 1415

1412 1414

1800

1850

METHOD AND APPARATUS FOR BEAM MANAGEMENT FOR MULTI-STREAM TRANSMISSION

CROSS-REFERENCE TO RELATED APPLICATION(S) AND CLAIM OF PRIORITY

This application is a continuation of U.S. patent application Ser. No. 16/947,986, filed on Aug. 26, 2020, which is a continuation of U.S. patent application Ser. No. 16/360,940 filed on Mar. 21, 2019, which claims priority to U.S. Provisional Patent Application No. 62/647,258, filed on Mar. 23, 2018; U.S. Provisional Patent Application No. 62/649,186, filed on Mar. 28, 2018; U.S. Provisional Patent Application No. 62/670,281, filed on May 11, 2018; U.S. Provisional Patent Application No. 62/681,780 filed on Jun. 7, 2018; U.S. Provisional Patent Application No. 62/686,388, filed on Jun. 18, 2018; U.S. Provisional Patent Application No. 62/687,567, filed on Jun. 20, 2018; U.S. Provisional Patent Application No. 62/715,029, filed on Aug. 6, 2018; and U.S. Provisional Patent Application No. 62/730,867 filed on Sep. 13, 2018. The content of the above-identified patent documents is incorporated herein by reference.

TECHNICAL FIELD

The present disclosure relates generally to beam management. Specifically, the present disclosure relates to beam management for multi-stream transmission in an advanced wireless communication system.

BACKGROUND

In a wireless communication network, a network access and a radio resource management (RRM) are enabled by physical layer synchronization signals and higher (MAC) layer procedures. In particular, a user equipment (UE) attempts to detect the presence of synchronization signals along with at least one cell identification (ID) for initial access. Once the UE is in the network and associated with a serving cell, the UE monitors several neighboring cells by attempting to detect their synchronization signals and/or measuring the associated cell-specific reference signals (RSs). For next generation cellular systems such as third generation partnership-new radio access or interface (3GPP-NR), efficient and unified radio resource acquisition or tracking mechanism which works for various use cases such as enhanced mobile broadband (eMBB), ultra-reliable low latency (URLLC), massive machine type communication (mMTC), each corresponding to a different coverage requirement and frequency bands with different propagation losses is desirable.

SUMMARY

Embodiments of the present disclosure provide methods and apparatuses for beam management for multi-stream transmission in an advanced wireless communication system.

In one embodiment, a user equipment (UE), a user equipment (UE) for a beam indication in a wireless communication system is provided. The UE comprises a transceiver configured to receive, from multiple transmission reception points (TRPs), downlink data transmissions, and receive downlink control information (DCI) that includes a beam indication configuration comprising a one bit-field that indicates multiple transmission configuration indicator (TCI) states, wherein the multiple TCI states indicate a quasi-colocation (QCL) configuration for downlink data channels received from the TRPs. The UE further comprises a processor operably connected to the transceiver, the processor configured to determine indices of the multiple TCI states based on the received one bit-field included in the DCI, and derive an association between the multiple TCI states indicated by the one bit-field and a downlink data transmission of each of the TRPs. The UE further comprises the transceiver configured to receive, the downlink data transmission from each of the TRPs with the QCL configuration indicated by the derived association.

In another embodiment, a transmission reception point (TRP), for a beam indication in a wireless communication system is provided. The TRP comprises a processor configured to determine indices of multiple transmission configuration indicator (TCI) states based on a one bit-field to be transmitted to a user equipment (UE), wherein the one bit-field is included in downlink control information (DCI) and a transceiver operably connected to the processor, the transceiver is configured to transmit, to the UE, a downlink data transmission, transmit the DCI that includes a beam indication configuration comprising the one bit-field that indicates the multiple TCI states, wherein the multiple TCI states indicate a quasi-colocation (QCL) configuration for a downlink data channel transmitted to the UE, and transmit, to the UE, the downlink data transmission with the QCL configuration, wherein an association between the multiple TCI states indicated by the one bit-field and the downlink data transmission from the TRP is derived by the UE.

In yet another embodiment, a method of a user equipment (UE) for a beam indication in a wireless communication system is provided. The method comprises receiving, from multiple transmission reception points (TRPs), downlink data transmissions, receiving downlink control information (DCI) that includes a beam indication configuration comprising a one bit-field that indicates multiple transmission configuration indicator (TCI) states, wherein the multiple TCI states indicate a quasi-colocation (QCL) configuration for downlink data channels received from the TRPs, determining indices of the multiple TCI states based on the received one bit-field included in the DCI, deriving an association between the multiple TCI states indicated by the one bit-field and a downlink data transmission of each of the TRPs, and receiving, the downlink data transmission from each of the TRPs with the QCL configuration indicated by the derived association.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
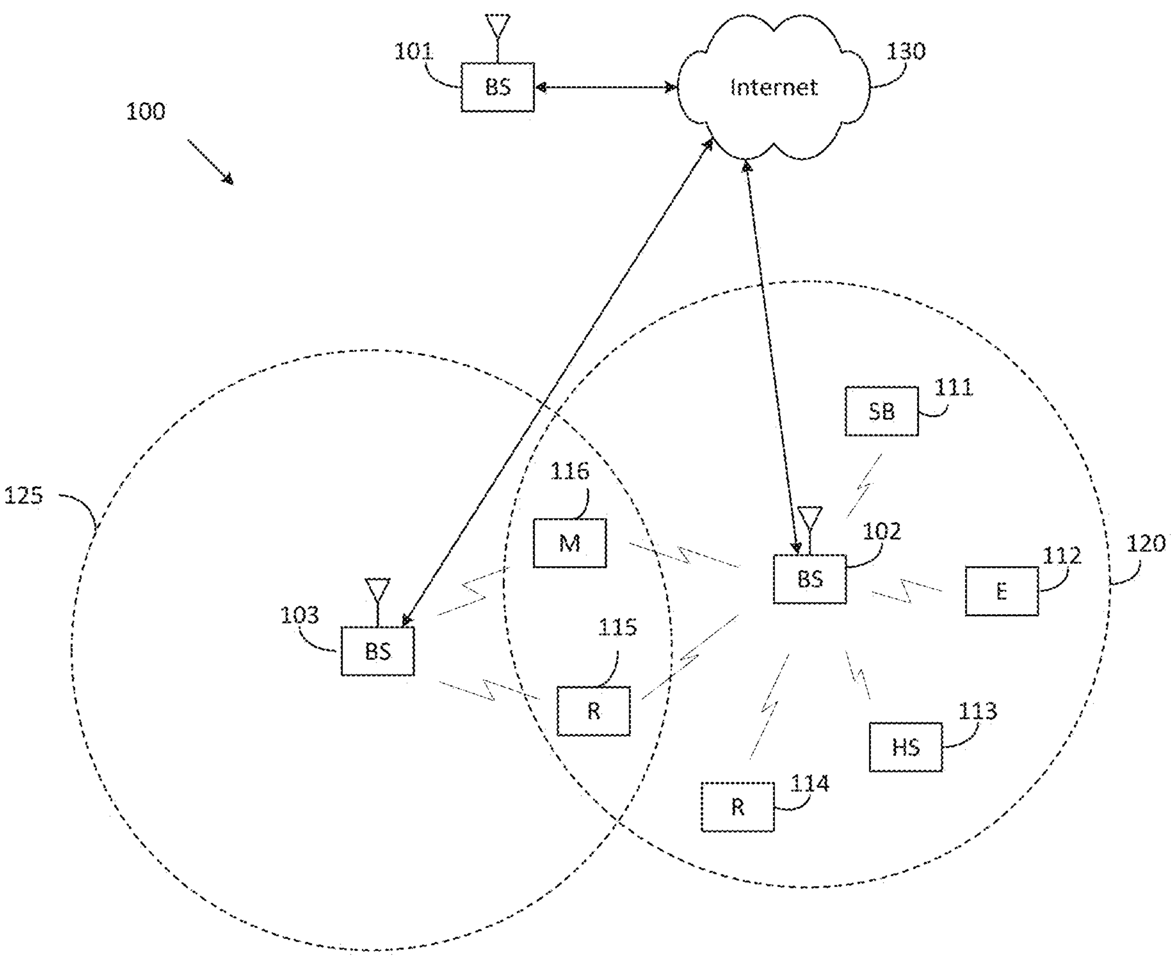
FIG. 1 illustrates an example wireless network according to embodiments of the present disclosure.

FIG. 1 through FIG. 26, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v14.0.0, "E-UTRA, Physical channels and modulation;" 3GPP TS 36.212 v14.0.0, "E-UTRA, Multiplexing and Channel coding;" 3GPP TS 36.213 v14.0.0, "E-UTRA, Physical Layer Procedures;" 3GPP TS 36.321 v14.0.0, "E-UTRA, Medium Access Control (MAC) protocol specification;" 3GPP TS 36.331 v14.0.0, "E-UTRA, Radio Resource Control (RRC) Protocol Specification;" 3GPP TS 38.211 v15.0.0, "NR, Physical channels and modulation;" 3GPP TS 38.212 v15.0.0, "NR, Multiplexing and Channel coding;" 3GPP TS 38.213 v15.0.0, "NR, Physical Layer Procedures for Control;" 3GPP TS 38.214 v15.0.0, "NR, Physical Layer Procedures For Data;" 3GPP TS 38.321 v15.0.0, "NR, Medium Access Control (MAC) protocol specification;" and 3GPP TS 38.331 v15.0.0, "NR, Radio Resource Control (RRC) Protocol Specification."

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
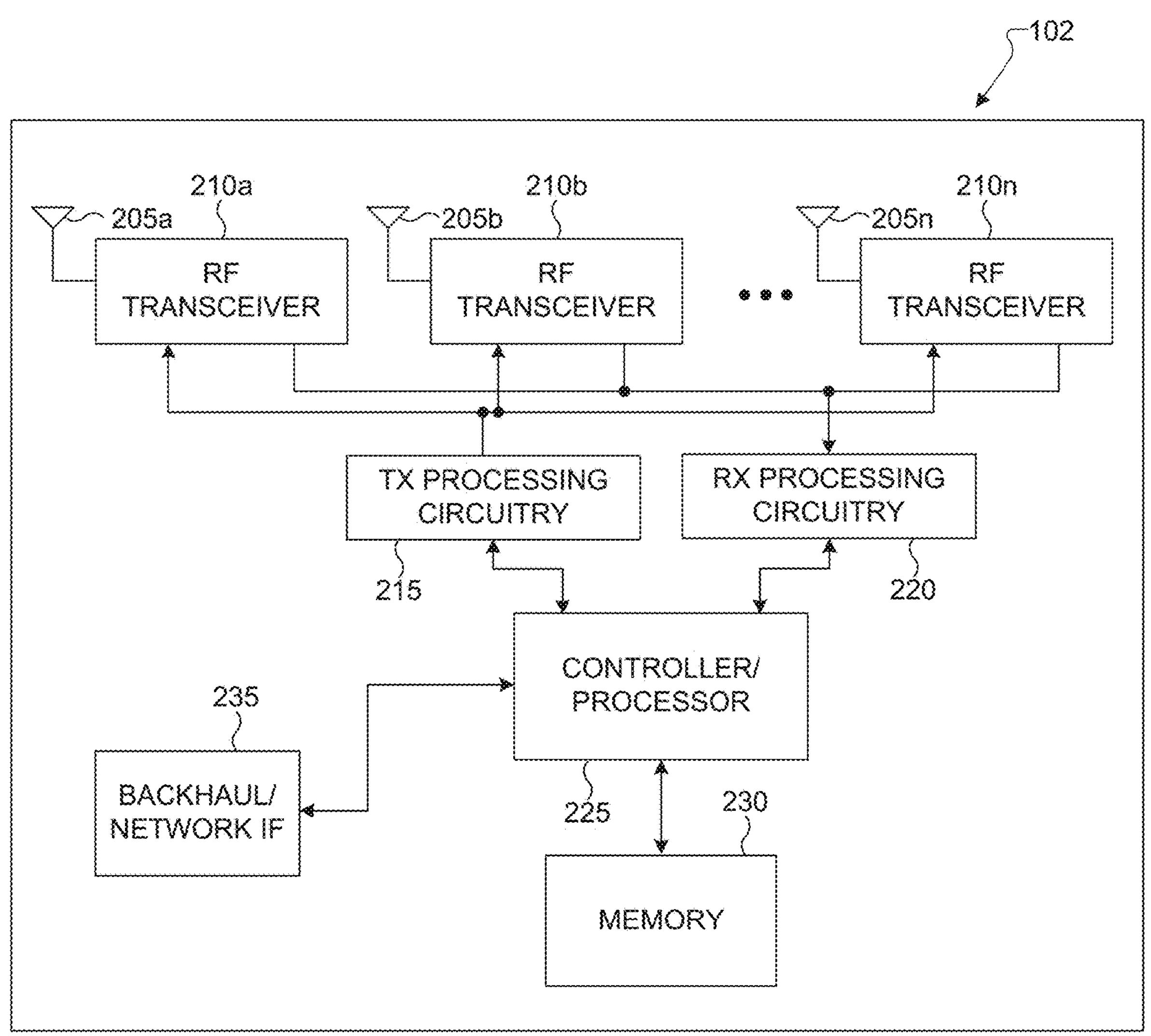
FIG. 2 illustrates an example gNB according to embodiments of the present disclosure.
Figure 3:
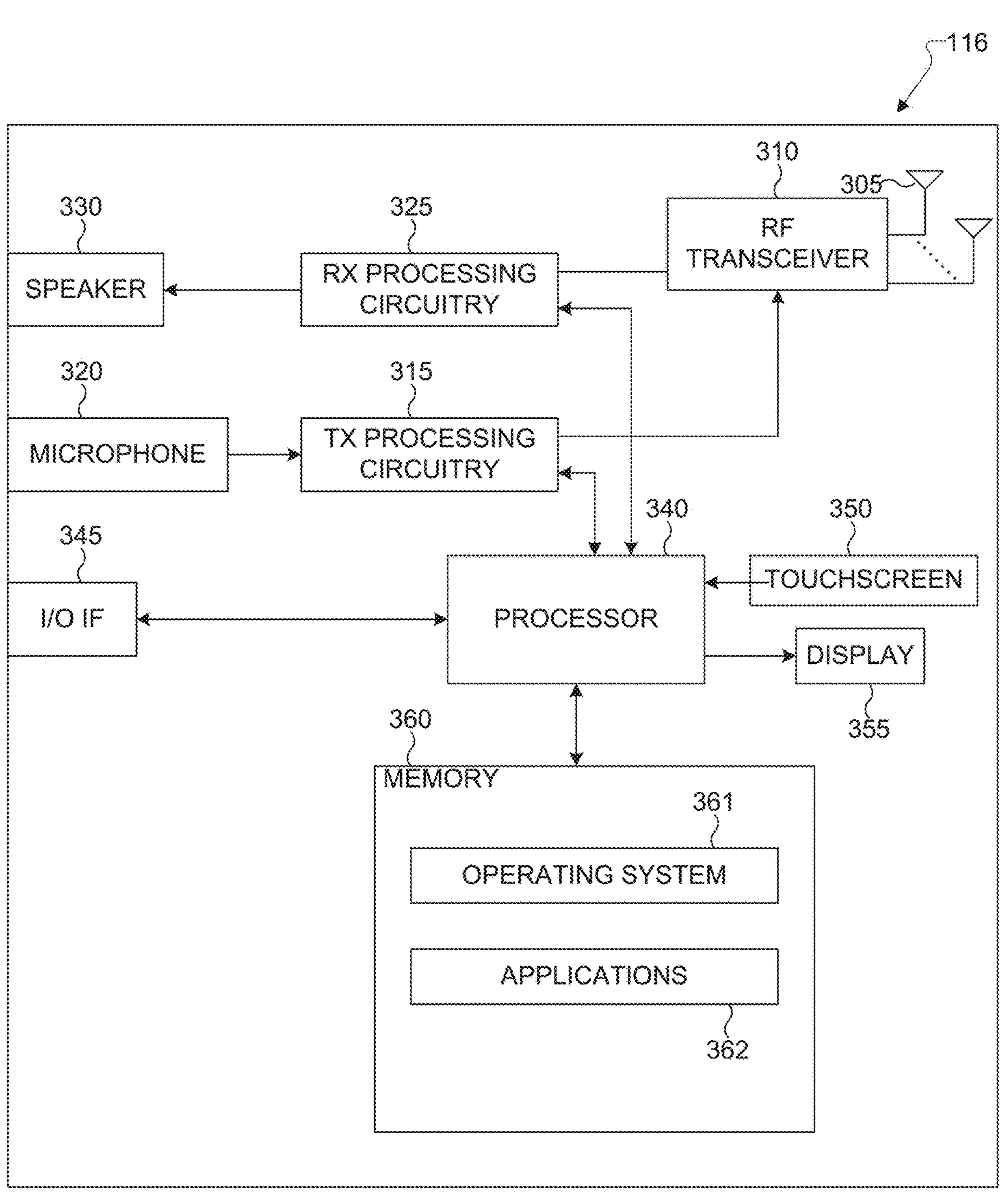
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an gNB 101, an gNB 102, and an gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for efficient beam management in an advanced wireless communication system. In certain embodiments, and one or more of the gNBs 101-103 includes circuitry, programing, or a combination thereof, for CSI acquisition based on space-frequency compression in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of an gNB.

As shown in FIG. 2, the gNB 102 includes multiple antennas 205*a*-205*n*, multiple RF transceivers 210*a*-210*n*, transmit (TX) processing circuitry 215, and receive (RX) processing circuitry 220. The gNB 102 also includes a controller/processor 225, a memory 230, and a backhaul or network interface 235.

The RF transceivers 210*a*-210*n* receive, from the antennas 205*a*-205*n*, incoming RF signals, such as signals transmitted by UEs in the network 100. The RF transceivers 210*a*-210*n* down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210*a*-210*n* receive the outgoing processed baseband or IF signals from the TX processing circuitry 215 and up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of forward channel signals and the transmission of reverse channel signals by the RF transceivers 210*a*-210*n*, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205*a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
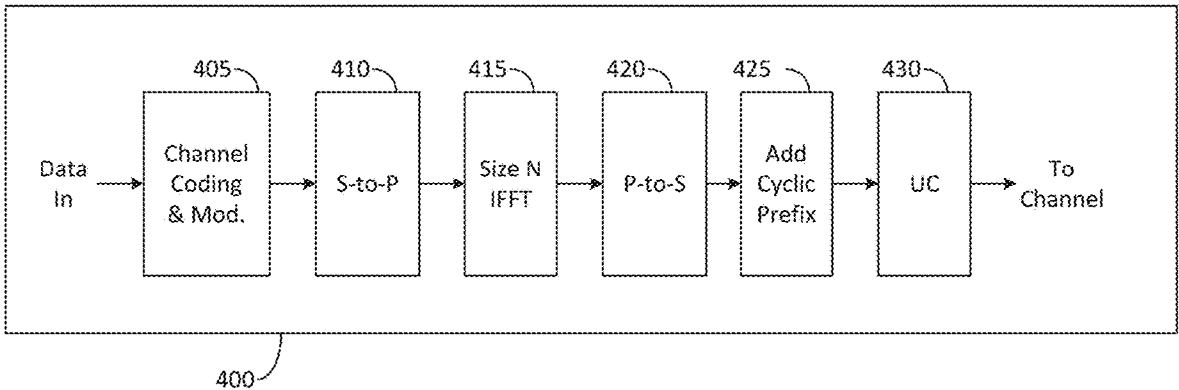
FIG. 4A illustrates a high-level diagram of an orthogonal frequency division multiple access transmit path according to embodiments of the present disclosure.
Figure 4B:
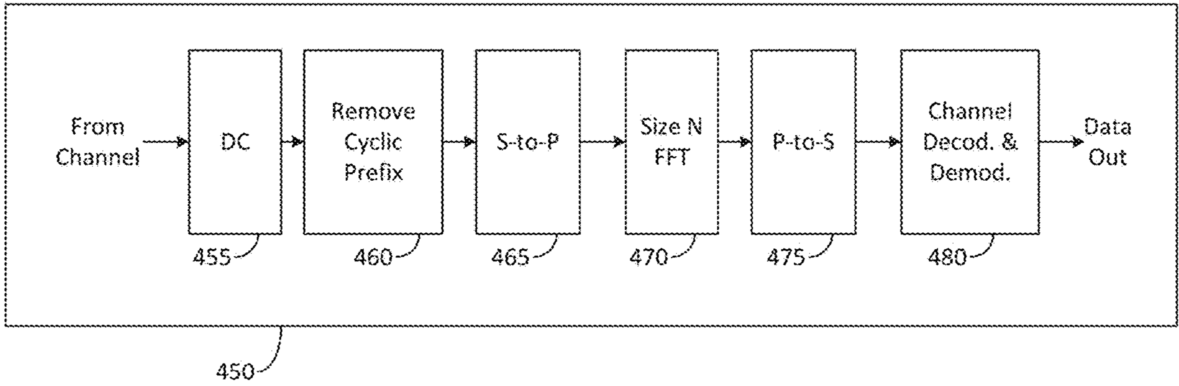
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g. user equipment 116 of FIG. 1). In other examples, for uplink communication, the receive path circuitry 450 may be implemented in a base station (e.g. gNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial ck 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different Ms that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $$N_{sc}^{RB}$$

sub-carriers, or resource elements (REs), such as 12 REs. A unit of one RB over one subframe is referred to as a PRB. A UE can be allocated $M_{PDSCH}$ RBs for a total of $$M_{sc}^{PDSCH} = M_{PDSCH} \cdot N_{sc}^{RB}$$

REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $$N_{symb}^{UL}$$

symbols for transmitting data information, UCI, DMRS, or SRS. A frequency resource unit of an UL system BW is a RB. A UE is allocated $N_{RB}$ RBs for a total of $$N_{RB} \cdot N_{sc}^{RB} REs$$

for a transmission BW. For a PUCCH, $N_{RB}=1$. A last subframe symbol can be used to multiplex SRS transmissions from one or more UEs. A number of subframe symbols that are available for data/UCI/DMRS transmission is $$N_{symb} = 2 \cdot (N_{symb}^{UL} - 1) - N_{SRS}, \text{ where } N_{SRS} = 1$$

if a last subframe symbol is used to transmit SRS and $N_{SRS}=0$ otherwise.

Figures 5, 6:
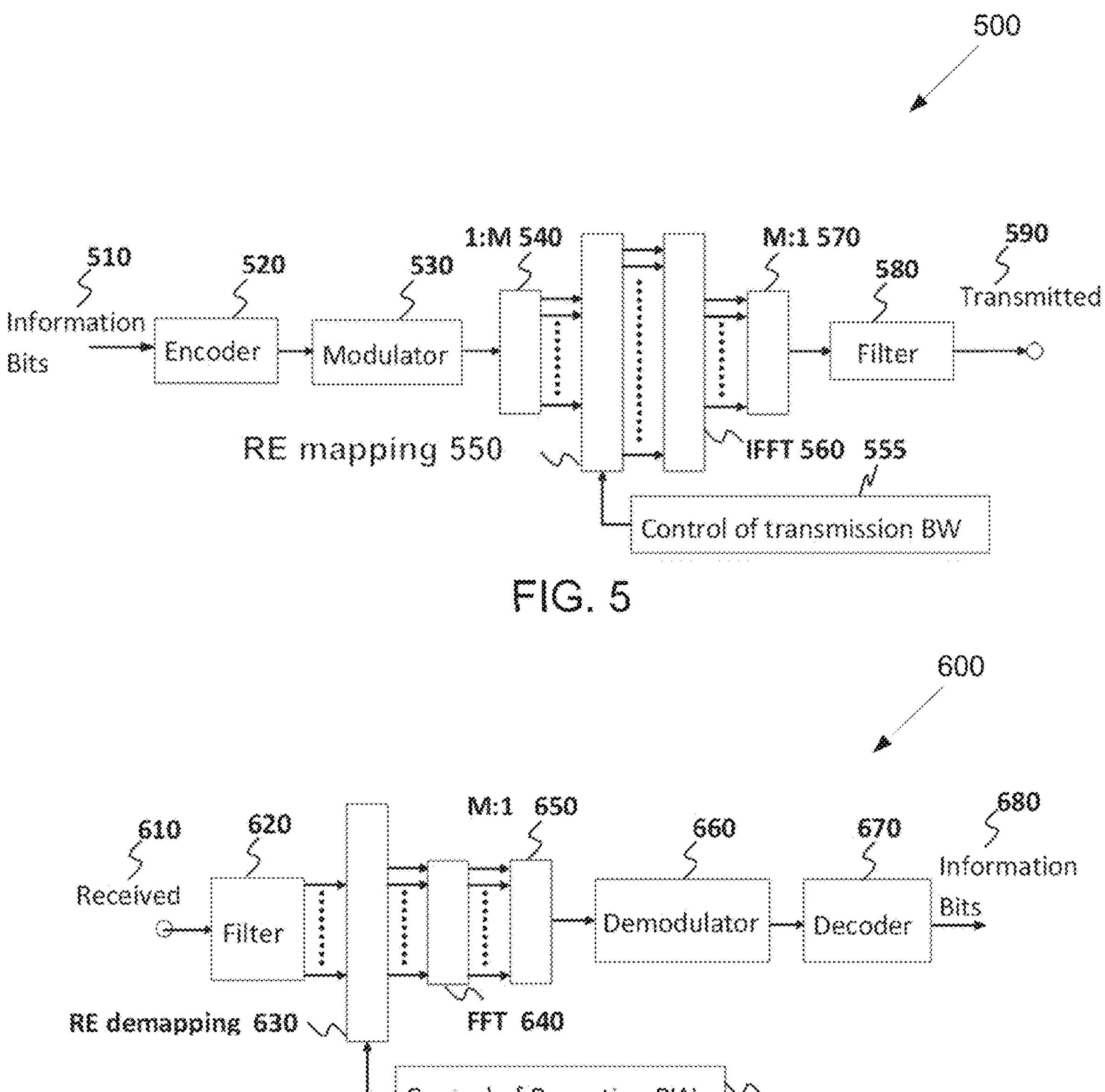
FIG. 5 illustrates a transmitter block diagram for a PDSCH in a subframe according to embodiments of the present disclosure.
FIG. 6 illustrates a receiver block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figures 7, 8:
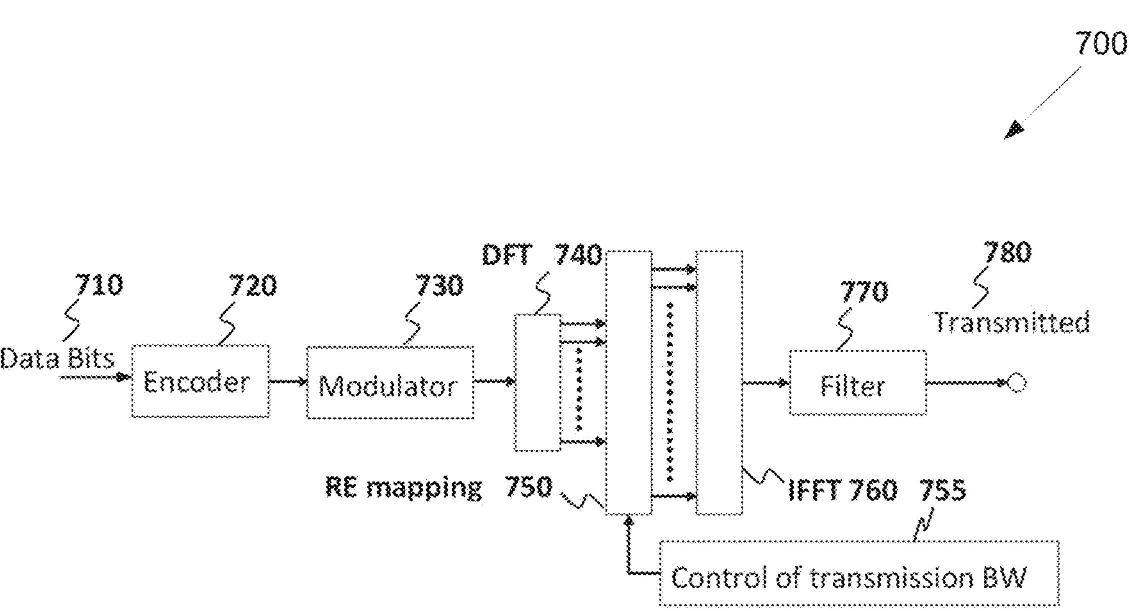
FIG. 7 illustrates a transmitter block diagram for a PUSCH in a subframe according to embodiments of the present disclosure.
FIG. 8 illustrates a receiver block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one method has been identified in 3GPP specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
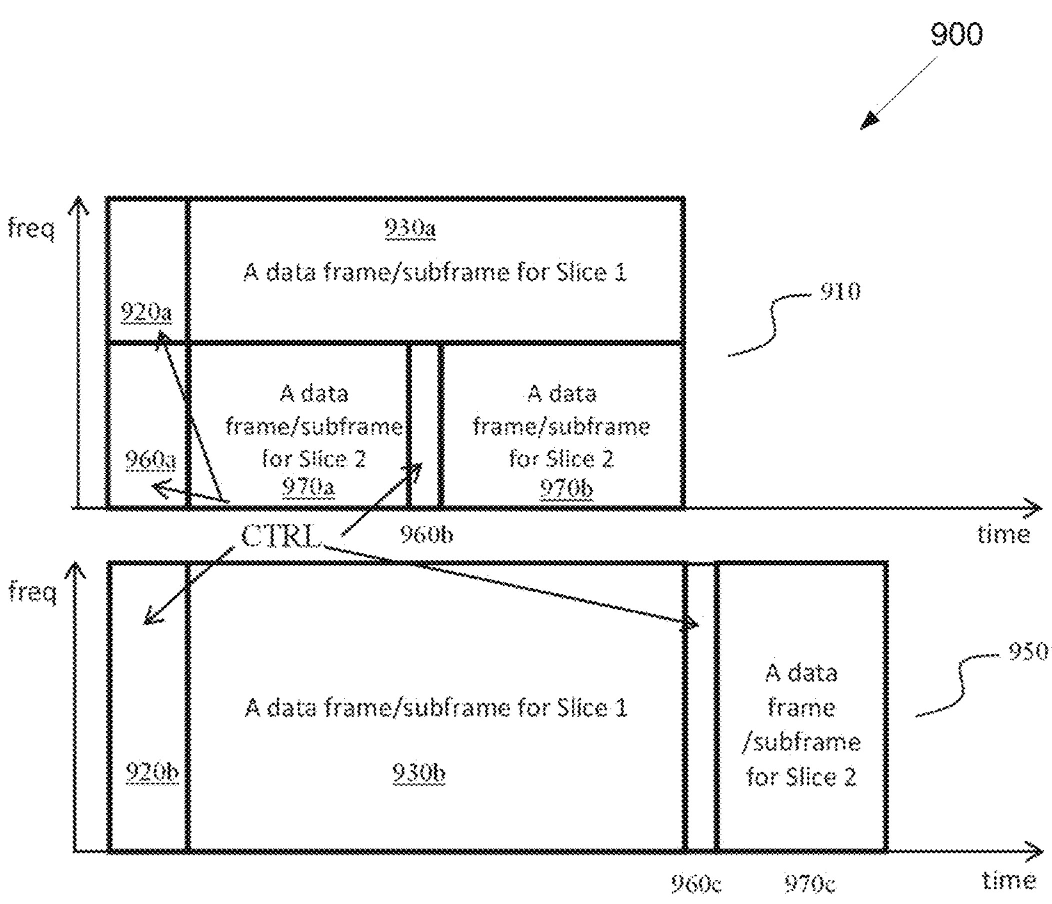
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9.

In these exemplary embodiments, a slice can be composed of one or two transmission instances where one transmission instance includes a control (CTRL) component (e.g., 920*a*, 960*a*, 960*b*, 920*b*, or 960*c*) and a data component (e.g., 930*a*, 970*a*, 970*b*, 930*b*, or 970*c*). In embodiment 910, the two slices are multiplexed in frequency domain whereas in embodiment 950, the two slices are multiplexed in time domain. These two slices can be transmitted with different sets of numerology.

3GPP specification supports up to 32 CSI-RS antenna ports which enable an gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
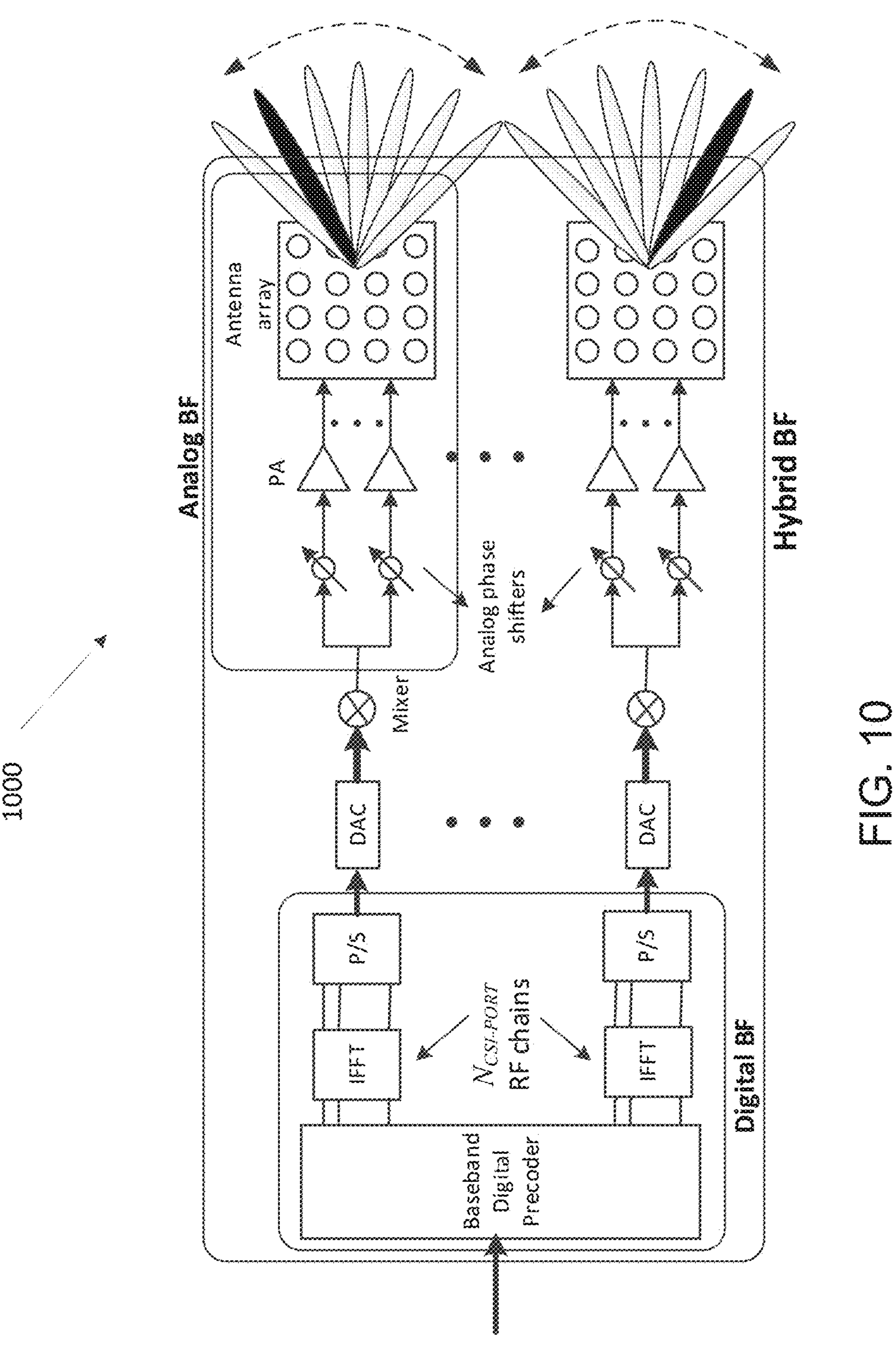
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI\text{-}PORT}$. A digital beamforming unit performs a linear combination across $N_{CSI\text{-}PORT}$ PORT analog beams to further increase precoding gain. While analog beams are wideband (hence not frequency-selective), digital precoding can be varied across frequency sub-bands or resource blocks.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

Figure 11:
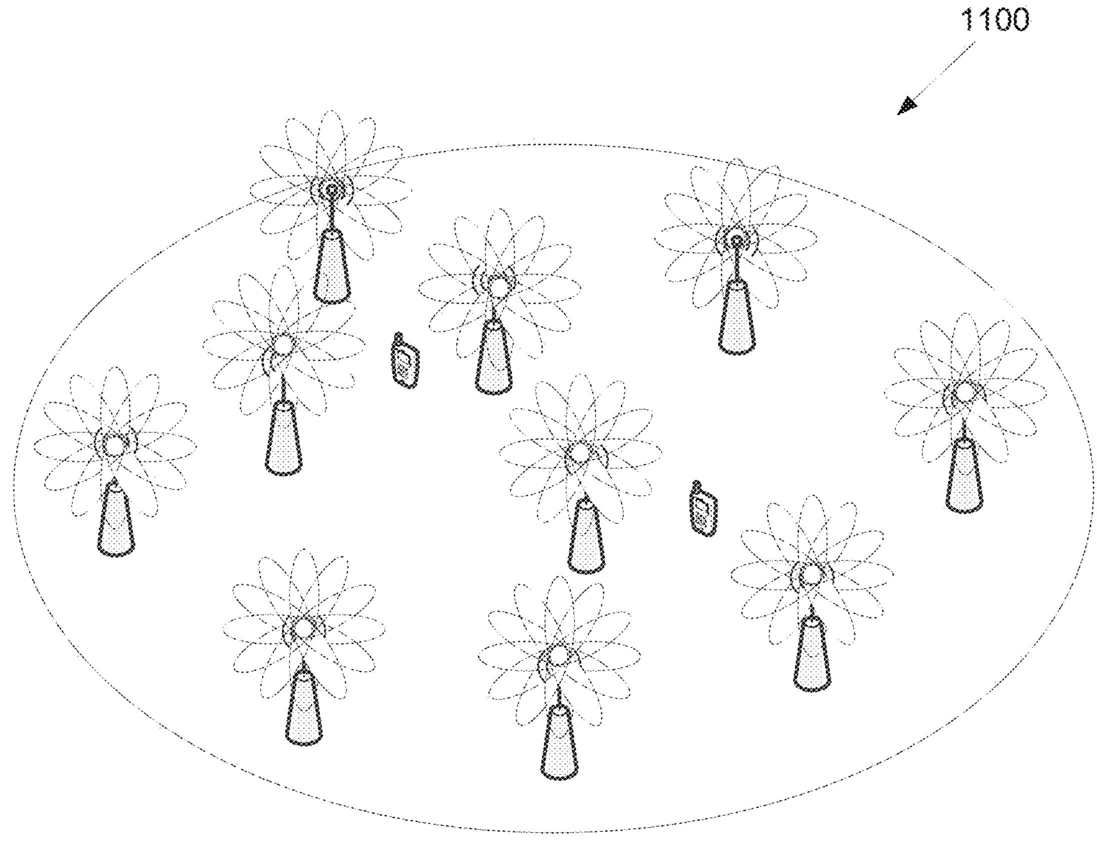
FIG. 11 illustrates an example multi-beam system according to embodiments of the present disclosure.

FIG. 11 illustrates an example multi-beam system 1100 according to embodiments of the present disclosure. The embodiment of the multi-beam system 1100 illustrated in FIG. 11 is for illustration only. FIG. 11 does not limit the scope of this disclosure to any particular implementation.

In LTE, a number of CSI reporting modes exist for both periodic (PUCCH-based) and aperiodic (PUSCH-based) CSI reporting. Each CSI reporting mode is dependent on (coupled with) many other parameters (e.g. codebook selection, transmission mode, eMIMO-Type, RS type, number of CRS or CSI-RS ports). At least two drawbacks can be perceived. First, complex "nested loops" (IF . . . ELSE . . . ) and webs of couplings/linkages exist. This complicates testing efforts. Second, forward compatibility is limited especially when new features are introduced.

While the above drawbacks apply to DL CSI measurement, the same can be said for UL CSI measurements. In LTE, UL CSI measurement framework exists in a primitive form and is not as evolved as DL counterpart. In the advent of TDD or reciprocity-based systems for next generation systems along with the likely prominence of OFDMA or OFDMA-based multiple access for UL, a same (or at least similar) CSI measurement and reporting framework applicable for both DL and UL is beneficial.

The 5G system is generally a multi-beam based system. In such a system, multiple beams are used to cover one coverage area. An example for illustration is shown in FIG. 11. As shown in FIG. 11, one gNB has one or more TRPs. Each TRP uses one or more analog beams to cover some area. To cover one UE in one particular area, the gNB use one or more analog beams to transmit and receive the signal to and from that UE. The gNB and the UE need to determine the beam(s) used for their connection. When the UE moves within one cell coverage area, the beam(s) used for this UE may be changed and switched. It was agreed in 3GPP NR RANI meetings that the operation of managing those beams are L1 and L2 operation.

In one embodiment, for downlink assignment and scheduling downlink reception, a two-level DCI (downlink control information), namely $DCI_1$ and DCI2, is configured to schedule N≥1 codewords for downlink reception. Where the first level DCI, $DCI_1$, can include a B-bit field addtionalCW to indicate the absence or presence of second level DCI, $DCI_2$. The first level DCI, $DCI_1$, can include one MCS (modulation and coding scheme) field and one HARQ-related parameter and/or RV associated with a PDSCH assignment for one codeword. When $DCI_2$ is absent, the UE may receive the downlink transmission based on assignment signaled in $DCI_1$. When $DCI_2$ is present (as signaled in DCI1), DCI2 can include MCS filed(s) and HARQ-related parameter(s) and/or RV(s) associated with PDSCH assignment for additional N−1 codewords. When $DCI_2$ is present, the UE may receive the downlink PDSCH assignment based on assignment scheduled by both $DCI_1$ and associated $DCI_2$.

The technical problems are how to indicate the QCL configuration for those codewords scheduled by two-level DCI and how to indicate the QCL configuration for PDCCH reception of these two-level DCI. The QCL configuration can include one or more of the following QCL types: Doppler shift, Doppler spread, average delay, delay spread and spatial Rx parameter. Here the spatial Rx parameter can also called Tx beam indication, beam indication, Rx beam.

In one embodiment, first level DCI, $DCI_1$, includes one $N_{Q1}$-bit field QCL1stCW to indicate the QCL configuration for the reception of the codeword scheduled by $DCI_1$. When $DCI_2$ is present, one or more additional QCL configuration fields are signaled in $DCI_2$ to indicate the QCL configuration for additional codewords. The UE can be requested to assume the DM-RS antenna ports associated with the reception of codeword indicated by $DCI_1$ are quasi co-located with the RS(s) as indicated by the QCL configuration signaled by one $N_{Q1}$-bit field QCL1stCW signaled in $DCI_1$. To receive the codeword(s) scheduled by DCI2, the UE may assume the DM-RS antenna ports associated with those codewords are quasi co-located with RS(s) as indicated by the QCL configuration signaled through the corresponding bit field in $DCI_2$.

In one embodiment, the QCL configuration for all the codewords scheduled by $DCI_1$ and $DCI_2$ are jointly signaled by one $N_Q$-bit field QCLforPDSCH in $DCI_1$. If DCI2 is absent, the UE can be requested to obtain the QCL configuration for reception of codeword scheduled by $DCI_1$ from the $N_Q$—bit field QCLforPDSCH in $DCI_1$. When $DCI_2$ is present, the UE can be requested to obtain both QCL configuration for the reception of codeword scheduled by DCI1 and the QCL configuration for the reception of additional codeword(s) scheduled by DCI2 from the $N_Q$-bit field QCLforPDSCH in $DCI_1$.

In one example, one value of $N_Q$-bit field QCLforPDSCH can correspond to N TCI states and RS(s) configured in each TCI state can provide QCL configuration. The association between one value of $N_Q$-bit field QCLforPDSCH and N TCI states can be configured or indicated by high layer signaling. Each of those N TCI state can provide QCL configuration for PDSCH reception.

In one example, when $DCI_2$ is not present, the UE can be requested to assume the DM-RS antenna ports associate with the reception of codeword scheduled by $DCI_1$ are quasi co-located with the RS indicated by the first TCI state among those N TCI states associated with the signaled value of $N_Q$-bit field QCLforPDSCH in $DCI_1$.

In one example, when $DCI_2$ is present and one additional codeword is indicated by $DCI_2$, the UE can be requested to assume the DM-RS antenna ports associate with the reception of codeword scheduled by $DCI_1$ are quasi co-located with the RS indicated by the first TCI state among those N TCI states associated with the signaled value of $N_Q$-bit field QCLforPDSCH in $DCI_1$ and the UE can be requested to assume the DM-RS antenna ports associate with the reception of additional codeword indicated by $DCI_2$ are quasi co-located with the RS indicated by the second TCI state among those N TCI states associated with the signaled value of $N_Q$-bit field QCLforPDSCH in $DCI_1$.

In one example, when DCI2 is present and two additional codewords is indicated by DCI2, the UE can be requested to assume the DM-RS antenna ports associate with the reception of codeword scheduled by DCI1 are quasi co-located with the RS indicated by the first TCI state among those N TCI states associated with the signaled value of $N_Q$-bit field QCLforPDSCH in $DCI_1$ and the UE can be requested to assume the DM-RS antenna ports associate with the reception of the first additional codeword indicated by DCI2 are quasi co-located with the RS indicated by the third TCI state among those N TCI states associated with the signaled value of $N_Q$-bit field QCLforPDSCH in $DCI_1$.

In one example, if the value of $N_Q$-bit field QCLforPDSCH signaled by $DCI_1$ corresponds to a single TCI state and the RS(s) configured in TCI state provide QCL configurations, the UE may assume the DM-RS antenna ports associated with the reception of codeword indicated by $DCI_1$ and all the additional codewords indicated by $DCI_2$ are quasi co-located with the RS(s) configured in the TCI state corresponding to the value of $N_Q$-bit field QCLforPDSCH signaled in $DCI_1$.

In some embodiments, for downlink signaling for downlink reception, a N-level DCI (downlink control information), namely $DCI_1$, $DCI_2$, . . . , $DCI_N$, can be configured to indicate the transmission of N≥1 codewords for downlink reception. $DCI_1$ can include MCS field and HARQ-related parameters associated with a PDSCH assignment for one codeword. DCI1 can include a B-bit field addtionalCW to indicate the absence or presence of $DCI_2$, $DCI_3$, . . . , $DCI_N$. When addtionalCW indicates that presence of $DCI_2$, $DCI_3$, . . . , $DCI_N$, each of $DCI_2$, $DCI_3$, . . . , $DCI_N$ can include one MCS field and HARQ-related parameters associated with for each codeword of additional N−1 codewords in one PDSCH assignment.

In one embodiment, $DCI_1$ can include bit filed(s) to indicate one or more of the following information: (1) the presence or absence of one or more additional DCIs (2) the number of additional DCIs that are present.

In one example, $DCI_1$ can include two bit-fields: bit-field1 to indicate the presence and absence of any additional DCI(s) and bit-field2 to indicate the number of additional DCI being present.

In one example, $DCI_1$ can include one bit-field, bit-field1 to jointly indicate the presence and absence of any additional DCI(s) and the number of additional DCIs being present. In one example, bit-field1=00 indicates that no additional DCI is present and bit-field1=01 indicates that one additional DCI is present and the UE can be requested to monitor for $DCI_1$ and $DCI_2$; bit-field1=10 indicates that two additional DCIs is present and the UE can be requested to monitor for $DCI_1$, $DCI_2$ and DCI3; bit-field1=11 indicates that three additional DCIs is present and the UE can be requested to monitor for $DCI_1$, $DCI_2$, $DCI_3$ and $DCI_4$;

In one embodiment, each DCI ($DCI_1$, $DCI_2$, . . . , $DCI_N$) in N-level DCI can include a one bit-field QCLforCW to indicate the QCL configuration for the reception of the codeword scheduled by that DCI. The UE may assume the DM-RS antenna ports associated with the reception of PDSCH of codeword indicated by the $DCI_1$ are quasi co-located with QCL configuration as indicated by the bit-field QCLforCW contained in $DCI_1$. If $DCI_2$ is present, the UE may assume the DM-RS antenna ports associated with the reception of PDSCH of codeword indicated by the $DCI_2$ are quasi co-located with QCL configuration as indicated by the bit-field QCLforCW contained in $DCI_2$. If $DCI_N$ is present, the UE may assume the DM-RS antenna ports associated with the reception of PDSCH of codeword indicated by the $DCI_N$ are quasi co-located with QCL configuration as indicated by the bit-field QCLforCW contained in $DCI_N$.

In one embodiment, DCI1 can include one bit-field QCLforCWALL to jointly indicate the QCL configuration for the reception of all the codewords indicated by $DCI_1$ and all the present additional DCI(s). In one example, one value of bit-field QCLforCWALL can correspond to N TCI states and RS(s) configured in each TCI state can provide QCL configuration for downlink reception of PDSCH codeword indicated by $DCI_1$ and additional one or more DCI(s).

In some embodiments, for downlink signaling for uplink transmission, a N-level DCI (downlink control information), namely $DCI_1$, $DCI_2$, . . . , $DCI_N$, can be configured to indicate the transmission of N≥1 codewords for uplink transmission. $DCI_1$ can include MCS field and HARQ-related parameters associated with a PUSCH assignment for one codeword. DCI1 can include a B-bit field addtionalCW to indicate the absence or presence of $DCI_2$, $DCI_3$, . . . , $DCI_N$. When addtionalCW indicates presence of $DCI_2$, $DCI_3$, . . . , $DCI_N$, each of $DCI_2$, $DCI_3$, . . . , $DCI_N$ can include one MCS field and HARQ-related parameters associated with for each codeword of additional N−1 codewords in one PUSCH assignment.

In one embodiment, $DCI_1$ can include bit filed(s) to indicate one or more of the following information: (1) the presence or absence of one or more additional DCIs (2) the number of additional DCIs that are present.

In one example, $DCI_1$ can include two bit-fields: bit-field1 to indicate the presence and absence of any additional DCI(s) and bit-field2 to indicate the number of additional DCI being present.

In one example, $DCI_1$ can include one bit-field, bit-field1 to jointly indicate the presence and absence of any additional DCI(s) and the number of additional DCIs being present. In one example, bit-field1=00 indicates that no additional DCI is present and bit-field1=01 indicates that one additional DCI is present and the UE can be requested to monitor for $DCI_1$ and $DCI_2$; bit-field1=10 indicates that two additional DCIs is present and the UE can be requested to monitor for $DCI_1$, $DCI_2$ and DCI3; bit-field1=11 indicates that three additional DCIs is present and the UE can be requested to monitor for $DCI_1$, $DCI_2$, $DCI_3$ and $DCI_4$.

In one embodiment, each DCI ($DCI_1$, $DCI_2$, . . . , $DCI_N$) in N-level DCI can include a bit-field SRIforCW to indicate the Tx beam information for the transmission of the codeword scheduled by that DCI. The bit-field SRIforCW can indicate an indicator of SRS resource, CSI-RS resource or SS/PBCH block and the UE may use the same transmit filter to transmit the PUSCH codeword indicated by the $DCI_1$ as the transmit filter used by the RS indicated by the bit-field SRIforCW contained in $DCI_1$. If $DCI_2$ is present, the UE may use the same transmit filter to transmit the PUSCH codeword indicated by the $DCI_2$ as the transmit filter used by the RS indicated by the bit-field SRIforCW contained in $DCI_2$. If $DCI_N$ is present, the UE may use the same transmit filter to transmit the PUSCH codeword indicated by the $DCI_N$ as the transmit filter used by the RS indicated by the bit-field SRIforCW contained in $DCI_N$.

In one example, $DCI_1$ can include one bit-field SRIforCW to jointly indicate the Tx beam information for the transmission of all the codewords indicated by $DCI_1$ and all the present additional DCI(s). In one example, one value of bit-field SRIforCW can correspond to N indicators of SRS resources, CSI-RS resources and/or SS/PBCH blocks and each RS resource configured here can provide spatial transmit filter information uplink transmission of PUSCH codeword indicated by $DCI_1$ and additional one or more DCI(s).

In one embodiment 1, for downlink signaling for scheduling downlink reception and/or uplink transmission, a two-level DCI, namely $DCI_1$ and $DCI_2$, is configured to configure N≥1 codeword(s) for downlink reception and/or UL transmission. In one embodiment, a UE can be requested to decode $DCI_1$ and $DCI_2$ in one same search space and the associated control resource set in one same slot. The UE can be requested to assume the QCL assumption configured to the associated control resource set to monitor the PDCCH for two-level DCI, $DCI_1$ and $DCI_2$. In one example, a UE detects one $DCI_1$ in slot n as configured through a search space s and associated control resource setp. If the bit-field in decoded DCI1 indicates the presence of $DCI_2$, the UE may decode $DCI_2$ in slot n as configured through a search space s and associated control resource set p.

In one embodiment 1-1, for downlink signaling for scheduling downlink reception and/or uplink transmission, a N-level DCI, namely $DCI_1$, $DCI_2$, . . . , $DCI_N$, is configured to configure N≥1 codeword(s) for downlink reception and/or UL transmission. In one embodiment, a UE can be requested to decode $DCI_1$, $DCI_2$, . . . , $DCI_N$ (if $DCI_2$, . . . , $DCI_N$ are present as indicated by $DCI_1$) in one same search space and the associated control resource set in one same slot. The UE can be requested to assume the QCL assumption configured to the associated control resource set to monitor the PDCCH for N-level DCI. In one example, a UE detects one $DCI_1$ in slot n as configured through a search space s and associated control resource setp. If the bit-field in decoded DCI1 indicates the presence of one or more of {$DCI_2$, $DCI_3$, . . . , $DCI_N$}, the UE may decode the presented $DCI_2$/$DCI_3$/ . . . /$DCI_N$ in slot n as configured through a search space s and associated control resource setp.

In one embodiment 2, for downlink signaling for scheduling downlink reception and/or uplink transmission, a two-level DCI, namely $DCI_1$ and $DCI_2$, is configured to configure N≥1 codeword(s) for downlink reception and/or UL transmission. For the reception of PDCCH, a UE can be configured with a search space s and the configured search space can be associated with two control resource sets $p_1$ and $p_2$. For those two control resource set, same PDCCH monitoring periodicity and PDCCH monitoring offset can be configured. For each of these two control resource sets $p_1$ and $p_2$, the UE can be configured with a PDCCH monitoring pattern within a slot to indicate the first symbol(s) of the control resource set within a slot for PDCCH monitoring. The UE can be requested to first monitor PDCCH in control resource set $p_1$ for $DCI_1$. If the decoded $DCI_1$ indicate the presence of $DCI_2$, then the UE can be requested to monitor PDCCH in control resource set $p_2$ for $DCI_2$. When monitoring PDCCH in control resource sets $p_1$ and $p_2$, the UE can be requested to apply the QCL assumption configured to control resource sets $p_1$ and $p_2$, respectively.

In one example, the UE can be configured to first monitor PDCCH for DCI1 in either control resource sets $p_1$ and $p_2$ at one slot n. If the UE can detect $DCI_1$, from control resource set $p_1$ and the detected $DCI_1$ indicates the presence of $DCI_2$, then the UE may monitor PDCCH for $DCI_2$ in control resource set $p_2$. If the UE can detect $DCI_1$, from control resource set $p_2$ and the detected $DCI_1$ indicates the presence of $DCI_2$, then the UE may monitor PDCCH for $DCI_2$ in control resource set $p_1$.

In one embodiment 2-1, for downlink signaling for scheduling downlink reception and/or uplink transmission, a N-level DCI, namely $DCI_1$, $DCI_2$, . . . , $DCI_N$, is configured to configure N≥1 codeword(s) for downlink reception and/or UL transmission. For the reception of PDCCH, a UE can be configured with a search space s and the configured search space can be associated with two control resource sets $p_1$ and $p_2$. For those two control resource set, same PDCCH monitoring periodicity and PDCCH monitoring offset can be configured. For each of these two control resource sets $p_1$ and $p_2$, the UE can be configured with a PDCCH monitoring pattern within a slot to indicate the first symbol(s) of the control resource set within a slot for PDCCH monitoring. The UE can be requested to first monitor PDCCH in control resource set $p_1$ for $DCI_1$. If the decoded $DCI_1$ indicate the presence of one or some of {$DCI_2$, $DCI_3$, . . . , $DCI_N$}, then the UE can be requested to monitor PDCCH in control resource set $p_2$ for those of {$DCI_2$, $DCI_3$, . . . , $DCI_N$}, which are present as indicated by decoded $DCI_1$. When monitoring PDCCH in control resource sets $p_1$ and $p_2$, the UE can be requested to apply the QCL assumption configured to control resource sets $p_1$ and $p_2$, respectively.

In one embodiment 2-2, for downlink signaling for scheduling downlink reception and/or uplink transmission, a N-level DCI, namely $DCI_1$, $DCI_2$, . . . , $DCI_N$, is configured to configure N≥1 codeword(s) for downlink reception and/or UL transmission. For the reception of PDCCH, a UE can be configured with a search space s and the configured search space can be associated with N control resource sets {$p_1$, $p_2$, . . . , $p_N$} For those control resource set, same PDCCH monitoring periodicity and PDCCH monitoring offset can be configured. For each of these control resource sets {$p_1$, $p_2$, . . . , $p_N$}, the UE can be configured with a PDCCH monitoring pattern within a slot to indicate the first symbol(s) of the control resource set within a slot for PDCCH monitoring. The UE can be requested to first monitor PDCCH in control resource set pi for $DCI_1$. If the decoded $DCI_1$ indicate the presence of one or some of {$DCI_2$, $DCI_3$, . . . , $DCI_N$}, then the UE can be requested to monitor PDCCH in the corresponding control resource sets out of {$p_2$, . . . , $p_N$} for those of {$DCI_2$, $DCI_3$, . . . , $DCI_N$}, which are present as indicated by decoded $DCI_1$. When monitoring PDCCH in control resource sets {$p_1$, $p_2$, . . . , $p_N\}$, the UE can be requested to apply the QCL assumption configured to control resource sets $\{p_1, p_2, \ldots, p_N\}$, respectively.

Figure 12:
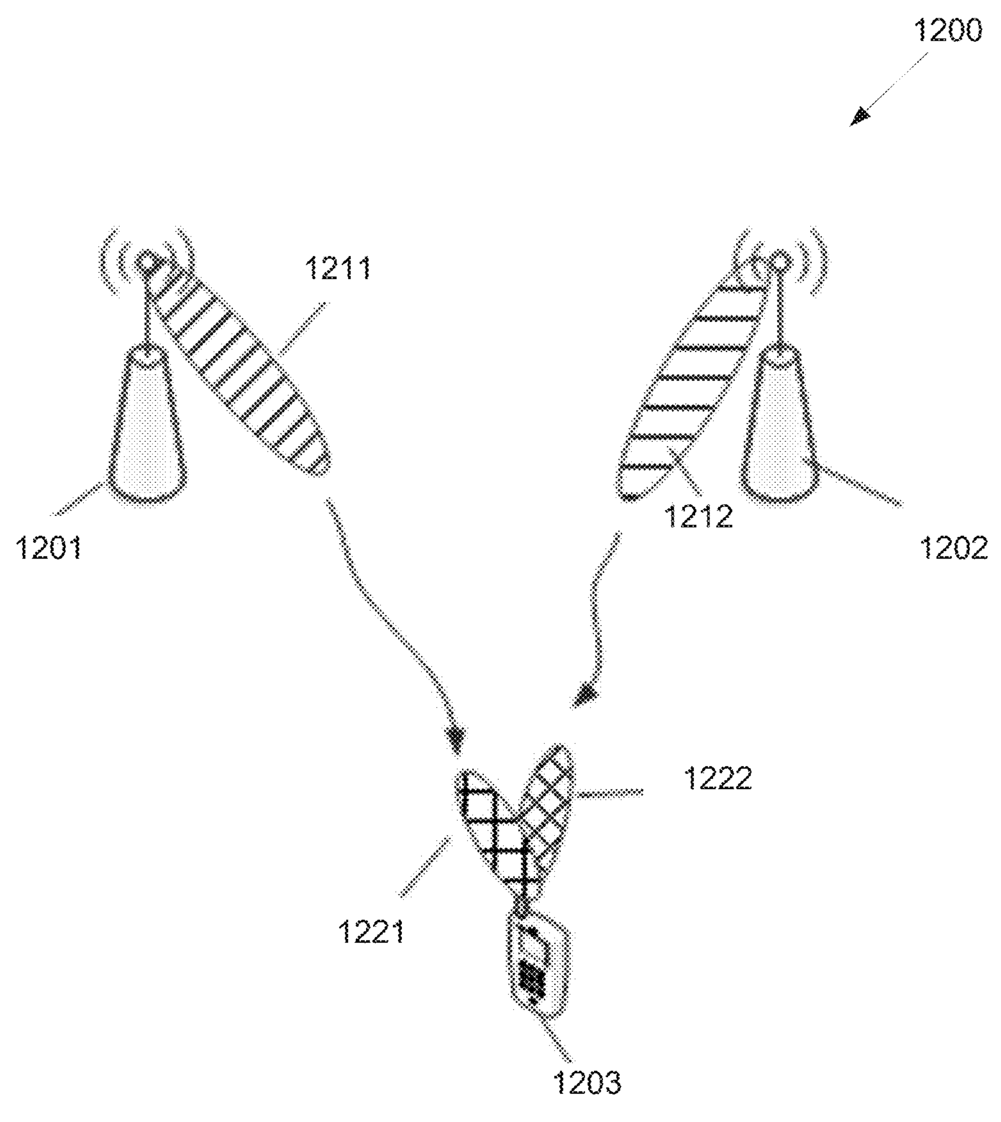
FIG. 12 illustrates an example transmission for multiple TRPs according to embodiments of the present disclosure.

FIG. 12 illustrates an example transmission 1200 for multiple TRPs according to embodiments of the present disclosure. The embodiment of the transmission 1200 illustrated in FIG. 12 is for illustration only. FIG. 12 does not limit the scope of this disclosure to any particular implementation.

The aforementioned embodiment in embodiments 2, 2-1, and 2-2 are very useful for transmission from multiple TRPs, for example the non-coherent joint transmission. An example for use case is shown in FIG. 12. A UE 1203 can be configured with multi-TRP transmission from TRP 1201 and TRP 1202. The TRP 1201 can use Tx beam 1211 to transmit PDCCH to 1203 and the UE 1203 can use Rx beam 1221 to receive. The TRP 1202 can use Tx beam 1212 to transmit PDCCH to 1203 and the UE 1203 can use Rx beam 1222 to receive. The UE 1203 can be configured with two control resource sets $p_1$ and $p_2$. The UE 1203 can be configured with one search space associated with both control resource sets $p_1$ and $p_2$ for monitoring PDCCH. With such configuration, non-coherent joint transmission and DPS (dynamic point switch) from TRPs 1201 and 1202 to UE 1203 can be easily implemented. Two control resource sets $s_1$ and $s_2$ are configured with proper QCL configuration with respect to Tx beam 1211 and 1212, respectively.

To implement non-coherent joint transmission, the TRP 1201 can transmit $DCI_1$ through Tx beam 1211 in one control resource set $s_1$. The $DCI_1$ can indicate the present of $DCI_2$ and the TRP 1202 can transmit $DCI_2$ with Tx beam 1212 in control resource set $s_2$. With the proper configuration of control resource sets and their QCL configuration, the UE 1203 can receive the DCIs accordingly. To implement DPS, either TRP 1201 can transmit one DCI scheduling downlink transmission in control resource set $s_1$ with Tx beam 1211 or TRP 1202 can transmit one DCI scheduling downlink transmission in control resource set $s_2$ with Tx beam 1212.

In some embodiments, a UE can be configured to receive a PDCCH by assuming the PDCCH is transmitted with a manner of Tx beam sweeping in time domain. By doing that, a PDCCH can be transmitted with multiple different Tx beams. Such design is useful for high-frequency system to defeat the beam link breakage. In high frequency system, the link between gNB and UE would be more directional than lower frequency system due to high-gain beamforming mechanism is used. Therefore, the link would be more fragile to the variation of environment. The rotation of UE could impair the beam link quality. Transmitting control channel with Tx beam sweeping method can improve the robustness of PDCCH links. Generally there might exist multiple good beam pair links between a gNB and a UE. Transmitting the PDCCH with those good beam pair links alternatively can reduce the chance of link drop caused by blockage of beam pair link.

Figure 13:
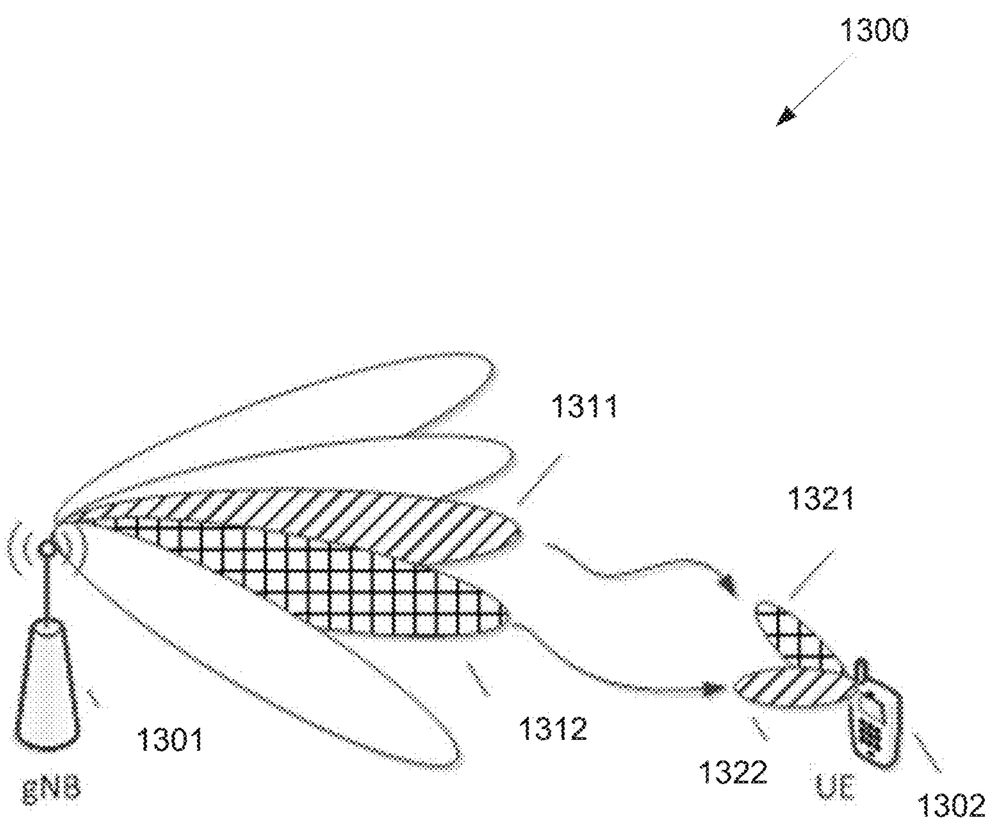
FIG. 13 illustrates an example multi-beam transmission to a UE according to embodiments of the present disclosure.

FIG. 13 illustrates an example multi-beam transmission 1300 to a UE according to embodiments of the present disclosure. The embodiment of the multi-beam transmission 1300 illustrated in FIG. 13 is for illustration only. FIG. 13 does not limit the scope of this disclosure to any particular implementation.

As shown in FIG. 13, a PDCCH can be sent through two different beam pair links between the gNB and UE. By measuring the Tx beam quality, the UE 1302 can find there are two "good" Tx beams 1311 and 1312 of gNB 1301. The gNB can configure to use Tx beams 1311 and 1312 to transmit PDCCH to the UE 1302 alternatively in time domain. When the UE 1302 receives a PDCCH configured to be transmitted with Tx transmit beam 1311, the UE 1302 can use Rx beam 1321. When the UE 1302 receives a PDCCH configured to be transmitted with Tx beam 1312, the UE 1302 can use Rx beam 1322. The association between Tx beam 1311 and Rx beam 1321 can be obtained during the beam measurement. The association between Tx beam 1312 and Rx beam 1322 can be obtained during the beam measurement. In one example, the UE 1302 can be configured with the information on how the PDCCH is transmitted with Tx beam 1311 and 1312 alternatively in time domain. In another example, the UE 1302 can be configured with the configuration on how the PDCCH may be received with Rx beam 1321 and 1322 alternatively in time domain.

In one embodiment, the configuration of using which Tx beam to transmit (or which Rx beam to receive) a PDCCH is per slot. In one example, a UE can be configured to monitor PDCCH in multiple slots. The UE can be configured to assume a first Tx beam is applied to the PDCCH transmission in a first subsets of those slots and to assume a second Tx beam is applied to the PDCCH transmission in a second subsets of those slots. In one example, a UE can be configured to monitor PDCCH in multiple slots. The UE can be configured to use a first Rx beam to receive the PDCCH transmission in a first subsets of those slots and to use a second Rx beam to receive the PDCCH transmission in a second subsets of those slots.

In one embodiment, the configuration of using which Tx beam to transmit (or which Rx beam to receive) a PDCCH is per OFDM symbol within one slot. A PDCCH can be transmitted over a resource set with multiple symbols. The UE can be configured with the Tx beam ID for each symbol within one PDCCH transmission and different Tx beams can be configured for different symbols within one PDCCH transmission. Thus to receive one PDCCH in a slot, the UE can be requested to apply different Rx beam (corresponding to the configured Tx beams) to receive those symbols in one PDCCH.

In one example, a UE can be configured with a control resource set p. The UE can be configured with a search space s with respect to control resource set p to monitor PDCCH. In the configuration of search space s, the UE can be configured with PDCCH monitoring slot periodicity of $k_{p,s}$ slots and PDCCH monitoring offset of $o_{p,s}$ slots and the first symbol(s) of control resource setp within one slot for monitoring PDCCH. For control resource set p, the UE can be configured or indicated with one or more of the following parameters.

In one example, one or multiple antenna port quasi co-location configuration. Each antenna port quasi co-location can be configured through one TCI (transmission configuration indication) state to indicate quasi co-location information of the DM-RS antenna port for PDCCH reception with respect to delay spread, Doppler spread, Doppler shift, average delay and spatial Rx parameters. Here the spatial Rx parameters is equivalent to the Tx beam or Rx beam indication. In another one example, each antenna port quasi co-location configuration signaled through one configured/indicated TCI (transmission configuration indicator) state.

The UE can be configured with an association between a configured/indicated antenna port quasi co-location configuration with the slot location(s) of PDCCH transmission.

A configuration of pattern of cycling (for called apply) those antenna port quasi co-location configurations on PDCCH transmission.

The periodicity of cycling or applying those antenna port quasi co-location configurations on PDCCH.

To receive PDCCH transmitted in one slot, the UE can be requested to obtain the corresponding/associated antenna port quasi co-location configuration according the configuration of the control resource set and the transmission location (including slot index where the PDCCH is transmitted and/or the logical index of this PDCCH transmission) and the UE assumes that the DM-RS antenna port associated with this PDCCH reception is quasi co-located with one or more downlink RS configured by the identified antenna port quasi co-location configuration.

In one embodiment, a UE can be configured with a control resource set p and K>=1 TCI states can be configured for control resource set p to provide the pool of antenna port quasi co-location configuration for PDCCH reception on this control resource set. A selection command (e.g., a MAC message) can indicate N22=1 TCI states (out of K configured TCI states) for the QCL assumption for the UE to receive PDCCH on this control resource set. When N is >1, the gNB can signal one association between each indicated TCI state and the transmission location of PDCCH of this control resource set p. After receiving the selection command, the UE can be requested to receive one PDCCH by assuming the DM-RS antenna port is quasi co-located with one or more downlink RS configured by one TCI state that the UE may identify based on the association between TCI state and the transmission location of PDCCH configured in selection command and the location of this PDCCH transmission In one example, a UE can be configured with a control resource setp and a search space set s configured for the UE to monitor PDCCH. The search space set s is associated with control resource set p. In search space set s, a PDCCH monitoring periodicity of $k_{p,s}$ slots is configured by higher layer parameter monitoringSlotPeriodicityAndOffset; a PDCCH monitoring offset of $o_{p,s}$ slots, where $0 \le o_{p,s} < k_{p,s}$, is configured by higher layer parameter monitoringSlotPeriodicityAndOffset; a PDCCH monitoring pattern within a slot, indicating first symbol(s) of the control resource set within a slot for PDCCH monitoring, is configured by higher layer parameter monitoringSymbolsWithinSlot. For control resource set p, the UE can be configured or indicated with 4 TCI states: $TCI_1$, $TCI_2$, $TCI_3$ and $TCI_4$. (Here 4 is used for exemplary purpose. It is easy to extend the embodiment to other values). The UE can be configured with a monitoring pattern for TCI states $\{TCI_1, TCI_2, TCI_3$ and $TCI_4\}$, which indicates which PDCCH(s) transmission is associated with each of those TCI states $\{TCI_1, TCI_2, TCI_3$ and $TCI_4\}$. In one example, it can be configured through a TCI-state-Map with L entries $\{a_1, a_2, a_3, \ldots, a_L\}$. The monitoring pattern for TCI states $\{TC_1i, TCI_2, TCI_3$ and $TCI_4\}$ on PDCCH of control resource set p has periodicity of L PDCCH transmissions. The value of each ai indicates one TCI state out of $\{TCI_1, TCI_2, TCI_3$ and $TCI_4\}$ and ai indicating $TCI_i$ (i=1, 2, 3, 4) can mean that the UE can be requested to assume the QCL assumption of 1-th PDCCH transmission in each TCI state monitoring pattern period is $TCI_i$.

When monitoring PDCCH in search space set s, the UE can be requested to calculate the QCL assumption TCI state for one PDCCH reception based on the slot location of PDCCH, the configured TCI state monitoring pattern, the PDCCH monitoring offset, the PDCCH monitoring periodicity. In one example, to receive PDCCH in slot $o_{p,s}+m \times k_{p,s}$ (m=0, 1, 2, . . . ), the UE may assume the DM-RS antenna port associated with PDCCH transmission(s) in in slot $o_{p,s}+m \times k_{p,s}$ (m=0, 1, 2, . . . ) is quasi co-located with the TCI state out of $\{TCI_1, TCI_2, TCI_3$ and $TCI_4\}$, which is indicated by ai in $\{a_1, a_2, a_3, \ldots, a_L\}$ where i=m(mod L)+1.

In one example, a UE can be configured/indicated with 4 TCI states, $\{TCI_1, TCI_2, TCI_3$ and $TCI_4\}$. For each configured TCI state, the UE can be configured with a PDCCH monitoring periodicity and a PDCCH monitoring slot offset. For reception of PDCCH at slot n, the UE may assume the DM-RS antenna port of PDCCH is quasi co-located with the TCI state where slot n is associated with this TCI state's configured monitoring periodicity and slot offset.

In one example, when the PDCCH monitoring pattern of two or more TCI state collide in one slot, the UE may assume the DM-RS port of PDCCH is quasi co-located with the TCI state with lowest entry of those colliding TCI states.

In one embodiment, the sweeping of TCI states can be configured across symbols within a control resource set. A UE can be configured with a control resource set p. In the configuration of this control resource set p, a number of consecutive symbols is configured by higher layer parameter CORESET-time-duration. For this control resource set p, the UE can be configured or indicated with multiple (for example 4) TCI states, $\{TCI_1, TCI_2, TCI_3$ and $TCI_4\}$, which is used as the QCL assumption for each symbols within the control resource set p. The UE can be configured with a monitoring pattern of those TCI states $\{TCI_1, TCI_2, TCI_3$ and $TCI_4\}$ across the symbols within control resource set p. The UE can be requested to apply the QCL assumption indicated by TCI states of $\{TCI_1, TCI_2, TCI_3$ and $TCI_4\}$ on different symbols in that control resource set p.

In one example, the UE can be requested to assume the DM-RS antenna port of $1^{st}$ symbol in control resource setp is quasi co-located with RS(s) configured in $TCI_1$, to assume the DM-RS antenna port of $2^{nd}$ symbol in control resource set p is quasi co-located with RS(s) configured in $TCI_2$; to assume the DM-RS antenna port of $3^{rd}$ symbol in control resource set p is quasi co-located with RS(s) configured in $TCI_3$; to assume the DM-RS antenna port of $4^{th}$ symbol in control resource setp is quasi co-located with RS(s) configured in $TCI_4$, and so on so forth.

In one example, a UE can be configured to monitor PDCCH in a search space set s associated with a control resource set p. In a search space set s, a PDCCH monitoring pattern within a slot, indicating first symbol, $i_0$, of the control resource set within a slot for PDCCH monitoring, is configured by higher layer parameter monitoringSymbolsWithinSlot. At one slot, to monitor the PDCCH configured by search space set s associated with control resource set p, the UE can assume the DM-RS antenna port associated with PDCCH reception on symbol $i_0$ is quasi co-located with the RS(s) configured in $TCI_1$; the UE can assume the DM-RS antenna port associated with PDCCH reception on symbol $i_0+1$ is quasi co-located with the RS(s) configured in $TCI_2$; the UE can assume the DM-RS antenna port associated with PDCCH reception on symbol $i_0+2$ is quasi co-located with the RS(s) configured in $TCI_3$; the UE can assume the DM-RS antenna port associated with PDCCH reception on symbol $i_0+3$ is quasi co-located with the RS(s) configured in $TCI_4$, and so on so forth.

Figures 14A, 14B:
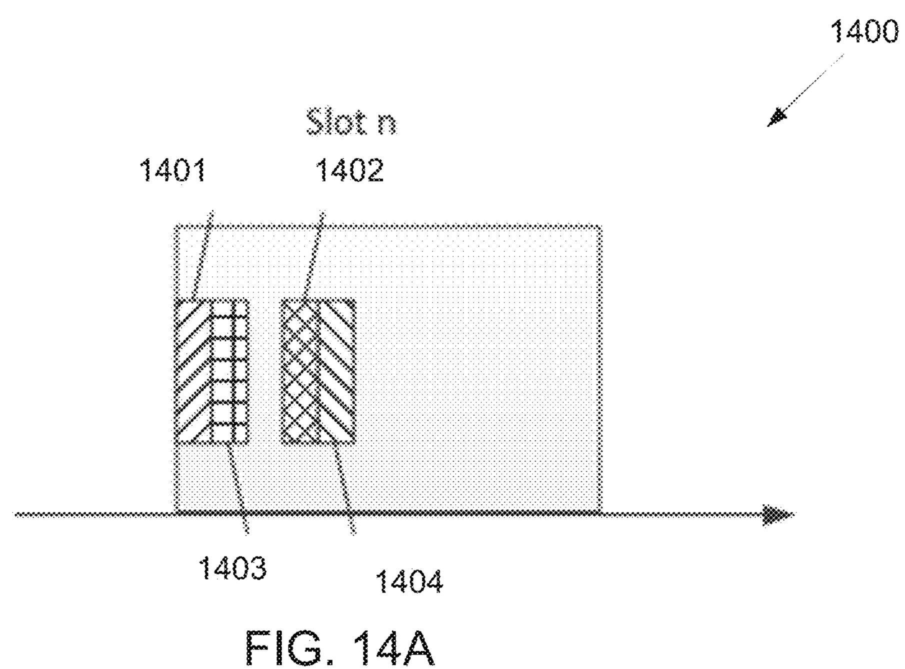
FIG. 14A illustrates an example control resource set according to embodiments of the present disclosure.
FIG. 14B illustrates another example control resource set according to embodiments of the present disclosure.

FIG. 14A illustrates an example control resource set 1400 according to embodiments of the present disclosure. The embodiment of the control resource set 1400 illustrated in FIG. 14A is for illustration only. FIG. 14A does not limit the scope of this disclosure to any particular implementation.

In one embodiment, a UE can be configured with two or more first symbols of control resource setp within a slot through the configuration of a search space set s associated with control resource setp. If the control resource set instances of those different first symbols have NO overlap in time domain, the UE can be requested to apply the configured monitoring pattern of configured TCI states on symbol sets indicated by each first symbol in one slot.

As shown in FIG. 14A, two first symbols 1401 and 1402 are configured for monitoring PDCCH at slot n through a search space set s associated with a control resource set p. The control resource set starting from symbol 801 does not have overlap with control resource set starting from 1402. The UE can be requested to apply the monitoring pattern of $TCI_1$ and $TCI_2$ on symbol 1401 and 1403 for PDCCH detection and the UE can be requested to apply the monitoring pattern of $TCI_1$ and $TCI_2$ on symbol 1402 and 1404 for PDCCH detection.

In one embodiment, a UE can be configured with two or more first symbols of control resource setp within a slot through the configuration of a search space set s associated with control resource set p. If the control resource set instances of those different first symbols have some overlap in time domain, the UE can be requested to apply the configured monitoring pattern of configured TCI states starting from the symbol indexed by the configured first symbol with lowest symbol index, i.e., the lowest symbol index configured in monitoringSymbolsWithinSlot.

FIG. 14B illustrates another example control resource 1450 set according to embodiments of the present disclosure. The embodiment of the control resource 1450 illustrated in FIG. 14B is for illustration only. FIG. 14B does not limit the scope of this disclosure to any particular implementation.

As shown in FIG. 14B, a control resource set p is configured with 4 consecutive symbols. In the configuration of a search space set s associated with control resource set p, two first symbols of the control resource set are configured for PDCCH monitoring pattern within a slot. As shown in FIG. 14B, those two configured first symbols for monitoring PDCCH are symbol 1411 and symbol 1412.

Then the UE may monitor symbols 1411, 1412, 1413, and 1414 of one control resource set for monitoring PDCCH and the UE may monitor symbols 1412, 1413, 1414, and 1415 of one control resource set for monitoring PDCCH. Since these four symbols of two control resource set instances have overlap in time domain, the UE can be requested to apply the configured monitoring pattern of TCIs, $\{TCI_1, TCI_2, TCI_3$ and $TCI_4\}$, across all those symbols.

In the example shown in FIG. 14B, the UE can be requested to apply the QCL assumption indicated by $TCI_1$ for reception of symbol 1411, apply the QCL assumption indicated by $TCI_2$ for reception of symbol 1412, apply the QCL assumption indicated by $TCI_3$ for reception of symbol 1413, apply the QCL assumption indicated by $TCI_4$ for reception of symbol 1414 and apply the QCL assumption indicated by $TCI_1$ for reception of symbol 1415.

In some embodiments, the beam indication for reception of PDCCH can be configured and signaled through a two-level hybrid embodiment. A first beam indication can be configured for reception of PDCCH. This a first beam indication can be considered as a default beam indication and the UE can be requested to assume this beam indication to receive the PDCCH. And a second beam indication can be signaled to provide the beam indication for reception of PDCCH within a short time duration temporarily. During that time duration, the UE can be requested to receive the PDCCH with the assumption of a second beam indication and after the time duration, the UE can be requested to resume to assume a first beam indication to receive the PDCCH.

Figure 15:
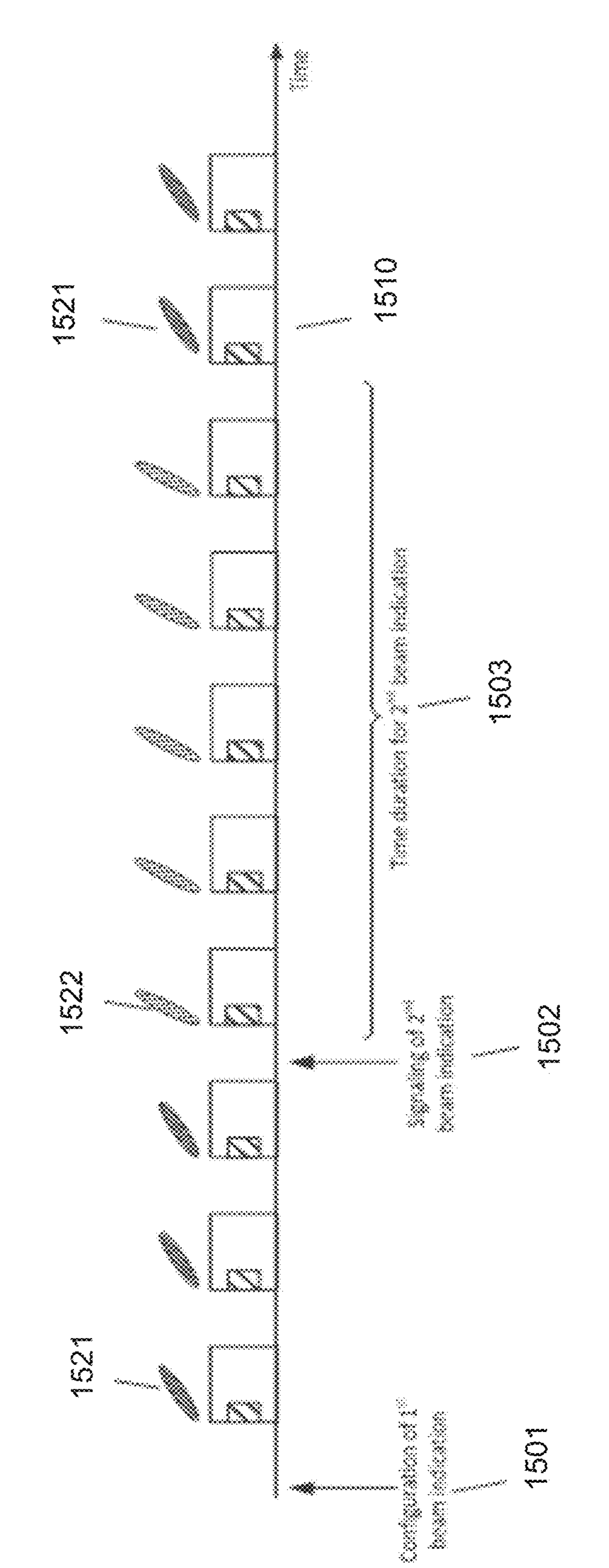
FIG. 15 illustrates an example beam indication according to embodiments of the present disclosure.

FIG. 15 illustrates an example beam indication 1500 according to embodiments of the present disclosure. The embodiment of the beam indication 1500 illustrated in FIG. 15 is for illustration only. FIG. 15 does not limit the scope of this disclosure to any particular implementation.

As shown in FIG. 15, a UE can be configured with $1^{st}$ beam indication as default beam indication in 1501. Then the UE can be assume beam 1521 is used to transmit the PDCCH. At some time point, the UE can be signaled with a $2^{nd}$ beam indication in 1502 and a time duration 1503 for applying $2^{nd}$ beam indication can be configured to the UE. After receiving the configuration of $2^{nd}$ beam indication in 1502, the UE can be requested to assume beam 1522 is used to transmit the PDCCH transmission within the time duration 1503. After the time duration 1503, the UE can assume the beam 1521 is resumed and the UE can resume to assume to the beam 1521 is used to transmit the PDCCH starting from 1510 after the time duration 1503.

The use case for such a two-level beam indication design for PDCCH is to deal with sudden beam link variation in high frequency system. The default beam can be configured through RRC or MAC-CE to provide a default beam. It can be updated slowly. When some beam link blockage is detected due to some temporary environment condition, the gNB can quickly switch the beam of PDCCH to a $2^{nd}$ Tx beam and switch the beam of PDCCH back after the blockage is gone.

In one embodiment, a control resource set can be configured with a first spatial QCL configuration though RRC or MAC-CE as a first level of beam indication for UE to monitor PDCCH in search space associated with this control resource set. The UE can assume the DM-RS antenna port of PDCCH in this control resource set according to the configured a first spatial QCL configuration. The UE can be signaled a second spatial QCL configuration through a PHY signaling, for example in a DCI. When receiving the configuration of a second spatial QCL configuration, the UE can be requested to assume a second spatial QCL configuration can override a first spatial QCL configuration for a time duration. The time duration can be configured through higher layer signaling or preconfigured or predefined.

Figure 16:
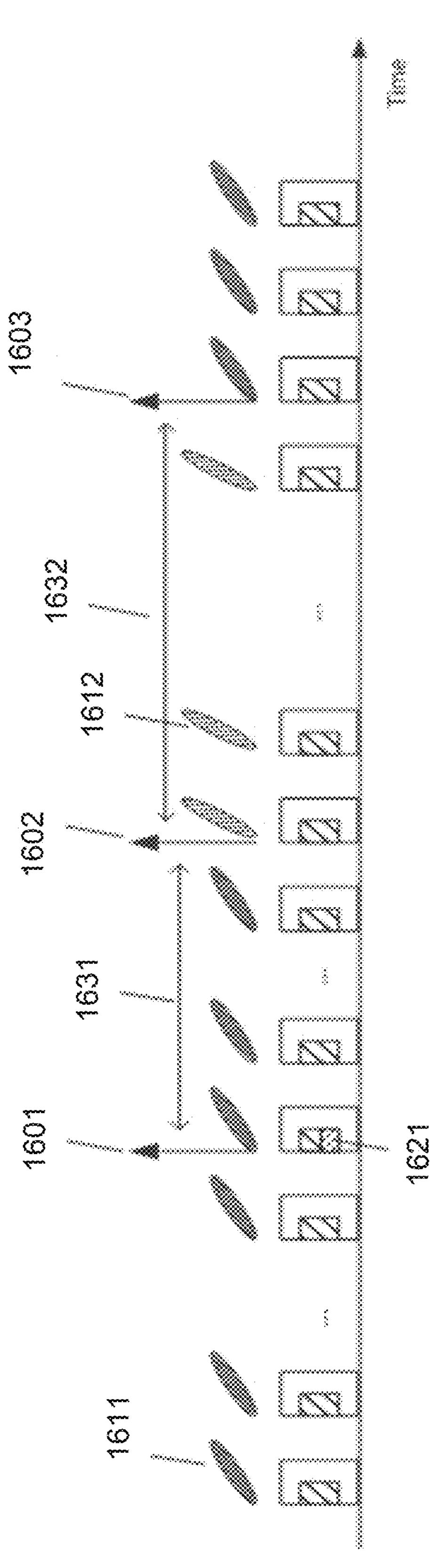
FIG. 16 illustrates another example beam indication according to embodiments of the present disclosure.

FIG. 16 illustrates another example beam indication 1600 according to embodiments of the present disclosure. The embodiment of the beam indication 1600 illustrated in FIG. 16 is for illustration only. FIG. 16 does not limit the scope of this disclosure to any particular implementation.

As shown in FIG. 16, the UE can be configured with a first spatial QCL assumption 1611 for PDCCH reception. The UE can be requested to assume a first spatial QCL assumption to receive the PDCCH. At slot 1601, a DCI 1621 can signal a second spatial QCL assumption 1612. After a configured or preconfigure Ni slots 1631, the UE can begin to assume a second spatial QCL assumption 1612 to receive PDCCH starting from slot 1602. Before slot 1602 and after receiving DCI 1621 at slot 1601, the UE can be requested to continue to use a first spatial QCL assumption 1611 to receive the PDCCH during time duration 1631. Then starting from slot 1602, the UE can be requested to apply a second spatial QCL assumption 1612 within the time duration 1632. The length of time duration 1632 can be configured or preconfigured as number of slots, for example $N_2$ slots. When the time duration 1632 finishes, the UE can resume to use a first spatial QCL assumption to receive PDCCH starting from slot 1603.

In one embodiment, a DCI format carrying an indicator of a second spatial QCL configuration detected from PDCCH in a search space associated with a control resource setp can indicate the second spatial QCL configuration for control resource set p.

In one embodiment, No-bit carried in DCI format 0_1 and 1_1 can be used to indicate the information of signaling a second spatial QCL configuration. Example of $N_0$ can be 1, 2, 3, 4, . . . bits.

In one embodiment, a new DCI format can be defined to carry $N_0$-bit to indicate the information of a second spatial QCL configuration which is used as in examples and embodiments described in this disclosure.

In one embodiment, a UE can be configured with a control resource setp with a set of TCI states and those TCI states can provide QCL configuration for PDCCH reception in control resource set p. A MAC-CE signaling can be used to select one TCI state from the configured TCI state set of control resource set p as a first QCL assumption. Then $N_0$-bit carried in DCI format can indicate one TCI state out of that configured TCI state set of control resource set p as a second QCL assumption as explained in above examples/embodiments.

In one embodiment, a UE can be configured with a control resource set p with a first set of TCI states and a second set of TCI states. The TCI states configured in a first set can be used as a first QCL configuration and the TCI states configured in a second set can be used as a second QCL configuration, which are illustrated in above examples and embodiment. A MAC-CE signaling can be used to select one TCI state from the configured a first TCI state set of control resource set p as a first QCL assumption. Then No-bit carried in DCI format can indicate one TCI state out of that configured a second TCI state set of control resource set p as a second QCL assumption as explained in above examples/embodiments. In one example the value of $N_0$ can depend on the number of TCI states configured in a second TCI state set.

In some embodiments, a UE can be configured with more than one Tx beams for one SRS (sounding reference signal) resource. If configured, the UE can be requested to use all the Tx beams configured to that SRS resource to transmit that SRS resource. This embodiment is useful for the UEs with two or more transmit panels. It can be used to support the uplink transmission and uplink beam management for UEs with two or more transmit panels. This embodiment can be extended to other uplink channels and signals, except SRS signal. A UE can be configured with more than one Tx beams for the transmission of PUCCH. A UE can be configured with more than one Tx beams for the transmission of PUSCH.

Figure 17:
FIG. 17 illustrates an example two transmit panels according to embodiments of the present disclosure.
Figure 17:
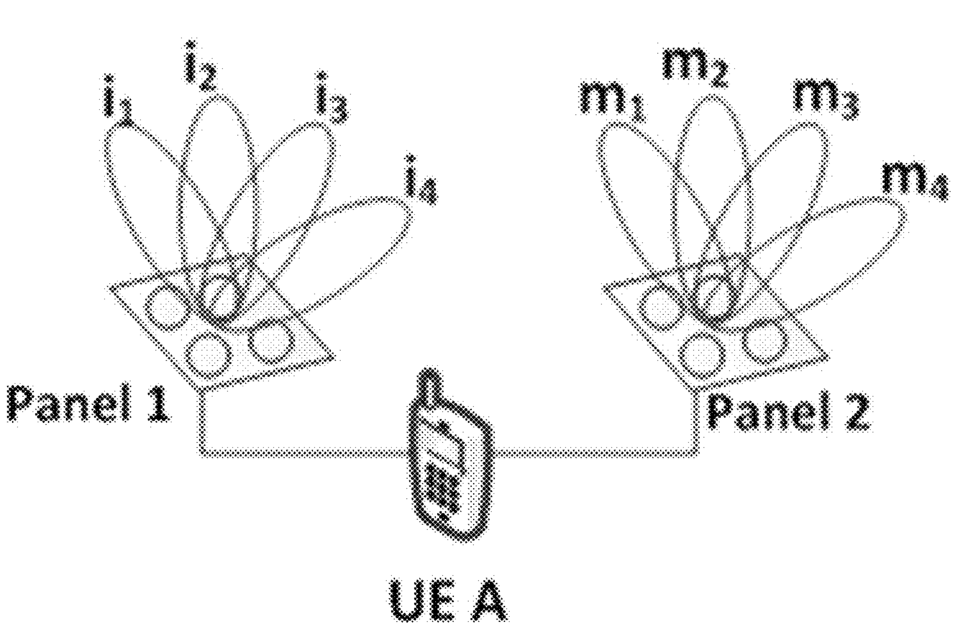

FIG. 17 illustrates an example two transmit panels 1700 according to embodiments of the present disclosure. The embodiment of two transmit panels 1700 illustrated in FIG. 17 is for illustration only. FIG. 17 does not limit the scope of this disclosure to any particular implementation.

As illustrated in FIG. 17, a UE A has two transmit panels: panel 1 and panel 2. On each of these two panels, the UE can formulate 4 different transmit beam directions. On panel 1, those four Tx beams are $\{i_1, i_2, i_3 \text{ and } i_4\}$. On panel 2, those four Tx beams are $\{m_1, m_2, m_3 \text{ and } m_4\}$. For the transmission of one SRS resource, the gNB can configure the UE A to use two Tx beams, one from panel 1 and one from panel 2. For example, the gNB can configure the UE A to transmit one SRS resource with beams $\{i_1, m_3\}$ and configure the UE A to transmit another SRS resource with beams $\{i_2, m_1\}$. For example, the gNB can configure the UE A to transmit UE A to transmit one PUCCH resource with beams $\{i_3, m_2\}$ and to transmit one PUSCH with beams $\{i_1, m_4\}$.

The technical advantage of configuring multiple Tx beams for uplink transmission to reduce the overhead for uplink beam management in the case of UE with multiple Tx panels. In the example of FIG. 17, there are 4 beams on each of those two panels. There are totally 16 combinations of Tx beams from two different panels. One efficient way to train the Tx beam is to train the beams of each panel separately and then the gNB can select the "best" combination from the training results. To do that, the UE only need to train 8 Tx beams. In contrast, the UE can train all the Tx beam combinations and then the UE would need to train 16 logical Tx beams (each logical beam can contain one Tx beam from panel 1 and one Tx beam from panel 2). It may be found that the resource usage is reduced by 50%.

In one embodiment, a UE can be configured with a SRS resource A and for the SRS resource A, the UE can be configured with $N_{SR}\geq 1$ SRS resource indexes as the reference of spatial relation. In other word, the following SRS parameter can be configured or indicated or signaled for a SRS resource A: the configuration of the spatial relation between $N_{SR}\geq 1$ SRS resources and SRS resource A. This parameter can contain the IDs of $N_{SR}\geq 1$ SRS resources. When configured, the UE can be requested to apply Tx beam(s) on the transmission of SRS resource A based on the indicated/configured those $N_{SR}\geq 1$ SRS resources.

In one embodiment, if the UE is configured with spatial relation parameter for one SRS resource A which contains $N_{SR}\geq 1$ IDs of SRS resources, the UE may transmit the target SRS resource (i.e., SRS resource A) with the same Tx beams used for the transmission of those $N_{SR}\geq 1$ reference SRS resources simultaneously. In another word, the UE may transmit the target SRS resource, i.e., SRS resource A, with the same spatial domain transmission filters used for the transmission of those $N_{SR}\geq 1$ reference SRS resources simultaneously.

In one embodiment, one SRS resource A can be configured with $N_{SRS\text{-}ports}$ SRS ports and the value of $N_{SRS\text{-}ports}$ can be 1 or more than 1. The examples of $N_{SRS\text{-}ports}$ can be 1, 2 or 4. When spatial relation of reference signal(s) is configured to one SRS resource, the UE may determine the mapping between SRS ports and the Tx beam(s) indicated by the configured reference signal(s). Some examples for the UE to transmit a SRS resource with $N_{SRS\text{-}ports}$ SRS ports and $N_{SR}\geq 1$ reference SRS resources for spatial relation are listed below.

In one example, the number of SRS ports $N_{SRS\text{-}ports}$ is equal to the number reference SRS resources configured as spatial relation. In this example, the UE can apply the spatial domain transmission filter of one reference SRS resource to one SRS port of the SRS resource A and the UE can apply the spatial domain transmission filters used for the transmission of different reference SRS resources to different SRS ports of the SRS resource A. In one example, SRS resource A is configured with 2 SRS ports and configured with two SRS resources $\{B_1, B_2\}$ as the spatial relation for SRS resource A. Then the UE can be requested to apply the spatial domain transmission filter used to transmit SRS resource $B_1$ on one SRS port of SRS resource A and the UE can be requested to apply the spatial domain transmission filter used to transmit SRS resource $B_2$ on another SRS port of SRS resource A.

In one example, the number of SRS ports $N_{SRS\text{-}ports}$ is less than the number reference SRS resources configured as spatial relation. In this example, the UE can be requested apply the spatial domain transmission filter(s) used for the transmission of at least one of the configured reference SRS resources in spatial relation parameter to each of those $N_{SRS\text{-}ports}$ SRS ports of SRS resource A and the UE can be requested to not apply the spatial domain transmission filter used for the transmission of one reference SRS resource to more than one SRS ports of SRS resource A. In one example, SRS resource A is configured with 2 SRS ports and configured with three SRS resources $\{B_1, B_2, B_3\}$ as the spatial relation for SRS resource A. In one example, the UE can apply the spatial domain transmission filters used to transmit SRS resources $B_1$ and $B_2$ on one SRS port of SRS resource A the UE can be requested to apply the spatial domain transmission filter used to transmit SRS resource $B_3$ on another SRS port of SRS resource A.

In one example, the number of SRS ports $N_{SRS\text{-}ports}$ can be larger than the number reference SRS resources configured as spatial relation. In this example, the UE can be requested to apply the spatial domain transmission filter used for the transmission of every SRS resource configured in spatial relation parameter to at least one port of those $N_{SRS\text{-}ports}$ SRS ports of SRS resource A. On every SRS port of those $N_{SRS\text{-}ports}$ SRS ports of SRS resource A, the UE can be requested to only apply the spatial domain transmission filter used to transmit one of those reference SRS resources configured in spatial relation parameter. In one example, SRS resource A is configured with 4 SRS ports and configured with two SRS resources $\{B_1, B_2\}$ as the spatial relation for SRS resource A. In one example, the UE can apply the spatial domain transmission filters used to transmit SRS resources Bi on a first and a second SRS ports of SRS resource A the UE can be requested to apply the spatial domain transmission filter used to transmit SRS resource $B_2$ on another two SRS ports of SRS resource A.

In one embodiment, the mapping between SRS ports of one SRS resource A and the reference SRS resources configured in spatial relation parameter can be specified or configured. Some examples are listed below.

In one example, the number of SRS ports $N_{SRS\text{-}ports}$ is 2 and the number reference SRS resources configured as spatial relation is 2 too. The UE can be requested to assume the mapping is: reference SRS resource with lowest ID is mapped to SRS port with lowest ID and reference SRS resource with highest ID is mapped to SRS port with highest ID.

In one example, the number of SRS ports $N_{SRS\text{-}ports}$ is 4 and the number reference SRS resources configured as spatial relation is 2. The UE can be requested to assume the mapping is: reference SRS resource with lowest ID is mapped to two SRS ports with lowest IDs and reference SRS resource with highest ID is mapped to the two SRS ports with highest IDs.

In one example, the number of SRS ports $N_{SRS\text{-}ports}$ is 2 and the number reference SRS resources configured as spatial relation is 4. The UE can be requested to assume the mapping is: two reference SRS resources with lowest IDs are mapped to SRS port with lowest ID and two reference SRS resources with highest IDs are mapped to SRS port with highest ID.

In one example, the number of SRS ports $N_{SRS\text{-}ports}$ is 1 and the number reference SRS resources configured as spatial relation is 2. The UE can be requested to assume the mapping is: both reference SRS resources are mapped to SRS port.

In one embodiment, for one SRS resource A, a UE can be configured with the association between configured SRS ports and the SRS resources included in spatial relation parameter. In one example, a SRS resource A can be configured with $N_{SRS\text{-}ports}$=4 SRS ports {1000, 1001, 1002, 1003} and the configured spatial relation parameter includes 2 SRS resource indexes $\{B_1, B_2\}$. The UE is configured/indicated with the association between SRS ports and SRS resources $\{B_1, B_2\}$: $B_1$ is mapped to ports {1000, 1001} and $B_2$ is mapped to ports {1002, 1003}. Then, when transmitting SRS resource A, the UE can be requested to apply the spatial transmit filter used for $B_1$ on ports {1000, 1001} and the spatial transmit filter used for $B_2$ on ports {1002, 1003}. The association between SRS ports and SRS resources in spatial relation parameter can be configured/indicated by one or more of the following embodiments.

In one embodiment, the association can be signaled by higher layer message. In one embodiment, a predefined association as a function of number of SRS ports and the number of SRS resources in spatial relation parameter is considered. An example predefined table for association is shown in TABLE 1. The UE can be requested to calculate the association based on configured number of SRS ports and number of SRS resources configured in spatial relation parameter.

TABLE 1 example of association between SRS ports and SRS resources in spatial relation parameter

| Configuration index | Number of SRS ports | Number of SRS resources in spatial relation parameter | Association: The SRS resources in spatial relation are $\{B_1\}$, $\{B_1, B_2\}$ or $\{B_1, B_2, B_3, B_4\}$ |
|---|---|---|---|
| 0 | 1 | 1 | B1 is mapped to 1000 |
| 1 | 1 | 2 | $B_1$ and $B_2$ are mapped 1000 |
| 2 | 1 | 4 | $B_1$, $B_2$, $B_3$ and $B_4$ are mapped to 1000 |
| 3 | 2 | 1 | $B_1$ is mapped 1000 and 1001 |
| 4 | 2 | 2 | $B_1$ is mapped 1000, $B_2$ is mapped 1001 |
| 5 | 2 | 4 | Alt#1: {$B_1$ and $B_2$ are mapped 1000, $B_3$ and $B_4$ are mapped 1001} Alt#2: {$B_1$ and $B_3$ are mapped 1000, $B_2$ and $B_4$ are mapped 1001} |
| 6 | 4 | 1 | $B_1$ is mapped to 1000/1001/1002/1003 |
| 7 | 4 | 2 | Alt#1: {$B_1$ is mapped to 1000/1001, $B_2$ is mapped to 1002/1003}; Alt#2: {$B_1$ is mapped to 1000/1002, $B_2$ is mapped to 1001/1003} |
| 8 | 4 | 4 | $B_1$ is mapped to 1000, $B_2$ is mapped to 1001, $B_3$ is mapped to 1002, $B_4$ is mapped to 1003. |

In one embodiment, a UE can be configured with multiple SRS sets for beam management and for each SRS set, the UE can be configured with one or multiple SRS resources. For a SRS resource A, if multiple reference SRS resources are included in the spatial relation parameter for SRS resource A, the reference SRS resources in spatial relation parameter may be in different SRS sets and any two of them cannot be in one same SRS set. The technical reason for this embodiment is because the SRS resources configured in one same SRS set are supposed to be the Tx beams transmitted from the same UE Tx panel. Since Tx beams are on the same panel, the UE is not able to use them simultaneously.

A UE can be configured with multiple SRS sets for uplink beam management. The multiple SRS set configuration are applicable to the case of UE with multi-panels. Each SRS set can be used to train the Tx beams of one panel. The SRS resources in same SRS set cannot be transmitted simultaneously but SRS resources from different SRS sets can be transmitted simultaneously. Then the gNB can configure SRS source A with spatial relation including multiple SRS resources from different SRS resource sets.

In one embodiment, a UE can be configured with a parameter SpatialRelation_PUCCH for one PUCCH resource. The parameter SpatialRelation_PUCCH is used indicate the Tx beam information the transmission on that PUCCH resource. The parameter can contain one or more than one entries. Each entry can contain one or multiple reference signal IDs. The reference signals contained in one entry are used to provide the transmit beam information for that PUCCH resource. If the parameter SpatialRelation_PUCCH has only one entry, then the UE may use the reference signal IDs contain in that entry to derive the transmit beam for the PUCCH resource. If the parameter SpatialRelation_PUCCH has multiple entries, then a selection command can be used to select one of those entries and the UE may use the selected entry to derive the Tx beam for PUCCH.

If one entry in SpatialRelation_PUCCH contains 2 or more SRS resource IDs, the UE transmits the PUCCH using the spatial domain transmit filters that are used transmit all the SRS resources contained in that entry. Those 2 or more SRS resource IDs are selected from different SRS resource sets. In one example, one entry in parameter SpatialRelation_PUCCH contains two SRS resource: SRS1 and SRS2, and SRS 1 and SRS 2 are from two different SRS resource sets. If that entry is selected as the spatial relation information for the PUCCH resource, the UE may transmit the PUCCH using both the spatial domain transmit filter used to transmit SRS1 and the spatial domain transmit filter used to transmit SRS2.

In one embodiment, a UE can be configured or indicated with one or more SRS resources in a parameter SpatialRelation_SRS for one SRS resource (it can be called target SRS resource), which are used to provide Tx beam information for the target SRS resource. And those one or more SRS resources configured in the parameter SpatialRelation_SRS may be selected from different SRS resource sets. If configured, the UE may transmit the target SRS resource with the spatial domain transmit filters used to all the SRS resources configured in parameter SpatialRelation_SRS. In one example, one SRS resource A is configured with two SRS resource: SRS1 and SRS2, in the parameter SpatialRelation_SRS to provide the Tx beam information for the SRS resource A, and SRS1 and SRS2 are selected from two different SRS resource sets. Then, the UE may transmit the SRS resource A using both the spatial domain transmit filter used to transmit SRS1 and the spatial domain transmit filter used to transmit SRS2.

In some embodiments, a UE can be configured or indicated with multiple SRS resource indexes for a PUSCH transmission and the indicated SRS resource indexes can be selected from different SRS sets. This embodiment can enable the gNB to select Tx beams from multiple different UE panels and then ask the UE to use those Tx beams on different Tx panel to transmit the PUSCH.

In one example, one field in physical layer signaling DCI can be used to signal the information of selected SRS resource indexes for the scheduled PUSCH. In one example, a bit field $B_{SRS\_ind}$ with M bit can be used and the value of M can be $$M = \sum_{i=1}^{P} \lceil \log_2 Q_i \rceil$$

where totally there are P SRS sets used for SRS resource selection/indication and $Q_i$ is the number of SRS resouces configured in SRS set i. In the field $B_{SRS\_ind}$, the first $\lceil \log_2 Q_1 \rceil$ can be used to indicate one SRS resource in SRS set 1, and the next $\lceil \log_2 Q_2 \rceil$ bits can be used to indicate one SRS resource in SRS set 2, . . . , and the last $\lceil \log_2 Q_P \rceil$ bits can be used to indicate one SRS resource in SRS set P.

In another embodiment, one field $B_{SRS\_ind}$ with M≥1 bits in physical layer signaling DCI can be used to signal the information of selected SRS resource indexes for the scheduled PUSCH. One value of $B_{SRS\_ind}$ can correspond to a set of selected SRS resources which can be configured through high layer signaling. In this embodiment, the size of field $B_{SRS\_ind}$ can be configured or calculated based on higher layer configuration. For example, if the number of sets of selected SRS resources combination is $M_P$, then the value of M can be $M=\lceil \log_2 M_P \rceil$.

Similarly to the transmission of SRS resource, the UE can also be configured with the association between the DM-RS ports in PUSCH and the indicated SRS resources for one PUSCH. The embodiments for SRS transmission described in previous section can be easily re-used to PUSCH with little effort or no effort.

In some implementation scenarios, a UE might have multiple transmit panels connected to one same transmit chain. Those transmit panels might point to different directions. The UE can switch the connection of the transmit chain among those transmit panels based on the signal measurement. The UE can always use the transmit panel that gives the best uplink signal quality. mmWave signal is very directional. The transmit antenna installed on one side of the cell phone might not be able to cover the signal transmission on the other side.

One valuable design of the mmWave cell phone antenna is to install transmit antenna on both sides and then connect them to one RF (radio frequency) chain. The cell phone can switch to use the antenna on one side based on the orientation of the cell phones and location of the base station. For example, the cell phone can always use the transmit antenna on one side that faces the base station so that strongest uplink signal can be achieved. That can be called UE transmit antenna switch or transmit panel switch.

In some embodiments, a UE can be configured with multiple SRS sets for uplink beam management. The UE can be configured with that the SRS resources in different SRS sets of a subset of configured SRS resource set can be transmitted simultaneously. The UE can be configured with that the SRS resources in different SRS set of a subset of configured SRS set cannot be transmitted simultaneously. This embodiment of SRS configuration and transmission is useful to the UEs with multiple panel switch function. The UE can use the Tx antenna panels connected and switched to one same transmit chain to transmit the SRS sets in which SRS resources from different set cannot be transmitted simultaneously. For two SRS sets in which SRS resources from different sets can be transmitted simultaneously, the UE can map these two sets to two transmit panels connected to different transmit chains. In one example, a UE is configured with 4 SRS sets for uplink beam management $\{s_1, s_2, s_3$ and $s_4\}$. In each of those 4 SRS sets, there are one or multiple SRS resources.

The UE can be configured with the following information: any SRS resource in set $s_1$ and any SRS resource in set $s_2$ cannot be transmitted simultaneously; any SRS resource in set s3 and any SRS resource in set $s_4$ cannot be transmitted simultaneously; any SRS resource in set $s_1$ or in set $s_2$ and any SRS resource in set $s_3$ or set $s_4$ can be transmitted simultaneously; and/or SRS resources in the same set cannot be transmitted simultaneously.

Figure 18A:
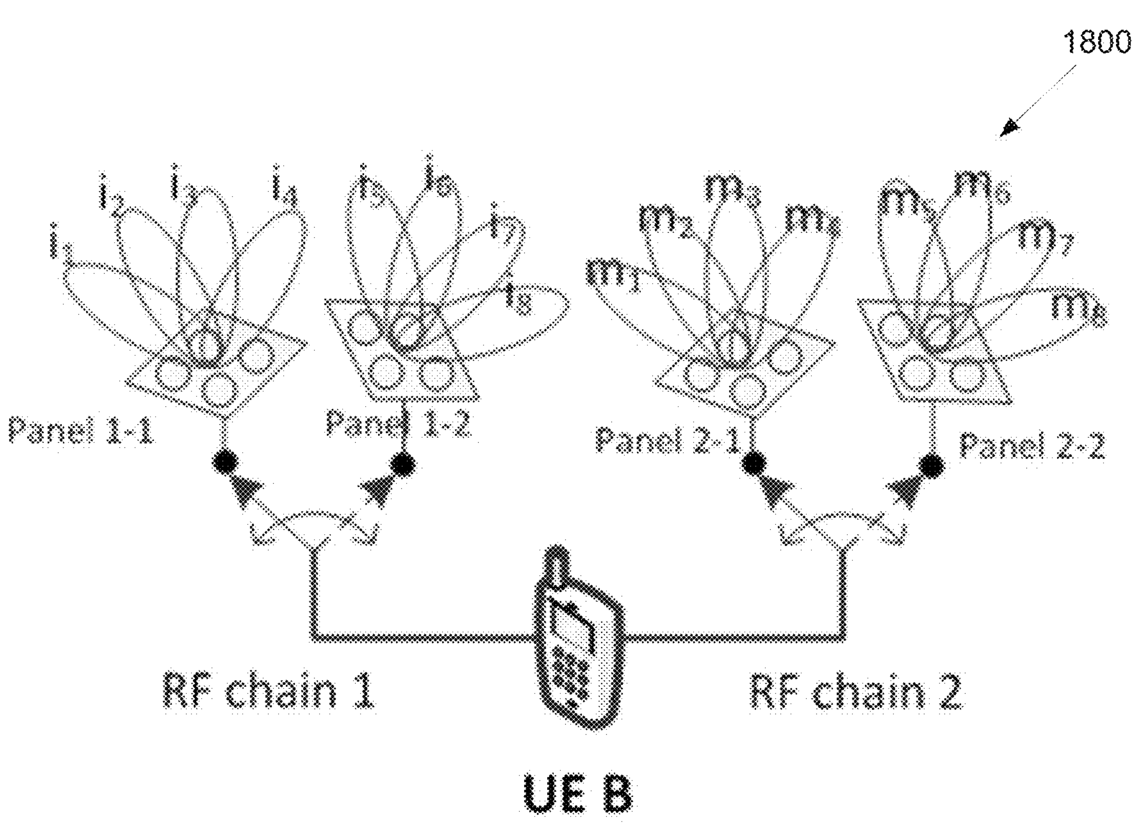
FIG. 18A illustrates an example RF chain according to embodiments of the present disclosure.

FIG. 18A illustrates an example RF chain 1800 according to embodiments of the present disclosure. The embodiment of the RF chain 1800 illustrated in FIG. 18A is for illustration only. FIG. 18A does not limit the scope of this disclosure to any particular implementation.

The SRS configuration embodiment in this example can be applied to a UE example illustrated in FIG. 18A. As shown in FIG. 18A, a UE B has two transmit RF chains. RF chain 1 can be connected to two transmit panels and the UE B can switch the RF chain 1 between panel 1-1 and panel 1-2. RF chain 2 can be connected to two transmit panels and the UE B can switch the RF chain 1 between panel 2-1 and panel 2-2. On each of those 4 panels, the UE can formulate 4 Tx beam. On Panel 1-1, those Tx beams are $\{i_1, i_2, i_3, i_4\}$, and on Panel 1-2, those Tx beams are $\{i_5, i_6, i_7, i_8\}$. On Panel 2-1, those Tx beams are $\{m_1, m_2, m_3, m_4\}$, and on Panel 2-2, those Tx beams are $\{m_5, m_6, m_7, m_8\}$. For any uplink transmission, the UE B can choose either one Tx beam from panel 1-1 or one Tx beam from panel 1-2 to transmit signal from RF chain 1 and choose either one Tx beam from panel 2-1 or one Tx beam from panel 2-2 to transmit signal from RF chain 2.

For the UE B, the SRS for uplink beam management is configured as: 4 SRS sets $\{s_1, s_2, s_3$ and $s_4\}$ and in each set there are 4 SRS resources; any SRS resource in set $s_1$ and any SRS resource in set $s_2$ cannot be transmitted simultaneously; any SRS resource in set $s_3$ and any SRS resource in set $s_4$ cannot be transmitted simultaneously; any SRS resource in set $s_1$ or in set $s_2$ and any SRS resource in set $s_3$ or set $s_4$ can be transmitted simultaneously; and/or SRS resources in same set cannot be transmitted simultaneously.

With such configuration, the UE B can apply the SRS resources in set si to the Tx beams of panel 1-1, the SRS resources in set $s_2$ to the Tx beams of panel 1-2, the SRS resources in set $s_3$ to the Tx beams of panel 2-1 and the SRS resources in set $s_4$ to the Tx beams of panel 2-2.

Figure 18B:
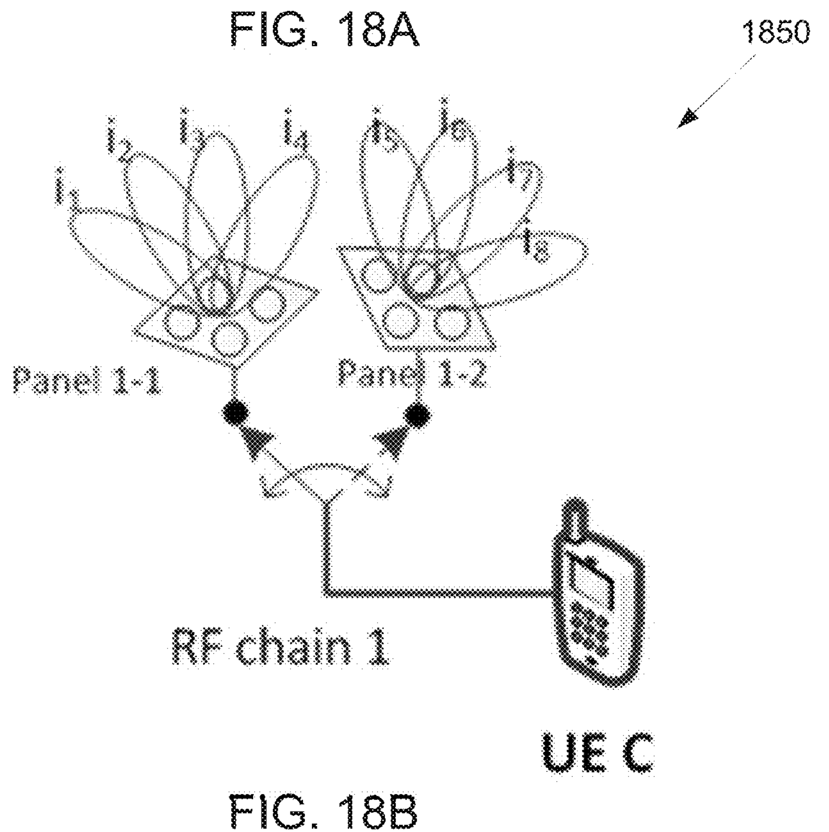
FIG. 18B illustrates another example RF chain according to embodiments of the present disclosure.

FIG. 18B illustrates another example RF chain 1850 according to embodiments of the present disclosure. The embodiment of the RF chain 1850 illustrated in FIG. 18B is for illustration only. FIG. 18B does not limit the scope of this disclosure to any particular implementation.

As shown in FIG. 18B, a UE c has one transmit RF chain that can be connected to two transmit panels and the UE B can switch the RF chain 1 between panel 1-1 and panel 1-2. On each of those 2 panels, the UE can formulate 4 Tx beam. On Panel 1-1, those Tx beams are $\{i_1, i_2, i_3, i_4\}$, and on Panel 1-2, those Tx beams are $\{i_5, i_6, i_7, i_8\}$. For any uplink transmission, the UE C can choose either one Tx beam from panel 1-1 or one Tx beam from panel 1-2 to transmit signal. For the UE C, the SRS is configured for uplink beam management as: 2 SRS sets $\{s_1, s_2\}$ and in each set there are 4 SRS resources; any SRS resource in set $s_1$ and any SRS resource in set $s_2$ cannot be transmitted simultaneously; and/or SRS resources in same set cannot be transmitted simultaneously.

With such configuration, the UE C can apply the SRS resources in set $s_1$ to the Tx beams of panel 1-1, the SRS resources in set szto the Tx beams of panel 1-2.

Figure 18C:
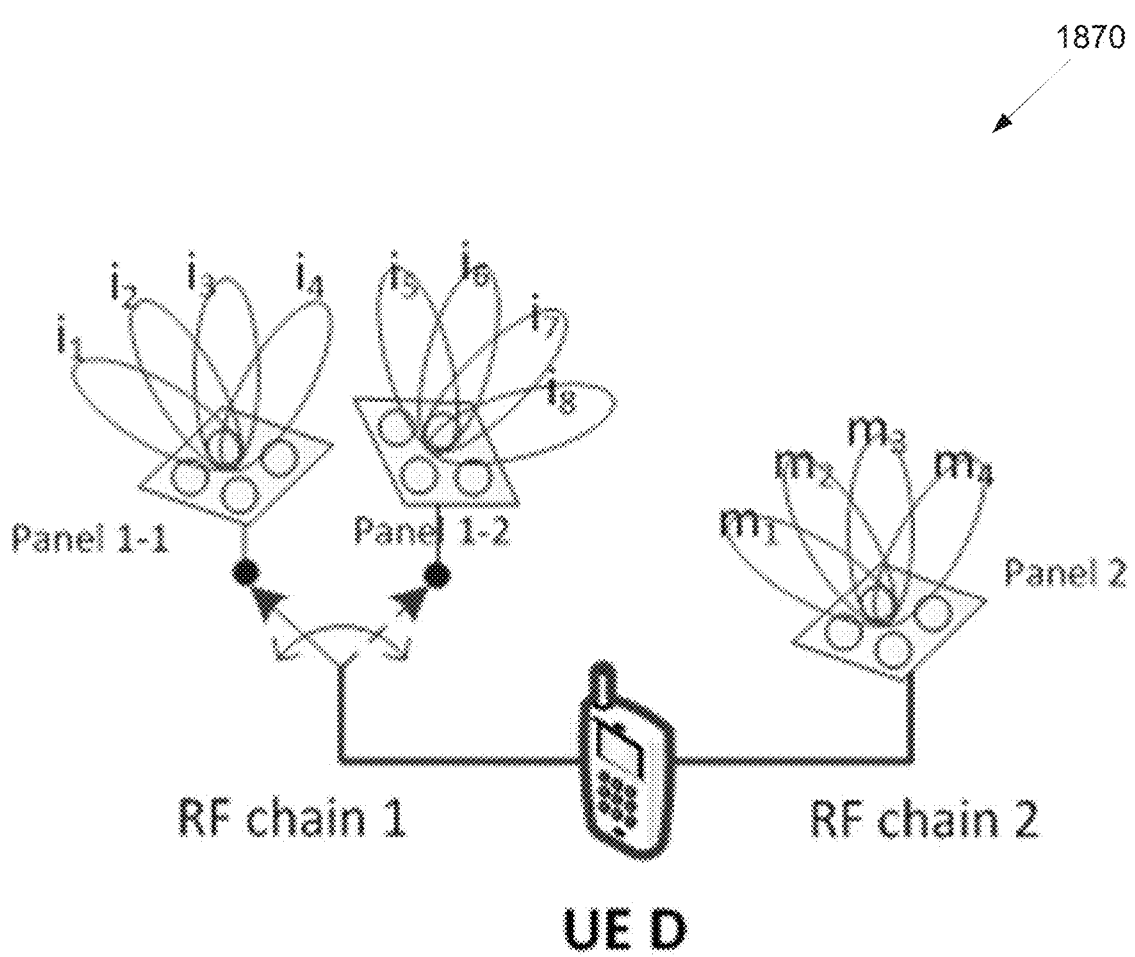
FIG. 18C illustrates yet another example RF chain according to embodiments of the present disclosure.

FIG. 18C illustrates yet another example RF chain 1870 according to embodiments of the present disclosure. The embodiment of the RF chain 1870 illustrated in FIG. 18C is for illustration only. FIG. 18C does not limit the scope of this disclosure to any particular implementation.

An example of UE for SRS configuration is illustrated in FIG. 18C. As shown in FIG. 18C, a UE D has two transmit RF chains. RF chain 1 can be connected to two transmit panels and the UE B can switch the RF chain 1 between panel 1-1 and panel 1-2. RF chain 2 is connected to one panel 2. On each of those 3 panels, the UE can formulate 4 Tx beam. On Panel 1-1, those Tx beams are $\{i_1, i_2, i_3, i_4\}$, and on Panel 1-2, those Tx beams are $\{i_5, i_6, i_7, i_8\}$. On Panel 2, those Tx beams are $\{m_1, m_2, m_3, m_4\}$.

For any uplink transmission, the UE D can choose either one Tx beam from panel 1-1 or one Tx beam from panel 1-2 to transmit signal from RF chain 1 and use panel 2 to transmit signal from RF chain 2. For the UE D, the SRS is configured for uplink beam management as: 3 SRS sets $\{s_1, s_2, s_3\}$ and in each set there are 4 SRS resources; any SRS resource in set $s_1$ and any SRS resource in set $s_2$ cannot be transmitted simultaneously; any SRS resource in set $s_1$ or in set $s_2$ and any SRS resource in set $s_3$ can be transmitted simultaneously; and/or SRS resources in same set cannot be transmitted simultaneously.

With such configuration, the UE D can apply the SRS resources in set si to the Tx beams of panel 1-1, the SRS resources in set $s_2$ to the Tx beams of panel 1-2, the SRS resources in set $s_3$ to the Tx beams of panel 2.

In another embodiment, a UE can be configured with one or multiple groups of SRS sets for uplink beam management. In each group of SRS set, there can be one or multiple SRS sets. In each SRS set, there can be one or multiple SRS resource. The UE can assume one of more of the following assumptions on the SRS configuration: any one SRS resource in a SRS set $s_i$ and any one SRS resource in a SRS set $s_j$ cannot be transmitted simultaneously if SRS set $s_i$ and SRS set $s_j$ are in the same group of SRS sets; any one SRS resource in a SRS set $s_i$ and any one SRS resource in a SRS set $s_k$ can be transmitted simultaneously if SRS set $s_i$ and SRS set $s_k$ are in the same group of SRS sets; and/or any two SRS resources in the same SRS set cannot be transmitted simultaneously.

The aforementioned embodiments can be applied to various UE implementation cases. For the UE examples shown in FIGS. 18A, 18B, and 18C, the SRS may be configured as follows.

In one example, for the UE in example in FIG. 18A, the UE B can be configured with: two groups of SRS sets: $g_1$ and $g_2$; in group $g_1$, two SRS sets $\{s_1, s_2\}$ are configured. In group $g_2$, two SRS sets $\{s_3, s_4\}$ are configured; and/or in each SRS sets of $\{s_1, s_2, s_3$ and $s_4\}$, the UE can be configured with 4 SRS resources.

With this configuration, as shown in FIG. 18A, the UE B can apply the SRS resources in set $s_1$ to the Tx beams of panel 1-1, the SRS resources in set $s_2$ to the Tx beams of panel 1-2, the SRS resources in set $s_3$ to the Tx beams of panel 2-1 and the SRS resources in set $s_4$ to the Tx beams of panel 2-2.

For the UE in example in FIG. 18B, the UE C can be configured with: one group of SRS sets: $g_1$; in group $g_1$, two SRS sets $\{s_1, s_2\}$ are configured; and/or in each SRS sets of $\{s_1, s_2\}$, the UE can be configured with 4 SRS resources.

With this configuration, as shown in FIG. 18B, the UE C can apply the SRS resources in set $s_1$ to the Tx beams of panel 1-1, the SRS resources in set $s_2$ to the Tx beams of panel 1-2. For the UE in example in FIG. 18C, the UE D can be configured with: two groups of SRS sets: $g_1$ and $g_2$; in group gi, two SRS sets $\{s_1, s_2\}$ are configured. In group $g_2$, one SRS sets $\{s_3\}$ are configured; and/or in each SRS sets of $\{s_1, s_2, s_3\}$, the UE can be configured with 4 SRS resources.

With this configuration, the UE D can apply the SRS resources in set sito the Tx beams of panel 1-1, the SRS resources in set $s_2$ to the Tx beams of panel 1-2, the SRS resources in set $s_3$ to the Tx beams of panel 2.

To support the above configurations, a UE can be requested to report the information on the number of transmit chains, the number transmit panels connected to each transmit chain that the UE may switch between and the number of Tx beams on each panels. For example, the UE B in example of FIG. 18A can report: the number of Tx chain is 2, the number of transmit panels connected to one transmit chain is 2 and the number of Tx beam on each transmit panel is 4. For example, the UE D in example of FIG. 18C can report: the number of Tx chain is 2, the number of transmit panels connected to one chain is 2 and the number of transmit panel connected to another chain is 1, the number of Tx beam on each panel is 4.

In one embodiment, the UE can be requested to report one or more of the following information. In one example of number of groups of SRS sets, this is about the information of how many transmit chain the UE has. For example, in the example of FIG. 18B, the UE C can report number of group of SRS sets is 2.

In one example of number of SRS sets in each group, this is about the information of how many antenna panel the UE can switch for one transmit chain. In the example of FIG. 18C, the UE C can report number of SRS set for a group is 2 and number of SRS set for another group is 1.

Number SRS resources in each SRS set; In the example of FIG. 18C, the UE can report the number of SRS resource in a SRS set is 4.

The information on number of groups/sets/SRS resources can be used by the system to properly configure the SRS transmission for uplink beam management. Different UE can have different antenna implementation. The provided embodiment can cover all the possible UE antenna implementation scenarios.

One slot can only accommodate limited number of SRS resources. For example, there are totally 14 symbols in one slot and only the last 6 symbols can be used for SRS transmission, as defined in NR specification. The configuration parameters of an aperiodic SRS include starting OFDM symbol and the number of OFDM symbol (e.g., 1, 2 or 4 in NR specification). The transmission of aperiodic SRS is triggered by SRS request field in a DCI and each SRS request filed value corresponds to one or multiple SRS resource sets configured in associated higher layer parameter aperiodicSRS-Resource Trigger Generally the triggering DCI is sent at slot n and then the triggered SRS resources are sent in slot n+m, where m is called as slot offset and configured per SRS resource set. All these design restrict more than N (for example N=6) SRS resources within one SRS set may not configured for uplink beam management.

However, the assumption of design of SRS for uplink beam management is: the SRS resources in one set are used to implement one round of beam sweeping. However, in some case, there may be more Tx beams for one round of beam sweeping. That would mostly happen for those CPE-type, pad-type and laptop-type UE, where more Tx beam can be formulated generally. Then the issue is how to support beam sweeping for those UEs.

To resolve the above issue, one solution is to use the embodiments and embodiments provided in previous section in this disclosure. In one example, the restriction of SRS resource number is N=6 and a UE E has 16 Tx beams on one Tx panel. For this UE, the SRS can be configured for uplink beam management according to the embodiment provided in this disclosure as follows. The gNB configures 3 sets of SRS resources for uplink beam management. It can be further configured that the SRS resources from any two of these three sets cannot be transmitted simultaneously.

In one embodiment, the gNB can configure these three SRS sets in the same group of SRS set, which can implicitly indicate the UE that the SRS resources from any two of these three sets cannot be transmitted simultaneously. Two SRS sets have 6 SRS resources and the other SRS resource set has 4 SRS resources. Based on the configuration, the UE can apply those 16 Tx beams of one Tx panel to all those 16 SRS resources configured in those three SRS sets. When triggering those three sets, the different slot offset can be configured for them and then the UE can transmit all those 16 SRS resources in three different slots to complete one round of beam sweeping.

Another embodiment to resolve the above issue is providing some new triggering embodiments so that more than N SRS resources can be configured in one set and thus one complete round of beam sweeping with more Tx beam directions may be finished for training.

In one embodiment, one or multiple slot offset can be configured to one SRS set for uplink beam management. Assume the maximal number of SRS resources in one slot is N. If the number of SRS resources in one set for uplink beam management is less than or equal to N, one slot offset is configured to the SRS resource set. If the number of SRS resources in one set for uplink beam management is larger than N, then two or more slots offsets may be configured to the SRS resource set.

A first configured slot offset is applied to the first N SRS resources in that set and a second configured slot offset is applied to the second N SRS resources in that set. When this SRS set is triggered, each SRS resource is transmitted in the slot with corresponding configured slot offset. The number of slots offset configured to a SRS set can be $$N_{off} = \left\lceil \frac{N_{SRS}}{N} \right\rceil$$

where N is the maximal number SRS resources for uplink beam management that can be transmitted in one slot, $N_{SRS}$ is the number of SRS resources configured in the SRS set for uplink beam management and then $N_{off}$ is the number of slot offsets configured to that set.

In one example, the restriction of number of SRS in one slot is N=6 and assume the UE has 16 Tx beams. The gNB can configure one SRS set with 16 SRS resources $\{srs_1, srs_2, srs_{16}\}$ and three slots offsets $\{O_1, O_2$ and $O_3\}$ for the set. The UE can be requested to assume the first slot offset $O_1$ is applied to the first N=6 SRS resources $\{srs_1, srs_2, \ldots, srs_6\}$, and the second slot offset $O_2$ is applied to the second N=6 SRS resources $\{srs_7, srs_8, \ldots, srs_{12}\}$, and the third slot offset $O_3$ is applied to the rest SRS resources $\{srs_{13}, srs_{14}, srs_{15}, srs_{16}\}$. At slot n, a DCI triggers the transmission of that SRS set. Then the UE can transmit the SRS resources $\{srs_1,$ $srs_2, \ldots, srs_6\}$ at slot $n+O_1$, and transmit the SRS resources $\{srs_7, srs_8, \ldots, srs_{12}\}$ at slot $n+O_2$ and transmit the SRS resources $\{srs_{13}, srs_{14}, srs_{15}, srs_{16}\}$ at slot $n+O_3$.

In one alternative for the embodiment, the slot offset for one SRS set can be configured as one absolute slot offset and one or multiple differential slot offset. In previous example, the UE can be configured with one slot offset $O_1$ and two differential slot offset $\Delta O_2$ and $\Delta O_3$. The UE can assume the slot offset for the first N=6 SRS resources $\{srs_1, srs_2, \ldots, srs_6\}$ is configured $O_1$ and the differential slot offset $\Delta O_2$ is slot offset between the transmission of first N=6 SRS resources $\{srs_1, srs_2, \ldots, srs_6\}$ and the second N=6 SRS resources $\{srs_7, srs_8, \ldots, srs_{12}\}$, and the differential slot offset $\Delta O_3$ is slot offset between the transmission of the second N=6 SRS resources $\{srs_7, srs_8, \ldots, srs_{12}\}$ and the rest SRS resources $\{srs_{13}, srs_{14}, srs_{15}, srs_{16}\}$. At slot n, a DCI triggers the transmission of that SRS set. Then the UE can transmit the SRS resources $\{srs_1, srs_2, \ldots, srs_6\}$ at slot $n+O_1$, and transmit the SRS resources $\{srs_7, srs_8, \ldots, srs_{12}\}$ at slot $n+O_1+\Delta O_2$ and transmit the SRS resources $\{srs_{13}, srs_{14}, srs_{15}, srs_{16}\}$ at slot $n+O_1+\Delta O_2+\Delta O_3$.

In some scenarios, a UE has extra transmit power limitation on some transmit beam directions for example due to regulation requirement. In one example, a UE can have $N_s$=8 Tx beam directions and the configured transmit power is $P_{CMAX}$. Due to the regulation on transmit power limitation on some particular transmit beam directions, the UE can be further configured with transmit power backoff for one or more transmit beam directions. For example, the UE can be configured with power back off $P_{backoff\Delta}$ for some transmit beam direction i. Then if the UE transmits any uplink signals on beam direction i, the UE may apply the configured power back off $P_{backoff\Delta}$ when calculating the uplink transmit power for those uplink signals.

In such scenarios, the system would meet an issue of Tx beam indication for UE uplink transmission. For a UE with beam correspondence, the gNB can indicate the UE to use one "best" downlink beam for the uplink transmission and the gNB can select the best downlink beam based on the beam reporting. However, the reported best Tx beam by UE only means the best beamforming gain and does not mean the best beamforming is the best Tx beam for uplink transmission due to the power limitation on that beam direction. To resolve this issue, the UE may be requested to take into account the power backoff on some particular Tx beam direction.

In one embodiment, a UE can be configured to select and report Tx beams with adjusted L1-RSRP. The adjusted L1-RSRP measurement can be calculated with the measured L1-RSRP of one TRP Tx beam and the power backoff configured to the UE Tx beam direction that corresponds to the UE Rx beam used to receive this reported TRP Tx beam. In one example, the adjusted L1-RSRP of one reported TRP Tx beam can be calculated as: if the UE Tx beam corresponding to the UE Rx beam used to receive this TRP Tx beam is configured with power backoff $P_{backoff\Delta}$, then the adjusted L1-RSRP is =measured L1-RSRP$-P_{backoff\Delta}$; and if the UE Tx beam corresponding to the UE Rx beam used to receive this reported TRP Tx beam is not configured with power backoff, then the adjusted L1-RSRP=measured L1-RSRP.

A UE can be configured with a CSI-ReportConfig with a higher layer parameter reportquantity set to "csi-adjusted RSRP" or "ssb-Index-adjusted RSRP" to indicate that the UE may report adjusted L1-RSRP that is calculated based on measured L1-RSRP and the power backoff configured to particular UE Tx beam direction. With such reporting configuration, the UE can be configured to measure a set of CSI-RS resources and report one or more selected CRI (CSI-RS resource indicator) and the information of their corresponding adjusted L1-RSRP values. The UE can be configured to measure a set of SS/PBCH blocks and reports one or more SSBRI (SS/PBCH block indicator) and the information of their corresponding adjusted L1-RSRP values.

In one embodiment, the UE can be configured to measure one or multiple CSI-RS resources and/or SS/PBCH blocks. The UE can first measure the L1-RSRP of those configured CSI-RS resources and/or SS/PBCH blocks. Then the UE can adjust each measured L1-RSRP according power limitation configured to the UE Tx beam corresponding to the UE Rx beam used to measure that L1-RSRP. Then the UE can select CSI-RS resources and/or SS/PBCH blocks based on the adjusted L1-RSRP. If the UE is configured to report one CRI (or SSBRI), the UE can report the adjusted L1-RSRP of the selected CRI (or SSBRI). If the UE is configured to report multiple CRIs (or SSBRIs), the UE can report the largest adjusted L1-RSRP and differential value of the adjusted L1-RSRP of other reported CRIs (or SSBRIs). The differential value is calculated with a reference to the largest adjusted L1-RSRP.

In some embodiments, a UE can be configured with a one-beam operation mode. When one-beam operation mode is configured, the UE can assume one same Tx beam is used for all the transmission of PDCCH and PDSCH, and the UE can assume one same UE Tx beam may be used for all the transmission of PUSCH and PUCCH.

The aforementioned embodiment is useful for millimeter-wave (mmWave) system to simplify the system operation. In an mmWave, most likely the best analog Tx beam might be the same for all the carriers and all the channel in the same band. Therefore, using separate signaling to configure or indicate the Tx beam for each PDCCH, each PDSCH, each PUSCH and each PUCCH might not be necessary. Using a one-beam operation mode can drastically reduce the system operation complexity and the overhead of control signaling and thus higher data throughput can be expected.

When a UE is configured with one-beam operation mode, following alternatives for UE operation is provided.

In one example, the UE can assume one same configured/indicated TRP Tx beam a is used for all the transmission of PDCCH and PDSCH. The UE can also assume the UE Tx beam corresponding to the Rx beam that is used to receive the configured/indicated TRP Tx beam a to transmit all the transmission of PUSCH and PUCCH.

In another example, the UE can be configured with a TRP Tx beam $a_1$ and a UE Tx beam $b_1$. The UE can assume to the TRP Tx beam $a_1$ is used to transmit all the PDCCH and PDSCH and the UE can assume to use UE Tx beam $b_1$ to transmit PUSCH and PUCCH.

In yet another example, the UE can assume all the PDCCH are transmitted with one same configured TRP Tx beam $a_1$ and all the PDSCH are transmitted with one same configured TRP Tx beam $a_2$.

In yet another example, the UE can assume to transmit all the PUSCH with one configured UE Tx beam $b_1$ and transmit all the PUCCH with one configured UE Tx beam $b_2$.

In yet another example, the UE can assume one same TRP Tx beam used for all the PDSCH transmission and the corresponding UE Tx beam used for all the PUSCH transmission.

In yet another example, the UE can assume one same TRP Tx beam used for all the PDCCH transmission and the corresponding UE Tx beam used for all the PUCCH transmission.

In one embodiment, a UE can be configured with a high layer parameter one-beam-operation-mode for example, in RRC. The value of one-beam-operation-mode being set to "On" can indicate that the UE may be in a one beam operation mode. The UE can assume a same QCL Type-D for all the UE-specific control resource sets in the bandwidth parts of a serving cell. The UE can assume a same QCL Type-D for all the UE-specific control resource sets and all the UE-specific PDSCH in the bandwidth parts of a serving cell. The UE can be configured with one reference signal ID (for example, one CSI-RS resource index, or one SS/PBCH block index) as the QCL Type-D source for this one-beam operation mode. The UE can assume the configured RS ID is the QCL type-D for all the UE-specific control resource sets and all the UE-specific PDSCH in the bandwidth parts of a serving cell. The UE can assume the configured RS ID is the spatial relation source for all the PUSCH transmission and all the PUCCH resources in the bandwidth parts of a serving cell.

In one example, if the one-beam operation mode is configured "On," the UE can be configured with one RS ID as the Tx beam information for PDCCH and PUCCH. The UE may assume the configured RS ID is the source of QCL Type-D for all the control resource sets for monitoring PDCCH in the bandwidth parts of a serving cell and the UE may assume the configured RS ID is the source of spatial Relation for transmission in all the PUCCH resources in the bandwidth parts of a serving cell.

In one example, if the one-beam operation mode is configured "On," the UE can be configured with one RS ID as the Tx beam information for PDSCH and PUSCH. The UE may assume that configured RS ID is the source of QCL Type-D for the DM-RS of all the UE-specific PDSCH in the bandwidth parts of a serving cell and the UE may assume that configured RS ID is the source of spatial Relation for transmission in all the PUSCH transmission in the bandwidth parts of a serving cell.

The RS ID can be configured through RRC message. The RS ID can be indicated in a MAC-CE message.

In wireless communication, the gNB can transmit one or multiple CSI-RS resources for UE to measure the Tx beam quality carried by those CSI-RS resources. In one example, the gNB can transmit multiple CSI-RS resources and apply different Tx beams on those different CSI-RS resources and then the UE can measure L1-RSRP (or L1-RSRQ, or SINR) of those CSI-RS resources and then reports the CSI-RS resource index that has the largest measurement metric. In another example. The gNB can repeat the transmission of one same Tx beam so that the UE can measure the quality of multiple different Rx beams with respect to the same Tx beam so that the UE can find the best Rx beam for this selected Tx beam. In this section, a new embodiment is provided so that the gNB can efficiently implement this function with least signal resource.

In one embodiment, a UE can be configured with a parameter, noneFDM, for one CSI-RS resource configuration A to indicate whether other signals are multiplexed in the same OFDM symbol where this CSI-RS resource A is transmitted. If a UE is configured that one the symbols where CSI-RS resource A is transmitted, no other signals are transmitted, the UE can use a time-domain property of those symbols to implement the function of Rx beam refinement.

For example for a CSI-RS resource with one port and density=3 RE/RB/port, the OFDM symbol where CSI-RS resource is transmitted can be partitioned into 4 repetition and the UE can apply different Rx beam on those repetition to measure the quality of different Rx beam with respect to the same Tx beam carried by this CSI-RS resource.

In one embodiment, a parameter for which the UE may assume non-zero transmission power for CSI-RS resource are configured via higher layer parameter NZP-CSI-RS-Resource for each CSI-RS resource configuration: nonFDM, this parameter can define whether other downlink signals are multiplexed on the same OFDM symbol where this CSI-RS resource is transmitted.

In one example, if this parameter is set "On," the UE can assume no other downlink signals are multiplexed in the same OFDM symbol where this CSI-RS resource is sent.

In one example, the UE can expect that only CSI-RS resource with 1 port can be configured with the parameter nonFDM set to "On." The technical reason is because CSI-RS resource with 2 or more ports cannot result in the property of repetition in time domain. Therefore, it does not make sense to configure this parameter to the CSI-RS resource with 2 or more ports to implement this feature.

In one embodiment, a UE can be configured with a set of non-zero power CSI-RS resources and this set can be configured with a parameter nonFDM. When the parameter nonFDM is set to "On," the UE may assume that on the symbols where the CSI-RS resources within this CSI-RS resource set are transmitted, no other downlink signals are transmitted within the bandwidth part of that corresponding CSI-RS resource. The UE can expect the CSI-RS resources within a set configured with nonFDM being set to "On" can only be configured with one port.

In one implementation example, the gNB can configure multiple CSI-RS resource with 1 port on the same OFDM symbol and those CSI-RS resources are mapped to different REs (resource elements). Different frequency domain location offset are configured to those CSI-RS resources so that the REs occupied by those CSI-RS resources are evenly scattered along frequency domain. In one example, 3 CSI-RS resources $\{i_1, i_2, i_3\}$ with 1 port and density 1 RE/RB/port may be configured on the same OFDM symbol. For CSI-RS resources $\{i_1, i_2, i_3\}$, the frequency domain offset k=0, 4, and 8 is configured for them, respectively.

With such configuration, every 4 REs are occupied by CSI-RS and the REs occupied by CSI-RS signals are evenly scattered along frequency domain. If no other signals are transmitted on this symbol, then this OFDM symbol has 4 repetitions in time domain. TABLE 2 shows examples for such a configuration.

TABLE 2

| Configuration | | | |
|---|---|---|---|
| Configuration index | Number of CSI-RS resources | Density | Frequency domain offsets |
| 0 | 1 | 1 | 0~12 |
| 1 | 2 | 1 | {0, 6}/{1, 7}/{2, 8}/{3, 9}/{4, 10}/{5, 11} |
| 2 | 3 | 1 | {0, 4, 8}/{1, 5, 9}/{2, 6, 10}/{3, 7, 11} |
| 3 | 4 | 1 | {0, 3, 6, 9}/{1, 4, 7, 10}/{2, 5, 8, 11} |

TABLE 2-continued

| Configuration | | | |
|---|---|---|---|
| Configuration index | Number of CSI-RS resources | Density | Frequency domain offsets |
| 4 | 1 | 3 | 0~12 |
| 5 | 2 | 3 | {0, 2}/{1, 3} |
| 6 | 1 | ½ | Any REs offset allowed in the spec |
| 7 | 2 | ½ | 12 REs separation between frequency offset |
| 8 | 3 | ½ | 8 REs separation between frequency offset |
| 9 | 4 | ½ | 6 REs separation between frequency domain offset |
| 10 | 6 | ½ | 4 REs separation between frequency domain |
| 11 | 8 | ½ | 3 REs separation between frequency domain |

In one embodiment, a UE can be configured with a set of non-zero power CSI-RS resources and this set can be configured with a parameter nonFDM. All the CSI-RS resources within this set is configured with port=1. When the parameter nonFDM is set to "On," the UE may assume the following transmission status: on the symbols where the CSI-RS resources within this CSI-RS resource set are transmitted, no other downlink signals are transmitted within the bandwidth part of the CSI-RS within this set; and on each OFDM symbol where one or more CSI-RS resources within this set are transmitted, the UE can assume only one or more CSI-RS resource signal are transmitted and the UE can assume no other signals are transmitted. The other signals include all the PDSCH, all the PDCCH, all DM-RS, TRS, PT-RS, SS/PBCH block and CSI-RS resources configured in any other CSI-RS resource sets.

For semi-persistent CSI-RS, one embodiment to configure the parameter nonFDM is through RRC signaling. Another embodiment to configure the parameter nonFDM is through the MAC-CE activation message. In one embodiment, in the MAC-CE activation message that activates the transmission of a set of CSI-RS resources, a parameter nonFDM can be signaled for the activated CSI-RS resource set. In another embodiment, in the MAC-CE activation message that activates the transmission of a set of CSI-RS resources, the parameter nonFDM can be indicated for each of the CSI-RS resource within the activated CSI-RS resource set.

For aperiodic CSI-RS, one embodiment to configure the parameter nonFDM is through RRC signaling and another embodiment to configure the parameter is through the triggering DCI (downlink control information element). In one embodiment, for a CSI triggering state configured in higher layer, the parameter nonFDM may be configured to each CSI-RS resource set associated with this CSI triggering state. When this triggering state is triggered in one DCI, the UE can read the value of parameter nonFDM configured to the CSI-RS resource set associated with the triggering state indicated in the DCI.

Figure 20:
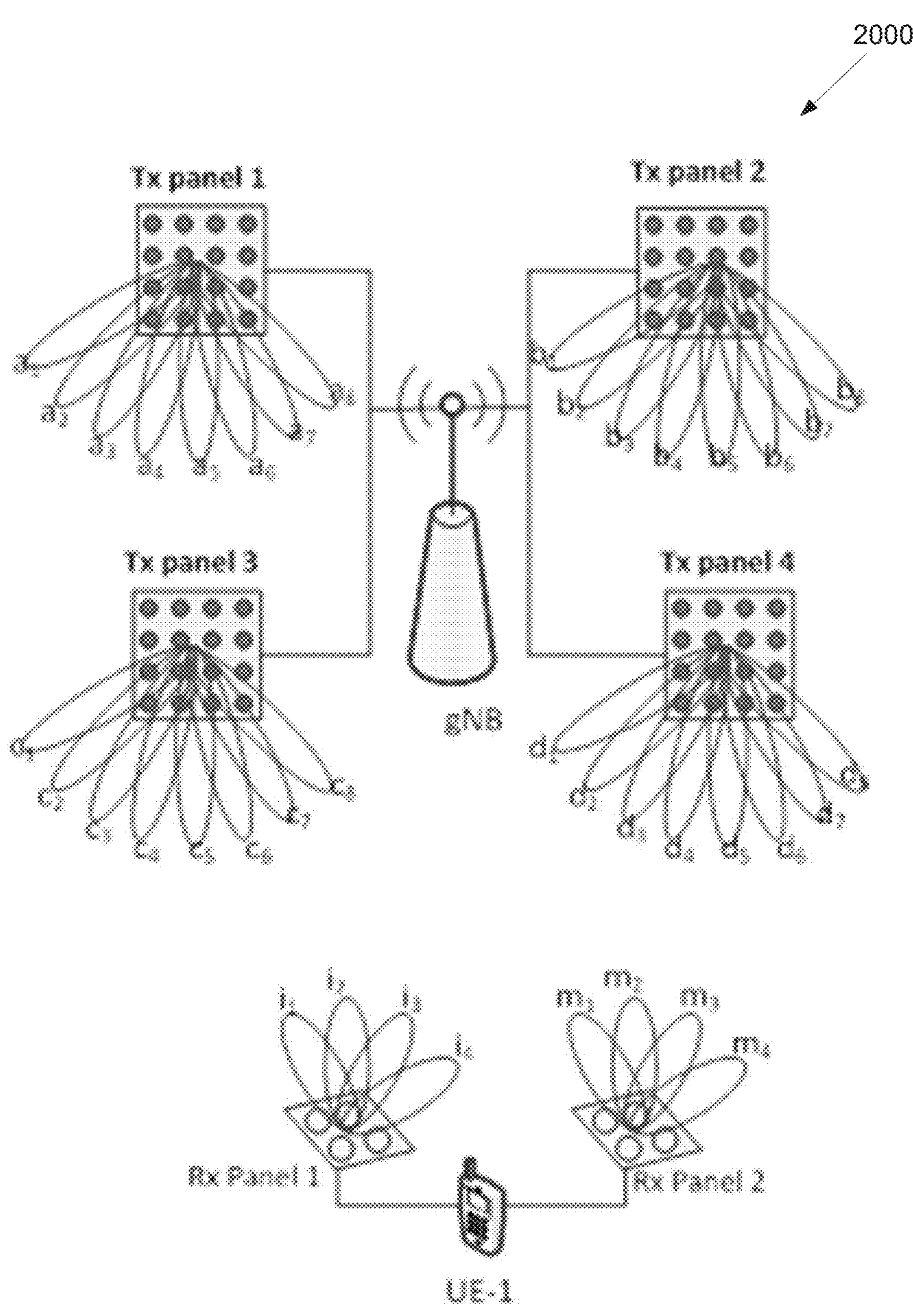
FIG. 20 illustrates another example multi-beam operation scenario according to embodiments of the present disclosure.
Figure 21:
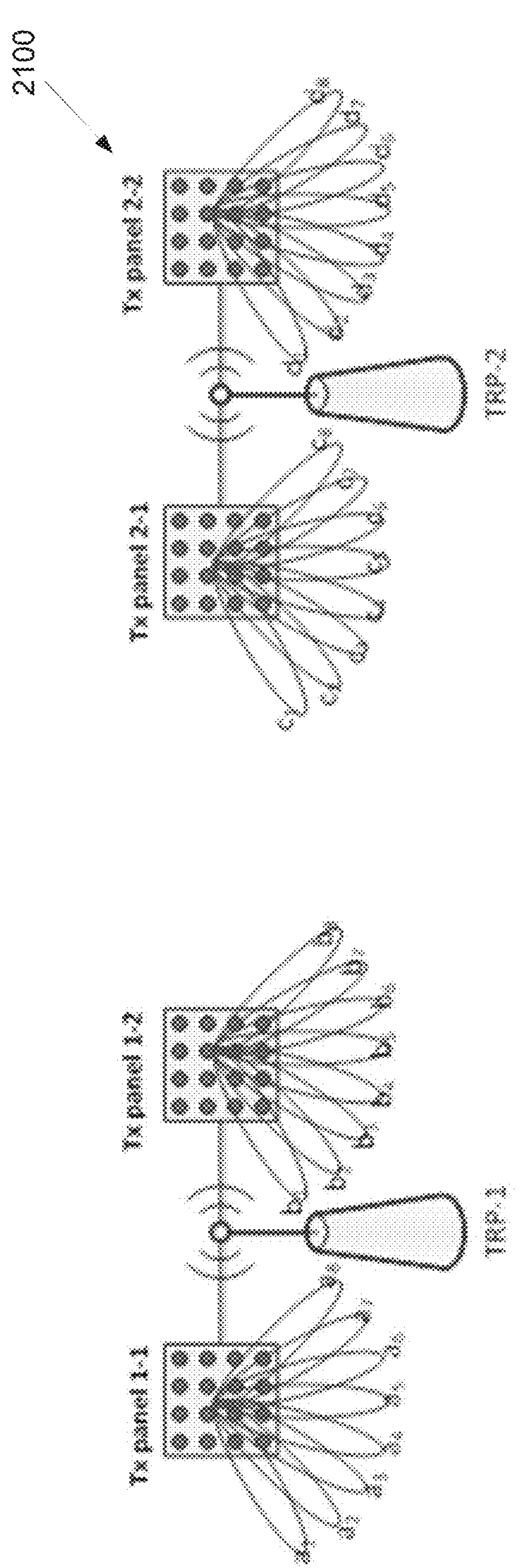
FIG. 21 illustrates yet another example multi-beam operation scenario according to embodiments of the present disclosure.
Figure 21:
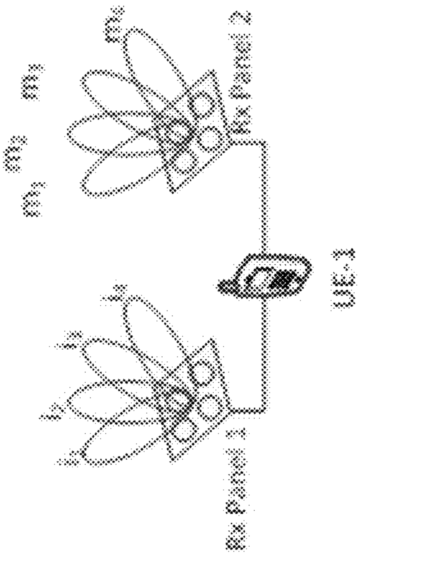

In mmWave wireless communications, a gNB and a UE generally have one or more antenna panels. On each antenna panel, the gNB and the UE can formulate multiple analog beam directions. For the communication between gNB and one UE, one Tx beam may be selected from each panel of gNB and one Rx beam from each panel of UE. And the gNB is going to use the selected "best" Tx beams to transmit signal, for example, control channel PDCCH and data transmission PDSCH, some reference signals CSI-RS and the UE is going to use the selected "best" Rx beam to receive those signals. A few examples for such scenarios are shown in FIGS. 19-21.

Figure 19:
FIG. 19 illustrates an example multi-beam operation scenario according to embodiments of the present disclosure.
Figure 19:
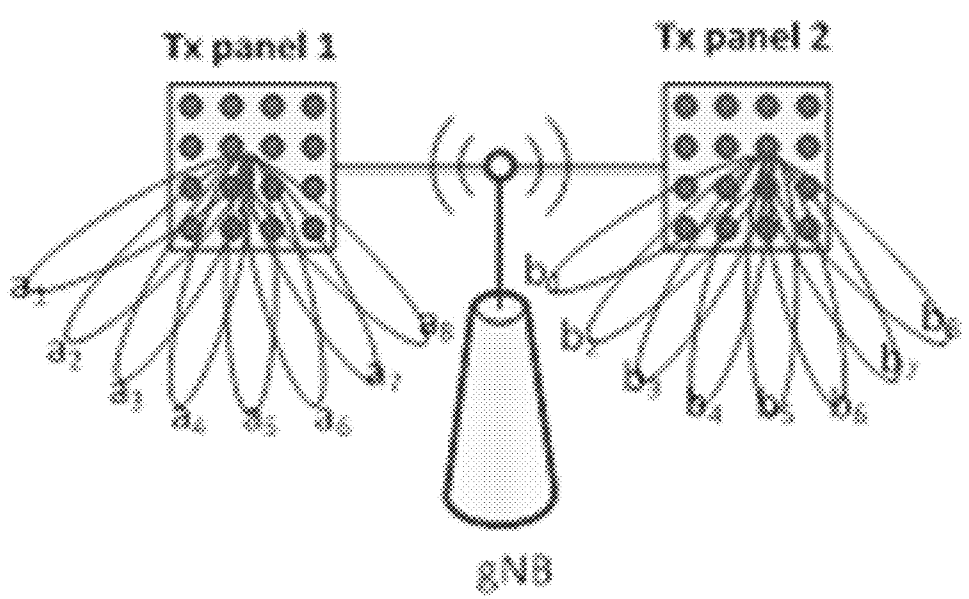
Figure 19:
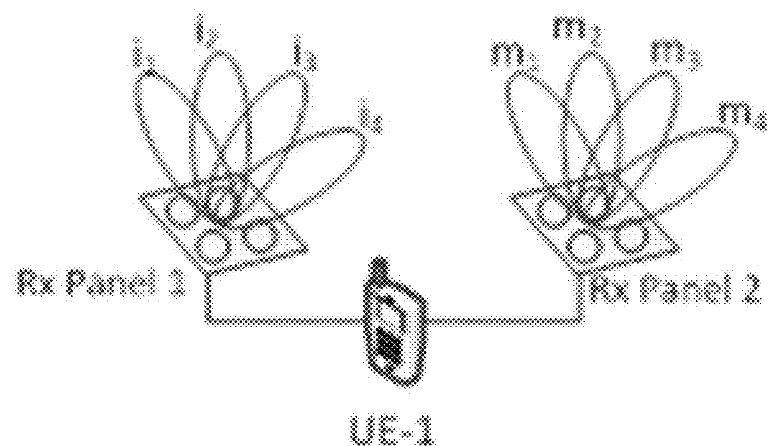

In FIG. 19, a gNB has two transmit panels (Tx panel): Tx panel 1 and Tx panel 2. On each of panels, the gNB can formulate multiple transmit beams. A UE-1 has two receive panels (Rx panel): Rx panel 1 and Rx panel 2. On each Rx panel, the UE-1 can formulate multiple different receive beams. For the transmission from gNB to UE-1, the gNB can select one Tx beam from Tx panel 1 and one Tx beam from Tx panel 2 to transmit the signals that are targeted to UE-1. And the UE-1 can choose one Rx beam from Rx panel 1 and one Rx beam from Rx panel 2 to receive the signal from the gNB. To transmit the signals, the gNB can use one Tx beam from only one of those two panels: Tx panel 1 and Tx panel 2 or use Tx beam from both panels. At the receiver side, the UE-1 can use one Rx from only one of those two panels or use two Rx beams from both panels (one Rx beam in each of those two Rx panels) to receive the signal.

FIG. 19 illustrates an example multi-beam operation scenario 1900 according to embodiments of the present disclosure. The embodiment of the multi-beam operation scenario 1900 illustrated in FIG. 19 is for illustration only. FIG. 19 does not limit the scope of this disclosure to any particular implementation.

Tx beams is selected among multiple available beam directions on one panel. In the example of FIG. 19, there are totally 8 available Tx beam directions on Tx panel 1: $\{a_1, a_2, \ldots, a_8\}$ and there are totally 8 available Tx beam directions on Tx panel 2: $\{b_1, b_2, \ldots, b_8\}$. There are totally 4 available Rx beam directions on Rx panel 1 of UE-1: $\{i_1, i_2, \ldots, i_4\}$ and totally 4 Rx beam directions on Rx panel 2 of UE-1: $\{m_1, m_2, \ldots, m_4\}$. For the transmission from gNB to UE-1, it may be used to one from $\{a_1, a_2, \ldots, a_8\}$ and one from $\{b_1, b_2, \ldots, b_8\}$ and the UE-1 needs to select one from $\{i_1, i_2, \ldots, i_4\}$ and one from $\{m_1, m_2, \ldots, m_4\}$.

To enable selecting the beams, the gNB can transmit some reference signals from different Tx beam direction for the UE-1 to measure and then the UE-1 can select the "best" Tx beam and also select the "best" Rx beams.

FIG. 20 illustrates another example multi-beam operation scenario 2000 according to embodiments of the present disclosure. The embodiment of the multi-beam operation scenario 2000 illustrated in FIG. 20 is for illustration only. FIG. 20 does not limit the scope of this disclosure to any particular implementation.

As illustrated in FIG. 20, the gNB has four Tx panels and there are multiple Tx beam directions available on each Tx panel. The gNB can select and use one Tx beam from each Tx panel for signal transmission.

FIG. 21 illustrates yet another example multi-beam operation scenario 2100 according to embodiments of the present disclosure. The embodiment of the multi-beam operation scenario 2100 illustrated in FIG. 21 is for illustration only. FIG. 21 does not limit the scope of this disclosure to any particular implementation.

As illustrated in FIG. 21, the gNB have two TRPs and each TRP has two Tx panels and there are multiple Tx beam directions available on each Tx panel. The gNB can select and use one Tx beam from each Tx panel of each TRP for signal transmission.

The UE can measure and report the RSRQ (reference signal received quality) of one Tx beam. The RSRQ can also be called L1-RSRQ. The UE can measure and report the SINR (signal to interference and noise ratio) of one Tx beam. The SINR can also be called L1-SINR.

In one embodiment, a UE can be configured to measure to measure M (for example=16) Tx beams and then reports N (for example=2) selected Tx beams and the corresponding SINR measurement. The UE can measure SINR by assuming N data stream are transmitted with the selected N Tx beams and each data stream are transmitted with one of the selected Tx beams.

In one embodiment, a UE can be configured to measure M (for example=16) CSI-RS resources {CRI_RS1, CSI_RS2, . . . , CSI_RSM}. And the UE can be configured to report one or multiple sets of N (for example 2) selected CRIs and the corresponding SINR measurement that is measured by assuming each data stream is transmitted with the selected CRI. In one example, the UE can report two CRIs in one reported set $\{CRI_i, CRI_j\}$ and the UE also reports the SINR value that is calculated by assuming one data stream is sent with the same spatial domain transmit filter used to transmit $CRI_i$ and another data stream is sent with the same spatial domain transmit filter used to transmit $CRI_j$.

In one embodiment, a UE can be configured to measure M (for example=16) CSI-RS resources {CRI_RS1, CSI_RS2, . . . , CSI_RSM}. And the UE can be configured to report one or multiple ($N_{set}$) sets of selected CRIs and the corresponding SINR measurement that is measured from the selected CRI in the corresponding reporting set. The UE can be configured to report up to N CRIs in each reporting set. For one reporting set with $N_s$ (≤N) reported CRIs, the UE can measure the SINR based on the reported CRI(s) in that set and the SINR is calculated by assuming $N_s$ data streams are sent and each of those data streams is transmitted with the same spatial domain transmit filter used to transmit one of those reported CRI in the reporting set. In one example, a UE can be configured to report $N_{set}$=4 sets of selected CRIs and in each set, the UE can report up to N=2 CRIs. Then the UE can report: $\{CRI_{a1}, CRI_{a2}, SINR_1\}$, $\{CRI_{b1}, CRI_{b2}, SINR_2\}$,$\{CRI_{c1}, CRI_{c2}, SINR_3\}$,$\{CRI_{d1}, CRI_{d2}, SINR_4\}$, where the SINR is calculated as follows.

In one example, the SINR1 is the SINR value calculated by assuming a first data stream is sent with the same spatial domain transmit filter used to transmit $CRI_{a1}$ and a second data stream is sent with the same spatial domain transmit filter used to transmit $CRI_{a2}$.

In another example, the SINR2 is the SINR value calculated by assuming a first data stream is sent with the same spatial domain transmit filter used to transmit $CRI_{b1}$ and a second data stream is sent with the same spatial domain transmit filter used to transmit $CRI_{b2}$.

In yet another example, the SINR3 is the SINR value calculated by assuming a first data stream is sent with the same spatial domain transmit filter used to transmit $CRI_{c1}$ and a second data stream is sent with the same spatial domain transmit filter used to transmit $CRI_{c2}$.

In yet another example, the SINR4 is the SINR value calculated by assuming a first data stream is sent with the same spatial domain transmit filter used to transmit $CRI_{d1}$ and a second data stream is sent with the same spatial domain transmit filter used to transmit $CRI_{d2}$.

In yet another example, in one reporting set, the UE can report only one selected CRI. In this case, the UE calculate the SINR by assuming a first data stream is sent with the same spatial domain transmit filter used to transmit the reported CRI.

In one embodiment, a UE is configured to report up to N (for example=2) CRIs in one reporting set and the UE can only report one selected CRI for one reporting set, then the UE may report one special bit status to indicate that the corresponding CRI report bit-field is not used.

An example of reporting CRI and SINR for the configuration of $N_{set}$=4 sets of selected CRIs and in each set, the UE can report up to N=2 CRIs is shown in TABLE 3. In the TABLE 3, CRI#1 and #2 are reported CRI in a first reporting set and SINR#1 is the corresponding measured SINR value, CRI#3 and #4 are reported CRI in a second reporting set and SINR#2 is the corresponding measured SINR value, CRI#5 and #6 are reported CRI in a third reporting set and SINR#3 is the corresponding measured SINR value and CRI#7 and #8 are reported CRI in a forth reporting set and SINR#4 is the corresponding measured SINR value.

TABLE 3

| CRI report | |
|---|---|
| CSI report number | CSI fields |
| CSI report #n | CRI #1<br>CRI #2<br>CRI #3<br>CRI #4<br>CRI #5<br>CRI #6<br>CRI #7<br>CRI #8<br>SINR#1<br>SINR#2<br>SINR#3<br>SINR#4 |

If the UE selects less than N reported CRIs in one reporting set, the UE may report special value in the bit-field where no CRI is reported. For example, if the UE only selects one CRI for a forth reporting set, then the UE can report one CRI value in CRI #7 field and report one special value in the field of CRI #8 to indicate that no CRI is reported in the field of CRI #8, and the SINR value reported in the field of SINR #4 is calculated by assuming one data stream is sent with the same spatial domain transmit filter used to transmit CRI reported in field of CRI #7.

In one embodiment, the UE can be configured with two Resource settings, a first Resource setting and a second resource setting. The CSI-RS resources configured in a first Resource setting are used for channel measurement and the reference signal resources configured in a second Resource setting are used for interference measurement. The UE can be configured to report one or multiple ($N_{set}$) sets of up to N CRIs that are selected from the CRI-RS resources configured in a first Resource setting and the corresponding SINR measurement for each reported set. For each reporting set, the UE calculate the reported SINR by assuming one data stream is sent with the same spatial domain transmit filter used to transmit one of those reported CRIs and also measuring the interference from the associated RS resource configured in a second Resource setting.

In one embodiment, the UE can be configured with two Resource settings, a first Resource setting and a second resource setting. In each Resource setting, one or multiple CSI-RS resources are configured. The UE can be configured to report one or multiple ($N_{set}$) sets of up to N=2 CRIs and corresponding SINR measurement for each reporting set. In each reporting set, the UE can report one CRI selected from the CSI-RS resources configured in a first Resource setting or one CRI selected from the CSI-RS resources configured in a second Resource setting or two CRIs including one selected from the CSI-RS resources configured in a first Resource setting and another one selected from the CSI-RS resources configured in a second Resource setting. In each reporting set, the SINR is calculated by assuming one data stream is sent with the same spatial domain transmit filter used to send the reported CRI.

In one embodiment, the UE can be configured with three Resource settings, a first Resource setting and a second resource setting and a third resource setting. In each of a first Resource setting and a second resource setting, one or multiple CSI-RS resources are configured. In a third Resource setting, RS resources for interference measurement are configured. The UE can be configured to report one or multiple ($N_{set}$) sets of up to N=2 CRIs and corresponding SINR measurement for each reporting set. In each reporting set, the UE can report one CRI selected from the CSI-RS resources configured in a first Resource setting or one CRI selected from the CSI-RS resources configured in a second Resource setting or two CRIs including one selected from the CSI-RS resources configured in a first Resource setting and another one selected from the CSI-RS resources configured in a second Resource setting. In each reporting set, the SINR is calculated by assuming one data stream is sent with the same spatial domain transmit filter used to send the reported CRI and assuming interference is measured from the associated RS resource(s) configured in a third resource setting.

In one embodiment, a UE can be configured to measure two sets of CSI-RS resources, a first set of CSI-RS resources and a second set of CSI-RS resources.

In one example, the UE can be configured to report $N_1 \geq 1$ CRI pairs $\{CRI_a, CRI_b\}$ and the corresponding SINR value $SINR_{ab}$, where one of the two CRIs, $CRI_a$ is selected from a first set and $CRI_b$ is selected from a second set. For example $CRI_a$=n (n=0, 1,2, . . . ) indicates the (n+1)-th CSI-RS resource configured in a first set and $CRI_b$=n (n=0, 1,2, . . . ) indicates the (n+1)-th CSI-RS resource configured in a second set. The reported SINR value, $SINR_{ab}$, can be minimum SINR of SINR jointly measured from reported $CRI_a$, and $CRI_b$. The SINR can be jointly measured by aggregating the CSI-RS resource indicated by $CRI_a$ and CRI-RS resource indicated by $CRI_b$. In one instance, $SINR_{ab}$, can be average SINR of SINRs jointly measured from jointly measured from CSI-RS resource in a first set and CSI-RS resource set in a second set, which are indicated by the reported CRI. In another instance, $SINR_{ab}$, can be maximal SINR of SINRs jointly measured from jointly measured from CSI-RS resource in a first set and CSI-RS resource set in a second set, which are indicated by the reported CRI.

In another example, the UE can be configured to report $N_1 \geq 1$ CRI pairs $\{CRI_a, CRI_b\}$ and the measured SINR of reported CRIs $\{SINR_a, SINR_b\}$, where SINRa is the SINR measured from CRIa and $SINR_b$ is the SINR measured from $CRI_b$. The SINR can be jointly measured by aggregating the CSI-RS resources indicated by $CRI_a$ and CRI-RS resource indicated by $CRI_b$.

In yet another example, the $SINR_a$ and $SINR_b$ can be measured separately from each CSI-RS resource.

In one embodiment, for two selected CSI-RS resource, $CRI_a$ from a first set and $CRI_B$ from a second set, the UE can calculate the SINR as follows: the UE can calculate the SINR of, $CRI_a$, CSI-RS resource selected from a first set by assuming interference measurement from, $CRI_b$, CSI-RS resource selected from a second set; and/or the UE can calculate the SINR of, $CRI_b$, CSI-RS resource selected from a second set by assuming interference measurement from, $CRI_a$, CSI-RS resource selected from a first set.

In one embodiment, a UE can be configured to measure two sets of CSI-RS resources, a first set of CSI-RS resources and a second set of CSI-RS resources.

In one example, the UE can be configured to report $N_1 \geq 1$ CRIs and the corresponding SINR value $SINR_{ab}$. Where each CRI indicates CSI-RS resources in both CSI-RS resource sets. For example CRI=n (n=0, 1,2, . . . ) indicates the (n+1)-th CSI-RS resource configured in a first set and the (n+1)-th CSI-RS resource configured in a second set.

In another example, the reported SINR value, $SINR_{ab}$, can be minimum SINR of SINR jointly measured from CSI-RS resource in a first set and CSI-RS resource set in a second set, which are indicated by the reported CRI. In one instance, $SINR_{ab}$, can be average SINR of SINRs jointly measured from jointly measured from CSI-RS resource in a first set and CSI-RS resource set in a second set, which are indicated by the reported CRI. In another instance, $SINR_{ab}$, can be maximal SINR of SINRs jointly measured from jointly measured from CSI-RS resource in a first set and CSI-RS resource set in a second set, which are indicated by the reported CRI.

In one example, the SINR can be jointly measured by aggregating the CSI-RS resources in a first set and in a second set, which are indicated by the reported CRI.

In one example, the UE can report CRI and the corresponding two SINR values, $\{SINR_a, SINR_b\}$, where SINRa is the SINR measured from CSI-RS resource in a first set indicated by the reported CRI and $SINR_b$ is the SINR measured from CSI-RS resource in a second set indicated by the reported CRI. The SINR can be jointly measured by aggregating the CSI-RS resources in a first set indicated by CRI and CRI-RS resource in a second set indicated by CRI.

In one example, the $SINR_a$ and $SINR_b$ can be measured separately from each CSI-RS resource.

For the aforementioned measurement and reporting embodiments, a UE can be configured with a Reporting setting with parameter Reportquantity set to "CRI-jointSINR," And the UE can be configured with two Resource setting linked to that reporting setting. In each of these two Resource setting, CSI-RS resources or SS/PBCH blocks are configured for channel measurement.

For the above measurement and reporting embodiment, a UE can be configured with a Reporting setting with parameter Reportquantity set to "CRI-jointSINR." And the UE can be configured with three Resource setting linked to that reporting setting. In each of first two Resource setting, CSI-RS resources or SS/PBCH blocks are configured for channel measurement. In a third resource setting, CSI-IM resource or CSI-RS resources can be configured for interference measurement.

In one embodiment, a UE can be configured to measure M (for example=16) Tx beams and then reports N (for example=4) selected Tx beam IDs and their corresponding L1-RSRQ (reference signal received quality). A UE can be configured to measure M (for example=16) Tx beams and then reports N (for example=4) selected Tx beam IDs and their corresponding L1-SINR (signal to interference and noise ratio).

A UE can be configured with a CSI-ReportConfig with the higher layer parameter reportQuantity set to "cri-RSRQ" or "SSBRI-RSRQ." With this configuration, the UE can be configured to measure M CSI-RS resources or SS/PBCH blocks and then the UE may report N CRI (CSI-RS resource indicator) or SSBRI (SS/PBCH block resource indicator) and/or the L1-RSRQ measurement of the reported CRI or SSBRI. For L1-RSRQ based measurement and reporting, the UE can be configured with one Resource Setting for channel measurement for L1-RSRQ computation.

In one embodiment, the UE can report N selected CRIs (L1-SSBRIs) and the corresponding RSRQ values. Examples of mapping order of CSI fields for one report of N=3 selected CRIs/SSBRIs and L1-RSRQ report are listed in TABLE 4 and TABLE 5.

TABLE 4

| CSI report # | |
|---|---|
| CSI report number | CSI fields |
| CSI report #n | CRI or SSBRI #1<br>CRI or SSBRI#2<br>CRI or SSBRI #3<br>RSRQ #1<br>RSRQ#2<br>RSRQ#3 |

TABLE 5

| CSI report # | |
|---|---|
| CSI report number | CSI fields |
| CSI report #n | CRI or SSBRI #1<br>RSRQ#1<br>CRI or SSBRI #2<br>RSRQ #2<br>CRI or SSBRI #3<br>RSRQ#3 |

The UE can use a NB-bit to represent one RSRQ value.

In one embodiment, in a report with more than RSRQ values, the UE can report absolute RSRQ value for the largest RSRQ value and differential RSRQ for all the other reported RSRQ values. And the differential RSRQ value is calculated with reference to the largest reported RSRQ value. In one embodiment, reported RSRQ and differential RSRQ can use different bitwidth. For example, one RSRQ value use 6 bits and one differential RSRQ value can use 4 bit. In one embodiment, reported RSRQ and differential RSRQ can use different step size. For example, one RSRQ value use 0.5 dB as step size and one differential RSRQ value can use 0.25 dB (or 1 dB) as step size. In one embodiment reported RSRQ and differential RSRQ can use same step size.

A UE can be configured with a CSI-ReportConfig with the higher layer parameter reportQuantity set to "cri-SINR" or "SSBRI-SINR." With this configuration, the UE can be configured to measure M CSI-RS resources or SS/PBCH blocks and then the UE may report N CRI (CSI-RS resource indicator) or SSBRI (SS/PBCH block resource indicator) and/or the L1-SINR measurement of the reported CRI or SSBRI. For measuring L1-SINR for beam measurement and reporting, there can exist the following embodiments for different use cases and scenarios.

In one example, the UE can measure the SINR of each Tx beam with respect to the background interference and noise.

In another example, the UE can measure the SINR of one Tx beam with respect to another Tx beam. One useful use case for this embodiment is the multi-TRP case. The UE can find the best serving Tx beam with an interfering Tx beam from another TRP.

In yet another example, the UE can measure the SINR of one Tx beam with respect to multiple Tx beams. Then the UE can report the ID of interference beam that gives the best SINR.

In yet another example, the UE can measure the SINR of multiple Tx beam with respect to one Tx beams. Then the UE can report the ID(s) of Tx beam(s) that gives the best SINR.

In yet another example, the UE can measure the SINR of multiple Tx beams and for each Tx beam, one interfering beam is configured. Then the UE can measure the L1-SINR of each Tx beam pair and then reports the best one or multiple Tx beam with best L1-SINR.

In one embodiment, the UE can be configured with one Resource setting for channel measurement for L1-SINR computation, which is linked to a CSI-ReportConfig with the higher layer parameter reportQuantity set to "cri-SINR" or "SSBRI-SINR." In the Resource setting, there can be one or more CSI-RS resource sets and in each CSI-RS resource set, there can be one or more CSI-RS resources and/or SS/PBCH blocks. For each configured CSI-RS resource or SS/PBCH block, the UE may measure the SINR from the CSI-RS resource or SS/PBCH block itself. The UE can report one or more CRI (CSI-RS resource indicator) or SSBRI and their corresponding SINR measurement.

In another embodiment, the UE can be configured with two resource setting for SINR computation, which are linked to CSI-ReportConfig with the higher layer parameter reportQuantity set to "cri-SINR" or "SSBRI-SINR." Among those two resource settings, the first one resource setting is for channel measurement the second one resource setting is for interference measurement. In the second one resource setting, there can be one or multiple CSI-IM (interference measurement) resources or non-zero power CSI-RS resources. And each CSI-RS resource set in the first one resource setting is linked to one CSI-IM resource or one non-zero power CSI-RS resource in the second one resource setting. When measuring SINR for one CRI or SSBRI, the UE may use the corresponding CSI-RS resource or SS/PBCH block in the first one Resource setting to measure the channel and the CSI-IM or CSI-RS resource in the second one Resource setting corresponding the CSI-RS resource set of the measured CSI-RS resource or SS/PBCH block to measure the interference.

In another embodiment, the UE can be configured with two Resource setting for SINR computation, which are linked to CSI-ReportConfig with the higher layer parameter reportQuantity set to "cri-SINR" or "SSBRI-SINR." Among those two Resource settings, the first one Resource Setting is for channel measurement the second one Resource setting is for interference measurement. In the first one Resource setting, there can be one or more CSI-RS resource sets and in each CSI-RS resource set, there can be one or more CSI-RS resources and/or SS/PBCH blocks. In the second one Resource setting, there can be one or more CSI-RS resource sets and in each CSI-RS resource set, there can be one or more non-zero CSI-RS resources and/or SS/PBCH blocks.

In this configuration, the UE may assume that the RS resources in the first Resource Setting and the RS resources in the second Resource setting are one-to-one associated. For example, the UE can assume that there may be one-to-one associated by the order of RS resources configured in the RS set in each Resource setting. The UE can be requested to use the one-to-one associated RS resource pair to measure the SINR and report the CRI of CSI-RS resource (or SSBRI of SS/PBCH) used for channel measurement and the corresponding measured SINR. In one example, a UE is configured with the first Resource setting with a set of CSI-RS resource {CSI_RS1, CSI_RS2, . . . , CSI_RS8} for channel measurement and the second resource setting with a set of CSI-RS resources {CSI_RSi1, CSI_RSi2, . . . , CSI_RSi8} for interference measurement and the UE is configured with reportQuantity set to "cri-SINR" linked to these two resource setting. Then the UE can measure the SINRs of CSI_RS1 to CSI_RSi1, of CSI_RS2 to CSI_RSi2, . . . , and of CSI_RS8 to CSI_RSi8. The UE can report one or more selected CRI and the corresponding SINR values. The reported CRI is selected from the first Resource setting used for channel measurement.

In another embodiment, the UE can be configured to measure the SINR of one CSI-RS resource (or a SS/PBCH block) with respect to the interference measurement from multiple different CSI-RS resources. This embodiment is useful for the UE to find the best "companion" beam. The UE can be configured with one CSI-RS resource CSI-RS_A for channel measurement and also configured with a set of CSI-RS resources {CSI-RSi1, CSI-RSi2, . . . , CSI-RSi8} for interference measurement. With this configuration, the UE can measure the SINR of CSI-RS_A to CSI-RSi1, of CSI_RS_A to CSI_RSi2, . . . , and CSI_RS_A to CSI_RSi8 respectively. Then the UE can report the selected CRI from the set of CSI-RS resources for interference measurement (i.e., from the set of {CSI-RSi1, CSI-RSi2, . . . , CSI-RSi8}) and the corresponding SINR measurement.

In one embodiment, the UE can report N selected CRIs (L1-SSBRIs) and the corresponding L1-SINR values. Examples of mapping order of CSI fields for one report of N=3 selected CRIs/SSBRIs and L1-SINR report are listed in TABLE 6 and TABLE 7.

TABLE 6

| CSI report # | |
|---|---|
| CSI report number | CSI fields |
| CSI report #n | CRI or SSBRI #1<br>CRI or SSBRI#2<br>CRI or SSBRI #3<br>SINR #1<br>SINR#2<br>SINR#3 |

TABLE 7

| CSI report # | |
|---|---|
| CSI report number | CSI fields |
| CSI report #n | CRI or SSBRI #1<br>SINR#1<br>CRI or SSBRI #2<br>SINR #2<br>CRI or SSBRI #3<br>SINR#3 |

The UE can use a NB-bit to represent one SINR value.

In one embodiment, in a report with more than SINR values, the UE can report absolute SINR value for the largest SINR value and differential SINR for all the other reported SINR values. And the differential SINR value is calculated with reference to the largest reported SINR value. In one embodiment, reported SINR and differential SINR can use different bitwidth. For example, one SINR value use 6 bits and one differential SINR value can use 4 bit. In one embodiment, reported SINR and differential SINR can use different step size. For example, one SINR value use 0.5 dB as step size and one differential SINR value can use 0.25 dB (or 1 dB) as step size. In one embodiment reported SINR and differential SINR can use same step size.

In one embodiment, the mapping of measured SINR quantity and reported value can be defined in TABLE 8, where 0.5 dB step size is used:

TABLE 8

| SINR | | |
|---|---|---|
| Reported Value | Measured SINR Value | Unit |
| SINR_00 | SINR < 0 | dB |
| SINR_01 | 0 ≤ SINR < 0.5 | dB |
| SINR_02 | 0.5 ≤ SINR < 1 | dB |
| . . . | . . . | . . . |
| SINR_60 | 29.5 ≤ SINR < 30 | dB |
| SINR_61 | 30 ≤ SINR | dB |

Another example of mapping of measured SINR quantity to reported value is defined in TABLE 9, where 1 dB step size is used.

TABLE 9

| SINR | | |
|---|---|---|
| Reported Value | Measured SINR Value | Unit |
| SINR_00 | SINR < 0 | dB |
| SINR_01 | 0 ≤ SINR < 1 | dB |
| SINR_02 | 1 ≤ SINR < 2 | dB |
| . . . | . . . | . . . |
| SINR_30 | 29 ≤ SINR < 30 | dB |
| SINR_31 | 30 ≤ SINR | dB |

In general, the gNB needs to inform one UE of which gNB Tx beam(s) is(are) used to transmit on downlink channels (PDCCH, PDSCH) so that the UE is able to use the correct UE Rx beam to receive and buffer the downlink signals. In most the deployment cases, a gNB usually has more antennas and more panels than a UE. Therefore, using uplink signal (e.g., SRS) to train the beam pair links would use less resources than using downlink signals (e.g., CSI-RS or SSB).

After beam pair link training, the gNB can indicate which beam pair link may be used for downlink transmission by signaling one or more SRS resources ID. The UE can figure out the Rx beam based on the signaled SRS resource IDs. For example, for a UE with beam correspondence, the UE can use the Rx beam(s) that corresponds to the Tx beam(s) that are used to transmit the SRS resources signaled by the gNB.

In 3GPP 5G specification, the parameter "spatial Rx parameter" (or called QCL type D) is used to indicate the Rx beam information for a UE. In one embodiment, a UE can be configured with one or multiple SRS resources as the spatial Rx parameter for a downlink transmission, PDCCH and/or PDSCH. When a UE is configured with one or more than one SRS resources as the spatial Rx parameter for a downlink transmission, the UE can be requested to receive the downlink transmission with the spatial domain receive filter(s) that is same to the spatial domain transmit filter(s) used to transmit the indicated SRS resource(s). When one SRS resource is configured, that SRS resource can correspond to one Tx beam sent from one UE panel or one "composite" beam send from multiple UE panels. Then the UE is able to calculate the corresponding Rx beam based on the beam correspondence. When multiple SRS resources are configured as spatial Rx parameter, those SRS resources can correspond to multiple Tx beam sent from multiple different UE Tx panels. Then the UE is able to calculate the corresponding Rx beam based on the beam correspondence of those UE panels.

In 3GPP 5G design, the spatial Rx parameter (or called QCL type D) is configured in parameter TCI-State (TCI stands for Transmission configuration indicator). Each TCI-State contains parameters for configuring a quasi co-location relationship between one or two downlink reference signals and the DM-RS port group of the PDSCH or PDCCH. In one embodiment, each TCI-State can contain one or multiple SRS resource IDs for QCL-type ID, i.e., the Spatial Rx parameter. When one UE is configured with a TCI-state for PDSCH transmission and the configured TCI-state contains one or more SRS resource IDs for spatial Rx parameter, the UE may assume the DM-RS ports in the PDSCH transmission are spatial quasi co-located with the indicated SRS resource(s) contained in the configured TCI-State. The UE can receive the PDSCH and DMRS with the spatial domain receive filter(s) same to transmit domain receive filter(s) used to transmit the indicated SRS resource(s).

When one UE is configured with a TCI-state for PDCCH transmission and the configured TCI-state contains one or more SRS resource IDs for spatial Rx parameter, the UE may assume the DM-RS ports in the PDCCH transmission are spatial quasi co-located with the indicated SRS resource(s) contained in the configured TCI-State. The UE can receive the PDCCH and DMRS with the spatial domain receive filter(s) same to transmit domain receive filter(s) used to transmit the indicated SRS resource(s).

In one embodiment, the SRS resources that can be configured as spatial Rx parameters are the SRS resources used for UL beam management. In other words, the SRS resource that can be configured as spatial Rx parameters are SRS resources in SRS resource sets with higher layer parameter SRS-SetUse being set to "BeamManagement." For DM-RS of PDSCH, DM-RS of PDCCH or a CSI-RS resource, the UE can expect a TCI-State indicates one of the following quasi co-location type(s): "QCL-TypeA" with a CSI-RS resource in a NZP-CSI-RS-ResourceSet configured with higher layer parameter trs-Info and, when applicable, "QCL-TypeD" with a SRS resource in an SRS resource set configured with higher layer parameter SRS-SetUse being set to "beamManagement."

In one embodiment, a gNB system can use two or more TRPs to transmit multiple data streams to one UE simultaneously. In one example, the gNB can transmit a first codeword from a first TRP with one or more transmit layers and a second codeword from a second TRP with one or more transmit layers simultaneously on same time-frequency resources to a UE. The gNB can transmit those two codewords on the same OFDM symbols in time domain and same PRBs in frequency domain. Such a mechanism is generally called joint transmission. If the precoding in those TRPs are not coherent. Then the transmission scheme is called non-coherent joint transmission (non-coherent JT). In mmWave system (it is called FR2(frequency range 2) in 3GPP specification), TRP is a multi-beam system and thus each TRP needs select one from multiple available Tx beam for the transmission to a UE.

Particular for non-coherent JT scheme, some special requirement may be required on the Tx beam selection of multiple TRPs that participate the non-coherent JT transmission. The basic requirement is those Tx beams used by multiple TRPs may be able to be received by the receiver UE on same OFDM symbols. An example of non-coherent joint transmission from two TRPs to one UE is shown in FIG. 22.

Figure 22:
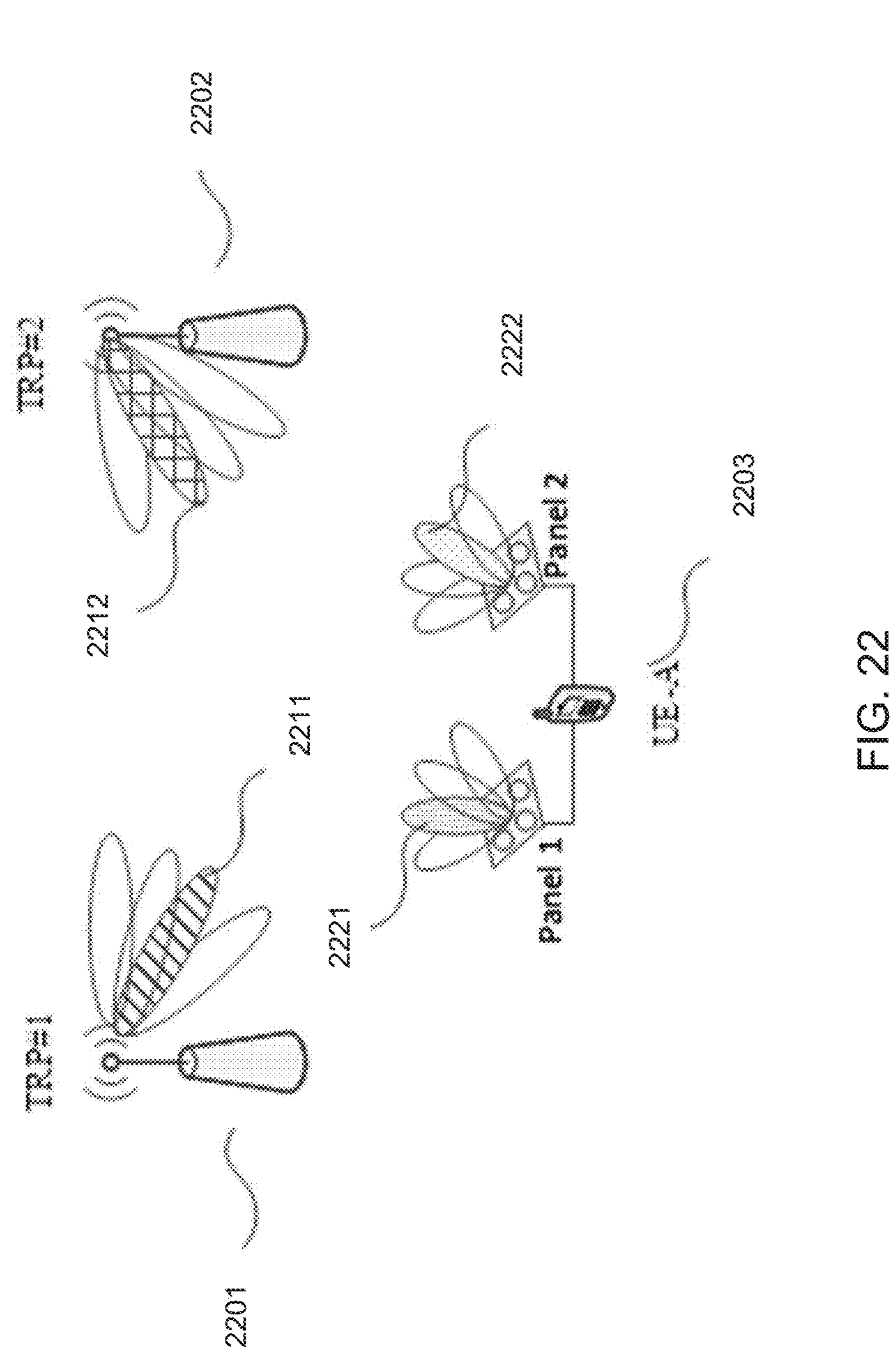
FIG. 22 illustrates an example multiple data streams from multiple TRPs according to embodiments of the present disclosure.

FIG. 22 illustrates an example multiple data streams 2200 from multiple TRPs according to embodiments of the present disclosure. The embodiment of the multiple data streams 2200 illustrated in FIG. 22 is for illustration only. FIG. 22 does not limit the scope of this disclosure to any particular implementation.

As shown in FIG. 22, TRP #1 701 and TRP #2 702 use non-coherent JT transmission to a UE-A 2203. The system works in FR2. Therefore, both TRP#1 2201 and #2 2202 are multi-beam system. To receive non-coherent joint transmission from two TRPs, the UE-A 2203 needs at least two receiver branches. One implementation example of UE-A 2203 can be the UE-A has 2 or more receive chains and each receive chain can be connected with one antenna array (or called antenna panel and there can be multiple antenna elements on one panel).

In FR2 system, the UE-A 2203 can also formulate multiple different directions on one antenna panel that is connected to one receiver branch. As shown in FIG. 22, the UE-A 2203 has two receiver branches. A first receiver branch is connected with panel 1 where multiple Rx beam directions can be formulated. And a second receiver branch is connected with panel 2 where multiple Rx beam directions can be formulated. For the joint transmission (including either non-coherent joint transmission or coherent joint transmission) from TRP #1 2201 and TRP #2 2202 to the UE-A 2203. The Tx beam 711 used by TRP#1 2201 and the Tx beam 2212 used by TRP#2 2212 must be able to be received the UE-A 2203 on the same OFDM symbols, which is basic requirement for Tx beam selection for joint transmission from multiple TRPs. There can be different implementation of Tx beam selection and UE reception embodiment to meet that basic requirement. In a first example, the UE-A 2203 can use Rx beam 2221 of a first receiver branch to receive the Tx beam 2211 of TRP #1 2201 and use Rx beam 2222 of a second receiver branch to receive the Tx beam 2212 of TRP#2 2202.

In a second example, the UE-A 2203 can use Rx beam 2221 of a first receiver branch to receive the Tx beam 2212 of TRP #2 2202 and use Rx beam 2222 of a second receiver branch to receive the Tx beam 2211 of TRP#1 2201. In a third example, the UE-A 2203 can use both Rx beam 2221 and 2222 to receive Tx beam 2211 from TRP#1 2201 and use both Rx beam 2221 and 2222 to receive Tx beam 2212 from TRP#2 2202.

In a fourth example, the UE-A 2203 can use Rx beam 2221 of a first receiver branch to receive Tx beam 2211 from TRP #1 2201 and use both Rx beam 2221 of a first branch and Rx beam 2222 of a second branch to receive Tx beam 2202 from TRP #2 2212. One can observe that one commonality of the above implementation example is the UE-A 2203 is able to receive both Tx beam 2211 and Tx beam 2212 on the same OFDM symbol, i.e., one the same time unit.

As aforementioned, some mechanisms may be required for the UE-A to measure and report selected Tx beams and the reported beam information may enable the gNB to choose proper Tx beams of TRP #1 and TRP #2 that can meet the basic requirement for joint transmission.

In one embodiment, a UE can be requested to measure the quality of multiple Tx beams from one or multiple TRPs and then the UE can report one or more Tx beams that can be received by one or a subset of UE receiver branches. The UE can partitioned all his receiver branches into a few subsets and each subset can contain one or more receive branches.

Those partition subsets can be non-overlapped subset, in which no receiver branch is allocated into more than one subsets.

Figure 23A:
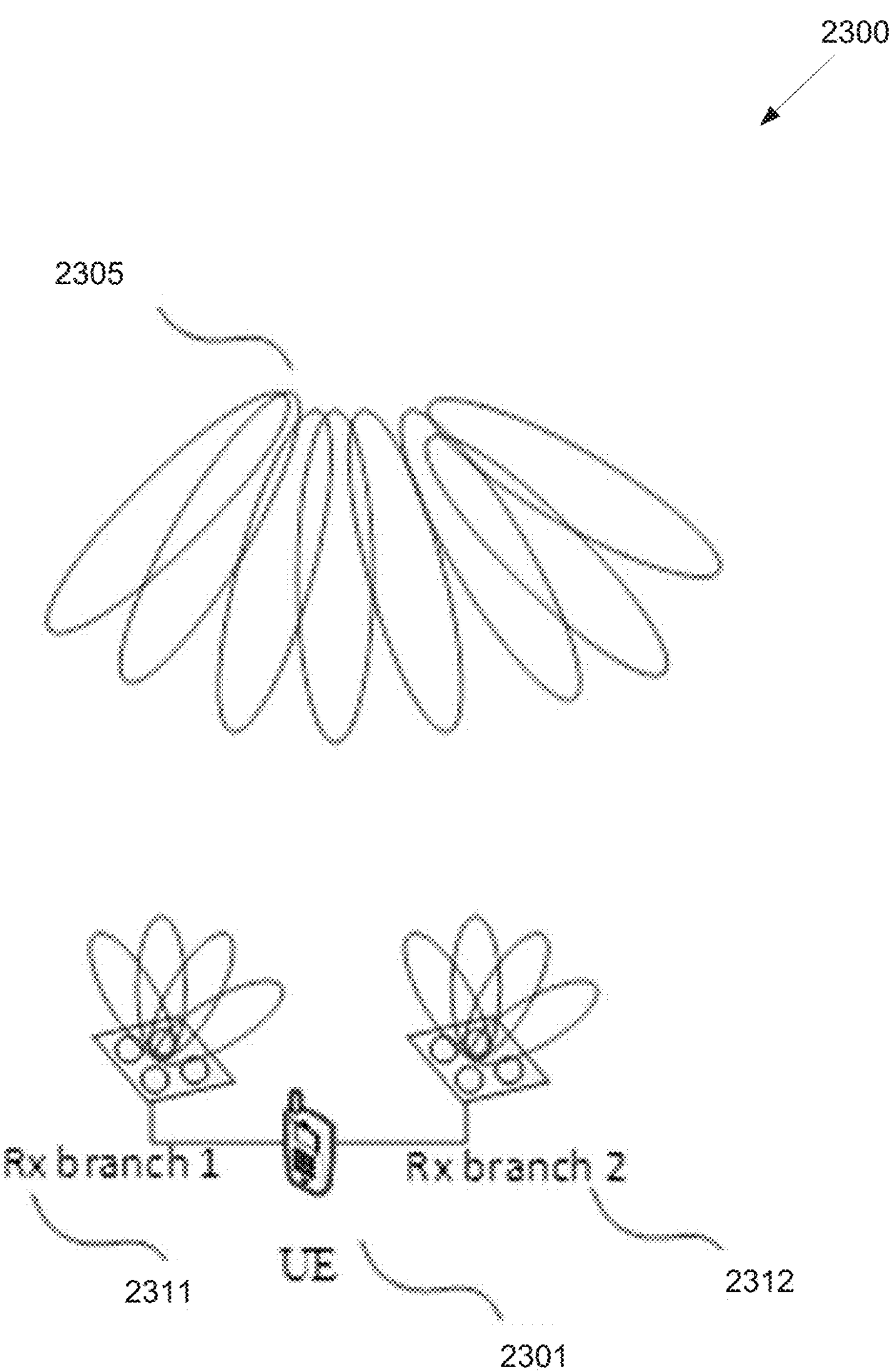
FIG. 23A illustrates an example measurement for multiple-TRPs according to embodiments of the present disclosure.

FIG. 23A illustrates an example measurement 2300 for multiple-TRPs according to embodiments of the present disclosure. The embodiment of the measurement 2300 illustrated in FIG. 23A is for illustration only. FIG. 23A does not limit the scope of this disclosure to any particular implementation.

FIG. 23A illustrates an example of UE measure and reporting Tx beam according to the embodiments in this disclosure. As shown in FIG. 23A, a UE 2301 is requested to measure multiple TRP Tx beams 2305 and then report some Tx beams that are selected as the "best" TRP Tx beam according to some metric. The UE 2301 has two receiver branches 2311 and 2312. Each receiver branch is connected with a Rx antenna panel. The UE 2301 can measure the L1-RSRP (reference signal received power) (or L1-RSRQ (reference signal received quality) or L1-SINR (signal-to-interference noise ratio)) of those Tx beams 2305 on each receiver branch.

And the UE 801 then can report one or multiple Tx beams of the largest L1-RSRP (or L1-RSRQ, or L1-SINR) received at Rx branch (receiver branch) 1 2311, among all the Tx beams 2305, the UE 2301 can report one or multiple Tx beams of the largest L1-RSRP (or L1-RSRQ or L1-SINR) received at Rx branch 2 2312, among the Tx beams 2305. The UE 2301 can report the following information: {Tx beam ID i1/L1-RSRP of Tx beam ID i1, Tx beam ID i2/L1-RSRP of Tx beam ID i2} for Rx branch 1 2311, wherein the reported L1-RSRP of Tx beam ID i1 and i2 is the L1-RSRP is measured based on the combined signal from antenna elements corresponding to Rx branch 1 2311; and/or {Tx beam ID j1/L1-RSRP of Tx beam ID j1, Tx beam ID j2/L1-RSRP of Tx beam ID j2} for Rx branch 2 2312, wherein the reported L1-RSRP of Tx beam ID j1 and j2 is the L1-RSRP is measured based on the combined signal from antenna elements corresponding to Rx braches 2 2312.

In the aforementioned UE measurement and reporting, the metric L1-RSRP can be replaced with L1-RSRQ or L1-SINR without changing the design of the embodiments. Based on the above beam reporting from the UE 801, the serving gNB can select proper Tx beam among 805 for the joint transmission from two TRPs to the UE 2301 and the selected Tx beam can meet the basic requirement.

Figure 23B:
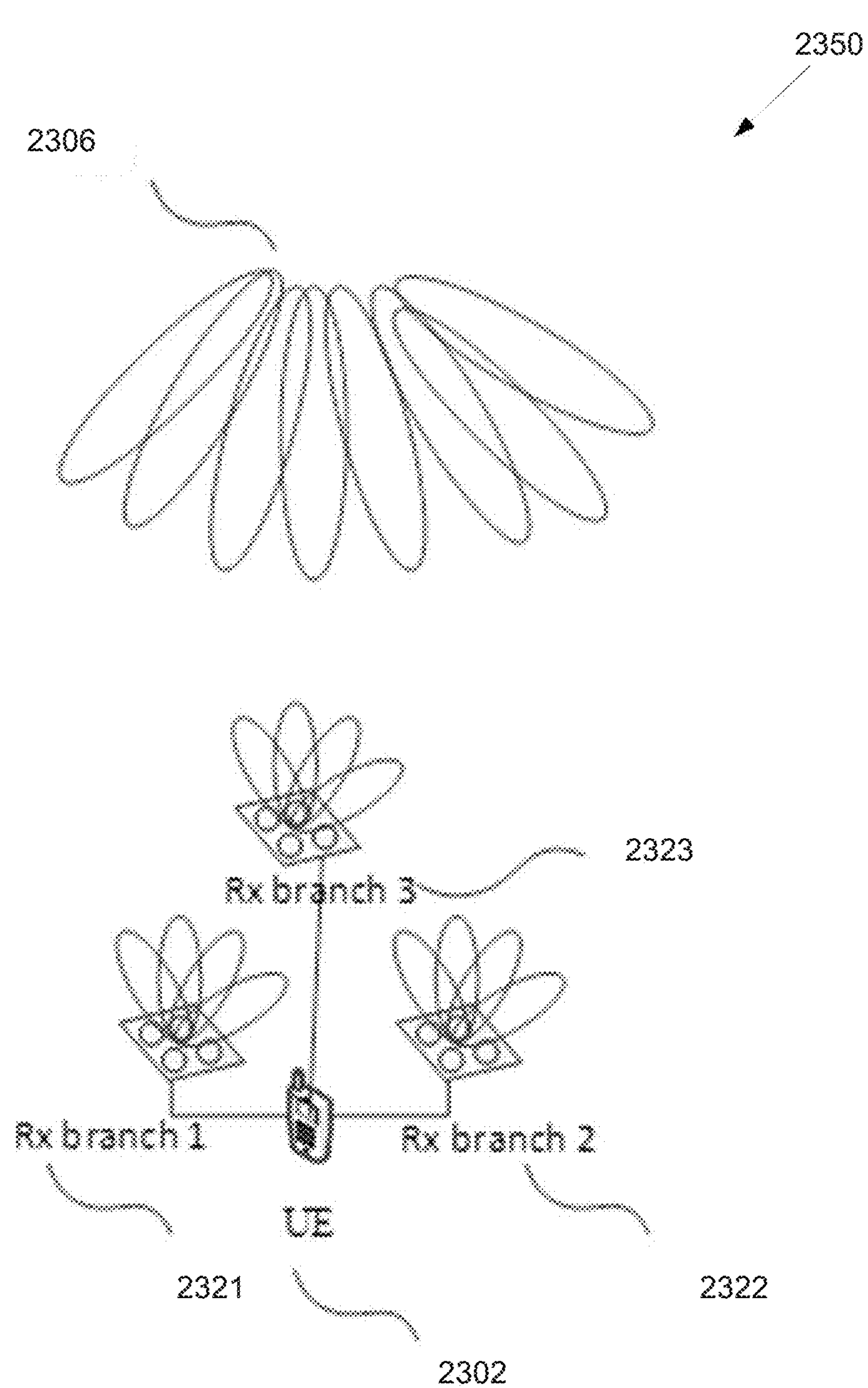
FIG. 23B illustrates another example measurement for multiple-TRPs according to embodiments of the present disclosure.

FIG. 23B illustrates another example measurement 2350 for multiple-TRPs according to embodiments of the present disclosure. The embodiment of the measurement 2350 illustrated in FIG. 23B is for illustration only. FIG. 23B does not limit the scope of this disclosure to any particular implementation.

FIG. 23B illustrates an example of UE measure and reporting Tx beam according to the embodiments in this disclosure.

As shown in FIG. 23B, a UE 2302 is requested to measure multiple TRP Tx beams 2306 and then report some Tx beams that are selected as the "best" TRP Tx beam according to some metric. The UE 2302 has three receiver branches 2321, 2322, and 2323. Each receiver branch is connected with a Rx antenna panel. The UE 2302 can measure the L1-RSRP (reference signal received power) (or L1-RSRQ (reference signal received quality) or L1-SINR (signal-to-interference noise ratio)) of those Tx beams 2306 on each receiver branch or each subset of receiver branches.

In one example, the UE 2302 then can report one or multiple Tx beams of the largest L1-RSRP (or L1-RSRQ, or L1-SINR) received at Rx branch (receiver branch) 1 2321, among all the Tx beams 2306, the UE 2302 can report one or multiple Tx beams of the largest L1-RSRP (or L1-RSRQ or L1-SINR) received at Rx branch 2 2322, among the Tx beams 2306 and the UE 2302 can report one or more Tx beams of largest L1-RSRP (or L1-RSRQ or L1-SINR) received at Rx branch 3 2323. The UE 2302 can report the following information: {Tx beam ID i1l/L1-RSRP of Tx beam ID i1, Tx beam ID i2/L1-RSRP of Tx beam ID i2} for Rx branch 1 2321, wherein the reported L1-RSRP of Tx beam ID i1 and i2 is the L1-RSRP is measured based on the combined signal from antenna elements corresponding to Rx branch 1 2321; {Tx beam ID j1/L1-RSRP of Tx beam ID j1, Tx beam ID j2/L1-RSRP of Tx beam ID j2} for Rx branch 2 2322, wherein the reported L1-RSRP of Tx beam ID j1 and j2 is the L1-RSRP is measured based on the combined signal from antenna elements corresponding to Rx branches 2 2322; and/or {Tx beam ID k1/L1-RSRP of Tx beam ID kl, Tx beam ID k2/L1-RSRP of Tx beam ID k2} for Rx branch 3 2323, wherein the reported L1-RSRP of Tx beam ID k1 and k2 is the L1-RSRP is measured based on the combined signal from antenna elements corresponding to Rx braches 3 2323.

In the aforementioned measurement and reporting, the metric L1-RSRP can be replaced with L1-RSRQ or L1-SINR without changing the design of the embodiments. Based on the above beam reporting from the UE 802, the serving gNB can select proper Tx beam among 2302 for the joint transmission from up to three TRPs to the UE 2302 and the selected Tx beam can meet the basic requirement.

In one example, the UE 2302 can partition the Rx branches 2321, 2322, and 2323 into two subsets, a first subset containing Rx branch 1 2321 and a second subset containing Rx branch 2 2322 and Rx branch 3 2323. Then the UE 2302 can report one or multiple Tx beams of the largest L1-RSRP received at a first subset of Rx branch, among all the Tx beams 2306 and the UE 2302 can report one or multiple Tx beams of the largest L1-RSRP received at a second subset of Rx branches, among all the Tx beams 2306. The UE 2302 can report the following information: {Tx beam ID a1/L1-RSRP of Tx beam ID al, Tx beam ID a2/L1-RSRP of Tx beam ID a2} for a first subset containing Rx branch 1 2321, wherein the reported L1-RSRP of Tx beam ID a1 and a2 is the L1-RSRP is measured based on the combined signal from antenna elements corresponding to Rx branch 1 2321; and/or {Tx beam ID b1/L1-RSRP of Tx beam ID b1, Tx beam ID b2/L1-RSRP of Tx beam ID b2} for a second subset containing Rx branch 2 2322 and Rx branch 3 2323, wherein the reported L1-RSRP of Tx beam ID bl and b2 is the L1-RSRP is measured based on the combined signal from antenna elements corresponding to Rx branch 2 2322 and Rx branch 3 2323.

In the aforementioned UE measurement and reporting, the metric L1-RSRP can be replaced with L1-RSRQ or L1-SINR without changing the design of the embodiments. Based on the above beam reporting from the UE 2302, the serving gNB can select proper Tx beam among 2302 for the joint transmission from up to two TRPs to the UE 2302 and the selected Tx beam can meet the basic requirement.

With the aforementioned embodiments, some embodiments for design of beam measurement and reporting may be provided. In the following embodiments, CSI-RS may be used as the reference signal example to explain the design of provided embodiments. In those embodiments, the CSI-RS can be replaced with SS/PBCH block and the CRI (CSI-RS resource indicator) can be replaced with SSBRI (SS/PBCH resource indicator) without changing the design of the embodiments.

In one embodiment, a UE can be configured to measure a set of K (for example K can be >1) CSI-RS resources transmitted from the gNB, where each CSI-RS resource can represent one Tx beam of the gNB. The UE can be requested to report M≥1 groups of CRIs and N≥1 CRIs in each group. In each reported group, the UE can report N≥1 CRIs and each CRI can indicate one CSI-RS resource selected from the configured CSI-RS resource set. In each reported group, the UE can report the L1-RSRP measurement for each reported CRI and the L1-RSRP measurement is measured based on combined signal from antenna elements corresponding to the UE receiver branch or the subset of receiver branches.

The UE can assign some one-to-one mapping between the reported group and the subset of receiver branches. In one example, a UE can be configured to measure a set of K=16 CSI-RS resources: {$CSI\_RS_1$, $CSI\_RS_2$, $CSI\_RS_3$, . . . , $CSI\_RS_{16}$} and then report M=2 groups of CRIs and N=4 CRIs in each group and also report L1-RSRP measurement for each reported CRI. Therefore, the UE can measure the L1-RSRP those K CSI-RS resources transmitted from the gNB (from multiple TRPs or single TRP) and report the following information through uplink channel (for example in PUCCH or PUSCH) to the gNB.

In one example, the UE can be requested to report the following M=2 groups of CRI and L1-RSRP: Group#1 in reporting: {($CRI_{11}$, $P_{11}$), ($CRI_{12}$, $P_{12}$), ($CRI_{13}$, $P_{13}$), ($CRI_{14}$, $P_{14}$)}; and/or Group#2 in reporting: {($CRI_{21}$, $P_{21}$), ($CRI_{22}$, $P_{22}$), ($CRI_{23}$, $P_{23}$), ($CRI_{24}$, $P_{24}$)}.

In one example, in the report, each $CRI_{mn}$ (for m=1,2 and n=1/2/3/4) can be a 4-bit value to indicate the selection of one CRI-RS resource from the configured set of K CSI-RS resources.

In one example, in the report, each $P_{mn}$ (for m=1,2 and n=1/2/3/4) can be a (for example) 7-bit value to represent the L1-RSRP measurement of CSI-RS indicated by $CRI_{mn}$ and the L1-RSRP measurement may be measured based on the signals received from the subset of UE receiver braches (can be one receiver branches or multiple braches) that corresponds to the reporting group m=1 or 2.

Please note in the aforementioned embodiment, the L1-RSRP can be replaced with L1-RSRQ or L1-SINR without changing the design of the embodiment. That implies the UE can be requested to report M≥1 groups of N≥1 CRIs and the corresponding L1-RSRQ or L1-SINR measurement according to the aforementioned embodiments.

In one embodiment, a UE can be requested to measure $K_G$ sets of CSI-RS resources and $K_k$ cCSI-RS resources are in each set k. Those CSI-RS resources are transmitted from the gNB, where each CSI-RS resource can represent one Tx beam of gNB. The UE can be requested to report M≥1 groups of CRIs and in each reporting group, the UE can be requested to report N≥1 CRIs from each configured CSI-RS resource set. In each reporting grouping, the UE is requested to report totally N×$K_G$ CRIs. The UE can be requested to report L1-RSRP measurement of each reported CRIs and each L1-RSRP measurement is measured based on the signaled received by a subset of receiver branch that corresponds to the reporting group where that L1-RSRP belongs to.

The UE can assign some one-to-one mapping between the reported group and the subset of receiver branches. In one example, a UE can be configured to measure a two sets of K=16 CSI-RS resources: a first set of CSI-RS resources is {$CSI\_RS_{1,1}$, $CSI\_RS_{1,2}$, $CSI\_RS_{1,3}$, . . . , $CSI\_RS_{1,16}$} and a second set of CSI-RS resources is {$CSI\_RS_{2,1}$, $CSI\_RS_{2,2}$, $CSI\_RS_{2,3}$, . . . , $CSI\_RS_{2,16}$}. The UE is requested to report M=2 groups of CRIs and in each reporting group, the UE is requested to report N=4 CRIs for each configured CSI-RS resource set.

The UE can also report L1-RSRP measurement for each reported CRI. Therefore, the UE can measure the L1-RSRP of those K CSI-RS resources in each of those two configured CSI-RS resource sets transmitted from the gNB (from multiple TRPs or single TRP) and report the following information through uplink channel (for example in PUCCH or PUSCH) to the gNB.

In one example, the UE can be requested to report the following M=2 groups of CRI and L1-RSRP:

Gourp #1 in reporting:

$$\left\{\begin{matrix}(CRI_{11}, P_{11}), (CRI_{12}, P_{12}), (CRI_{13}, P_{13}), (CRI_{14}, P_{14}), \\ (CRI_{15}, P_{15}), (CRI_{16}, P_{16}), (CRI_{17}, P_{17}), (CRI_{18}, P_{18})\end{matrix}\right\}; \text{ and}$$

Group #2 in reporting:

$$\left\{\begin{matrix}(CRI_{21}, P_{21}), (CRI_{22}, P_{22}), (CRI_{23}, P_{23}), (CRI_{24}, P_{24}), \\ (CRI_{25}, P_{25}), (CRI_{26}, P_{26}), (CRI_{27}, P_{27}), (CRI_{28}, P_{28})\end{matrix}\right\}.$$

In one example, in the report, each $CRI_{mn}$ (for m=1,2 and n=1/2/3/4) can be a 4-bit value to indicate the selection of one CRI-RS resource from the configured a first set of 16 CSI-RS resources: {$CSI\_RS_{1,1}$, $CSI\_RS_{1,2}$, $CSI\_RS_{1,3}$, . . . , $CSI\_RS_{1,16}$}.

In one example, in the report, each $CRI_{mn}$ (for m=1,2 and n=5/6/7/8) can be a 4-bit value to indicate the selection of one CRI-RS resource from the configured a first set of 16 CSI-RS resources: {$CSI\_RS_{2,1}$, $CSI\_RS_{2,2}$, $CSI\_RS_{2,3}$, . . . , $CSI\_RS_{2,16}$}.

In one example, in the report, each $P_{mn}$ (for m=1,2 and n=1/2/3/4/5/6/7/8) can be a (for example) 7-bit value to represent the L1-RSRP measurement of CSI-RS indicated by $CRI_{mn}$ and the L1-RSRP measurement may be measured based on the signals received from the subset of UE receiver braches (can be one receiver branches or multiple braches) that corresponds to the reporting group m=1 or 2.

Please note in a second embodiment, the L1-RSRP can be replaced with L1-RSRQ or L1-SINR without changing the design of the embodiment. That implies the UE can be requested to report M≥1 groups of N≥1 CRIs selected from each configured CSI-RS resource set and the corresponding L1-RSRQ or L1-SINR measurement according to the aforementioned embodiments.

In the aforementioned embodiments, one alternative for the configuration is the UE can be configured with a set of CSI-RS resources and those CSI-RS resources are partitioned into $K_G$ sub-sets. The UE can be requested to report M≥1 groups of CRIs and in each reporting group, the UE can be requested to report N≥1 CRIs from each configured CSI-RS resource sub-set.

In the aforementioned embodiment, one alternative for the configuration is the UE can be configured with $K_G$ resource settings and one CSI-RS resource set in each of those resource setting is configured. The UE can be requested to report M≥1 groups of CRIs and in each reporting group, the UE can be requested to report N≥1 CRIs from the CSI-RS resource set configured in each of those $K_G$ resource settings.

In one embodiment, a UE can be requested to measure $K_G$ sets of CSI-RS resources and $K_k$ CSI-RS resources are in each set k. Those CSI-RS resources are transmitted from the gNB, where each CSI-RS resource can represent one Tx beam of gNB. The UE can be requested to report M≥1 groups of CRIs and in each reporting group, the UE can be requested to report N≥1 CRIs from each configured CSI-RS resource set. In each reporting grouping, the UE is requested to report totally $N \times K_G$ CRIs. The UE can be requested to report L1-RSRP measurement of each reported CRIs and each L1-RSRP measurement is measured based on the signaled received by a subset of receiver branch that corresponds to the reporting group where that L1-RSRP belongs to. The UE can assign some one-to-one mapping between the reported group and the subset of receiver branches. The UE can be requested to determine the number of reporting group according to the number of configured CSI-RS resource set. In one example, the UE can be requested to determine the number of reporting group is equal to the number of configured CSI-RS resource sets.

In one embodiment, a UE can be requested to measure the quality of multiple Tx beams from one or multiple TRPs and then the UE can report one or more Tx beams selected from the Tx beams of different TRPs and those selected Tx beams can be used by the gNB to transmit downlink signals on the same OFDM symbols. In other words, the gNB can assume those Tx beam selected by the UE can be received simultaneously by the UE. In other word, the UE can be requested to report one or more Tx beams selected by the UE to the gNB and the gNB can assume the gNB can use apply the reported Tx beams on the downlink transmission on same time resource, for example, on same OFDM symbol.

Figure 24:
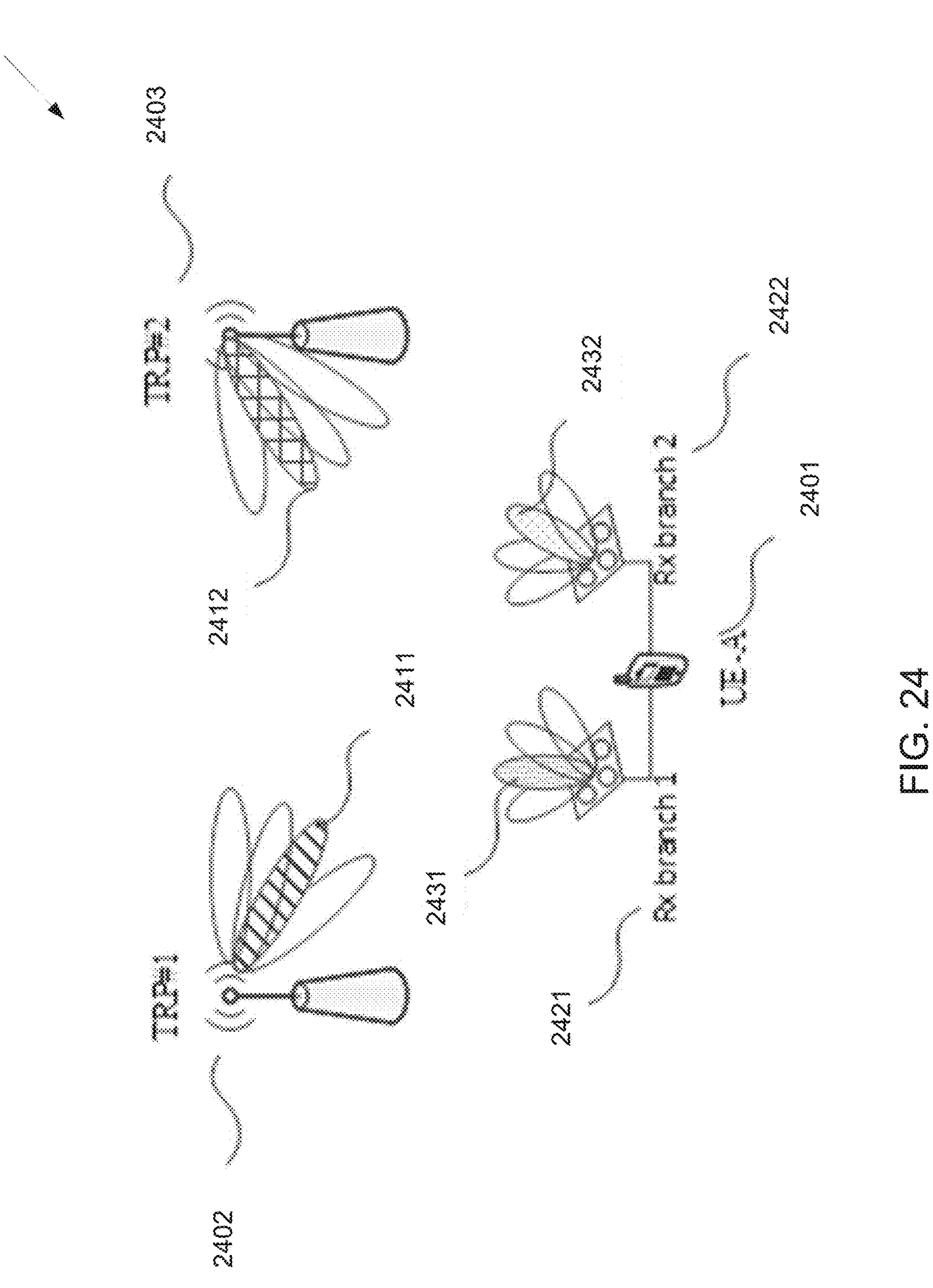
FIG. 24 illustrates an example measurement for multiple-TRPs according to embodiments of the present disclosure.

FIG. 24 illustrates an example measurement 2400 for multiple-TRPs according to embodiments of the present disclosure. The embodiment of the measurement 2400 illustrated in FIG. 24 is for illustration only. FIG. 24 does not limit the scope of this disclosure to any particular implementation.

That provided embodiment is useful for supporting some downlink joint-transmission from multiple TRP in FR2 systems. As illustrated in FIG. 24, a UE-A 2401 can be requested to measure multiple downlink Tx beams of TRP#1 2402 and TRP #1 2403. The UE-A 2401 can be requested to report Tx beam for each TRP so that the gNB can apply the reported Tx beam on joint transmission from TRP #1 2402 and TRP #2 2403.

As shown in FIG. 24, the UE-A 2401 has two receiver branches: Rx branch 1 2421 and Rx branch 2 2422. One the antenna panel connected to each Rx branch, the UE-A has one or multiple available Rx beam directions. The UE-A 2401 can report downlink Tx beam 2411 and downlink Tx beam 2412 according to the configuration. With the reporting, the gNB can assume the gNB can apply Tx beam 2411 and 2412 to downlink transmission on same time resource, i.e., same OFDM symbols.

At the UE side, the UE-A 2401 can receive the downlink transmission beamformed with both Tx beam 2411 and 2412 on the same OFDM symbols. That means that the UE-A 2401 can formulate the Rx beams that correspond to Tx beam 2411 and 2412 simultaneously. There are a few different implementation alternatives that can achieve that. One example of UE implementation is the UE-A 2401 can use Rx beam 2431 on Rx branch 1 2421 to receive the downlink signals being beamformed by Tx beam 2411 and use Rx beam 2432 on Rx branch 2 2422 to receive the downlink signals being beamformed by Tx beam 2412.

Another example of UE implementation is the UE-A 2401 can use Rx beam 2431 on Rx branch 1 2421 and Rx beam 2432 on Rx branch 2 2422 to receive the downlink signals being beamformed by Tx beam 2411 and use Rx beam 2432 on Rx branch 2 2422 to receive the downlink signals being beamformed by Tx beam 2412. Another example of UE implementation is the UE-A 2401 can use Rx beam 2431 on Rx branch 1 2421 and Rx beam 2432 on Rx branch 2 2422 to receive the downlink signals being beamformed by Tx beam 2411 and use Rx beam 2431 on Rx branch 1 2411 and Rx beam 2432 on Rx branch 2 2422 to receive the downlink signals being beamformed by Tx beam 2412.

In one embodiment, a UE can be configured to measure two sets of CSI-RS resources: a first set of CSI-RS resources is $\{CSI\_RS_{1,1}, CSI\_RS_{1,2}, CSI\_RS_{1,3}, \ldots, CSI\_RS_{1,P}\}$ and a second set of CSI-RS resources is $\{CSI\_RS_{2,1}, CSI\_RS_{2,2}, CSI\_RS_{2,3}, \ldots, CSI\_RS_{2,Q}\}$. The UE can be requested to report one pair of CRIs: $\{CRI_a, CRI_b\}$, where $CRI_a$ is a CSI resource indicator that indicates one CSI-RS resource in a first set of CSI-RS resources and $CRI_b$ is a CSI resource indicator that indicates one CSI-RS resource in a second set of CSI-RS resources. The UE can also report the L1-RSRP of CSI-RS resources indicated by the reported CRIs: $\{CRI_a, CRI_b\}$, and the reported L1-RSRP may be L1-RSRP measured by assuming the CSI-RS resources indicated by reported $CRI_a$ and $CRI_b$ are transmitted one same OFDM symbols. In one example, a UE can be configured to measure two sets of CSI-RS resources: a first set of CSI-RS resources is $\{CSI\_RS_{1,1}, CSI\_RS_{1,2}, CSI\_RS_{1,3}, \ldots, CSI\_RS_{1,16}\}$ and a second set of CSI-RS resources is $\{CSI\_RS_{2,1}, CSI\_RS_{2,2}, CSI\_RS_{2,3}, \ldots, CSI\_RS_{2,16}\}$.

In one example, the UE can report M=2 pairs of CRIs and L1-RSRP measurement: a first pair is $\{CRI_{a1}, P_{a1}, CRI_{b1}, P_{b1}\}$ and a second pair is $\{CRI_{a2}, P_{a2}, CRI_{b2}, P_{b2}\}$. In such example, where in a first pair, $CRI_{a1}$ is an indicator that indicates one CSI-RS resource in a first set of CSI-RS resources and $CRI_{b1}$ is an indicator that indicates one CSI-RS resource in a second set of CSI-RS resources. $P_{a1}$ is the L1-RSRP measured from CSI-RS resource indicated by $CRI_{a1}$ and $P_{b1}$ is the L1-RSRP measured from CSI-RS resource indicated by $CRI_{b1}$ and $P_{a1}$ and $P_{b1}$ are measured by assuming the CSI-RS resources indicated by $CRI_{a1}$ and $CRI_{b1}$ are sent on same OFDM symbol. In such example, where in a first pair, $CRI_{a2}$ is an indicator that indicates one CSI-RS resource in a first set of CSI-RS resources and $CRI_{b2}$ is an indicator that indicates one CSI-RS resource in a second set of CSI-RS resources. $P_{a2}$ is the L1-RSRP measured from CSI-RS resource indicated by $CRI_{a2}$ and $P_{b2}$ is the L1-RSRP measured from CSI-RS resource indicated by $CRI_{b2}$ and $P_{a2}$ and $P_{b2}$ are measured by assuming the CSI-RS resources indicated by $CRI_{a2}$ and $CRI_{b2}$ are sent on same OFDM symbol.

In one embodiment, a UE can be configured to measure two sets of CSI-RS resources: a first set of CSI-RS resources is $\{CSI\_RS_{1,1}, CSI\_RS_{1,2}, CSI\_RS_{1,3}, \ldots, CSI\_RS_{1,P}\}$ and a second set of CSI-RS resources is $\{CSI\_RS_{2,1}, CSI\_RS_{2,2}, CSI\_RS_{2,3}, \ldots, CSI\_RS_{2,Q}\}$. The UE can be requested to report one pair of CRIs: $\{CRI_a, CRI_b\}$, where $CRI_a$ is a CSI resource indicator that indicates one CSI-RS resource in a first set of CSI-RS resources and $CRI_b$ is a CSI resource indicator that indicates one CSI-RS resource in a second set of CSI-RS resources. The UE can also report the L1-RSRP of CSI-RS resources indicated by the reported CRIs: $\{CRI_a, CRI_b\}$, and the reported L1-RSRP may be L1-RSRP measured with the same UE Rx beams (or called same spatial domain receiver filter).

In other word, the reported L1-RSRP of CSI-RS resources indicated by reported CRIs: $\{CRI_a, CRI_b\}$ may be measured based on the signal from antenna elements corresponding to the same subset of receiver branches and based on the same spatial domain receive filter on antenna elements on every of those receiver branches. In one example, a UE can be configured to measure two sets of CSI-RS resources: a first set of CSI-RS resources is $\{CSI\_RS_{1,1}, CSI\_RS_{1,2}, CSI\_RS_{1,3}, \ldots, CSI\text{-}RS_{1,16}\}$ and a second set of CSI-RS resources is $\{CSLRS_{2,1}, CSI\_RS_{2,2}, CSI\_RS_{2,3}, \ldots, CSI\_RS_{2,16}\}$.

In one example, the UE can report M=2 pairs of CRIs and L1-RSRP measurement: a first pair is $\{CRI_{a1}, P_{a1}, CRI_{b1}, P_{b1}\}$ and a second pair is $\{CRI_{a2}, P_{a2}, CRI_{b2}, P_{b2}\}$. In such example, where in a first pair, $CRI_{a1}$ is an indicator that indicates one CSI-RS resource in a first set of CSI-RS resources and $CRI_{b1}$ is an indicator that indicates one CSI-RS resource in a second set of CSI-RS resources. $P_{a1}$ is the L1-RSRP measured from CSI-RS resource indicated by $CRI_{a1}$ and $P_{b1}$ is the L1-RSRP measured from CSI-RS resource indicated by $CRI_{b1}$ and $P_{a1}$ and $P_{b1}$ are measured based on the signals received with the same subset of receiver branches and same spatial domain receiver filter is applied on the antenna elements on each receiver branches for measuring both $P_{a1}$ and $P_{b1}$. In such example, where in a first pair, $CRI_{a2}$ is an indicator that indicates one CSI-RS resource in a first set of CSI-RS resources and $CRI_{b2}$ is an indicator that indicates one CSI-RS resource in a second set of CSI-RS resources. $P_{a2}$ is the L1-RSRP measured from CSI-RS resource indicated by $CRI_{a2}$ and $P_{b2}$ is the L1-RSRP measured from CSI-RS resource indicated by $CRI_{b2}$ and $P_{a2}$ and $P_{b2}$ are measured based on the signals received with the same subset of receiver branches and same spatial domain receiver filter is applied on the antenna elements on each receiver branches for measuring both $P_{a2}$ and $P_{b2}$.

In one embodiment, a UE can be configured with two sets of CSI-RS resources a first set of CSI-RS resources is $\{CSI\_RS_{1,1}, CSI\_RS_{1,2}, CSI\_RS_{1,3}, \ldots, CSI\_RS_{1,P}\}$ and a second set of CSI-RS resources is $\{CSI\_RS_{2,1}, CSI\_RS_{2,2}, CSI\_RS_{2,3}, \ldots, CSI\_RS_{2,Q}\}$ in one resource setting and a reporting setting that indicates the UE to report M≥1 pairs of CRIs for joint transmission from multiple TRPs. Then the UE can report one M pairs of CRIs and in each pair, one CRI indicates one CSI-RS resource in a first set of CSI-RS resources and another CRI indicates one CSI-RS resources in a second set of CSI-RS resources. In one example, a UE can be configured to measure two sets of CSI-RS resources: a first set of CSI-RS resources is $\{CSI\_RS_{1,1}, CSI\_RS_{1,2}, CSI\_RS_{1,3}, \ldots, CSI\_RS_{1,16}\}$ and a second set of CSI-RS resources is $\{CSI\_RS_{2,1}, CSI\_RS_{2,2}, CSI\_RS_{2,3}, \ldots, CSI\_RS_{2,16}\}$ in a resource setting and the resource setting is linked with a reporting setting.

In the reporting setting, the UE is configured one high layer parameter, report Quantity, set to "CRI/RSRP for JT" to indicate that the UE may report CRIs/L1-RSRPs for downlink joint transmission (including non-coherent joint transmission) and the UE is configured to report M=2 pairs of CRIs and L1-RSRPs. The UE can report M=2 pairs of CRIs and L1-RSRP measurement: a first pair is $\{CRI_{a1}, P_{a1}, CRI_{b1}, P_{b1}\}$ and a second pair is $\{CRI_{a2}, P_{a2}, CRI_{b2}, P_{b2}\}$.

Please note in the above embodiments, the L1-RSRP can be replaced with L1-RSRQ or L1-SINR without changing the design of the embodiment. That implies the UE can be requested to report M≥1 pairs of N≥1 CRIs selected from each configured CSI-RS resource set and the corresponding L1-RSRQ or L1-SINR measurement according to the aforementioned embodiments.

In the aforementioned embodiments, one alternative for the configuration is the UE can be configured with a set of CSI-RS resources and those CSI-RS resources are partitioned into $K_G$ sub-sets. The UE can be requested to report M≥1 groups of CRIs and in each reporting group, the UE can be requested to report N≥1 CRIs from each configured CSI-RS resource sub-set.

In the aforementioned embodiments, one alternative for the configuration is the UE can be configured with $K_G$ resource settings and one CSI-RS resource set in each of those resource setting is configured. The UE can be requested to report M≥1 groups of CRIs and in each reporting group, the UE can be requested to report N≥1 CRIs from the CSI-RS resource set configured in each of those $K_G$ resource settings.

Figure 25:
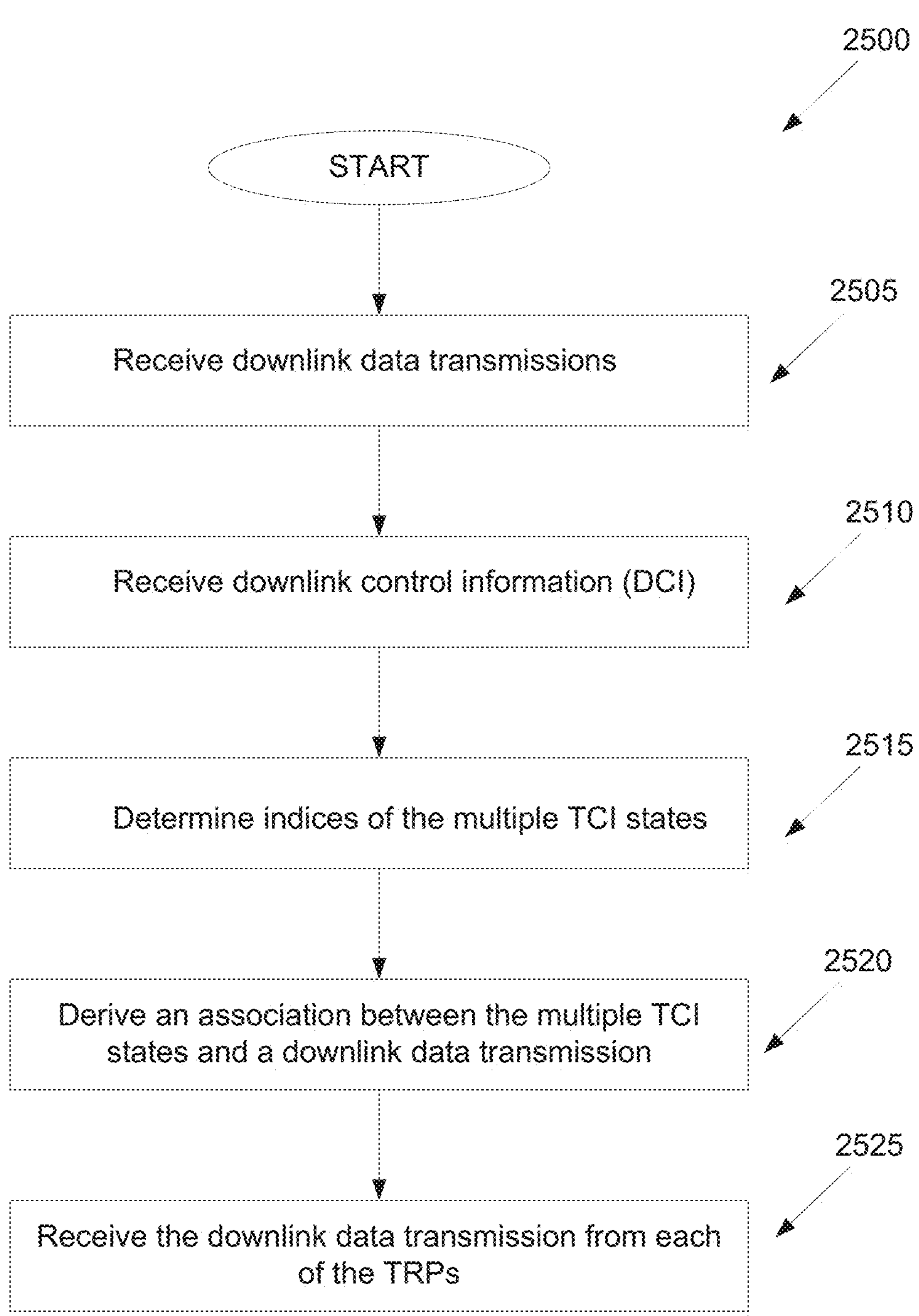
FIG. 25 illustrates a flowchart of a method for beam management according to embodiments of the present disclosure.

FIG. 25 illustrates a flowchart of a method 2500 for beam management, as may be performed by a user equipment (UE) (e.g., 111-116 as illustrated in FIG. 1), according to embodiments of the present disclosure. The embodiment of the method 2500 illustrated in FIG. 25 is for illustration only. FIG. 25 does not limit the scope of this disclosure to any particular implementation.

As illustrated in FIG. 25, the method 2500 begins at step 2505. In step 2505, the UE receives, from multiple transmission reception points (TRPs), downlink data transmissions.

In one embodiment, the UE in step 2505 receives a control resource set and a search space to monitor downlink control channels and higher layer signaling that configures the multiple TCI states and a monitoring pattern for monitoring the downlink control channels associated with the control resource set.

In step 2510, the UE receives downlink control information (DCI) that includes a beam indication configuration comprising a one bit-field that indicates multiple transmission configuration indicator (TCI) states. In step 2510, the multiple TCI states indicate a quasi-colocation (QCL) configuration for downlink data channels received from the TRPs.

In one embodiment, each value of the one bit-field corresponds to one or two TCI states.

In step 2515, the UE determines indices of the multiple TCI states based on the received one bit-field included in the DCI.

In one embodiment, a demodulation reference signal (DMRS) antenna port associated with a reception of a first codeword in the downlink data transmission is quasi co-located with reference signals configured in a first TCI state.

In another embodiment, a DMRS antenna port associated with a reception of a second codeword in the downlink data transmission is quasi co-located with reference signals configured in a second TCI state.

In step 2520, the UE derives an association between the multiple TCI states indicated by the one bit-field and a downlink data transmission of each of the TRPs.

In step 2525, the UE receives the downlink data transmission from each of the TRPs with the QCL configuration indicated by the derived association.

In one embodiment, the UE in step 2525 calculates one or more TCI states for a physical downlink control channel (PDCCH) detection occasion based on the configured multiple TCI states and the monitoring pattern and a QCL configuration for each of the multiple TCI states to receive the downlink control channels.

In one embodiment, each of the multiple TCI states is swept across symbols within the control resource set. In such embodiment, a number of consecutive symbols within the control resource set is configured by the higher layer signaling and the QCL configuration is configured for each of the symbols.

Figure 26:
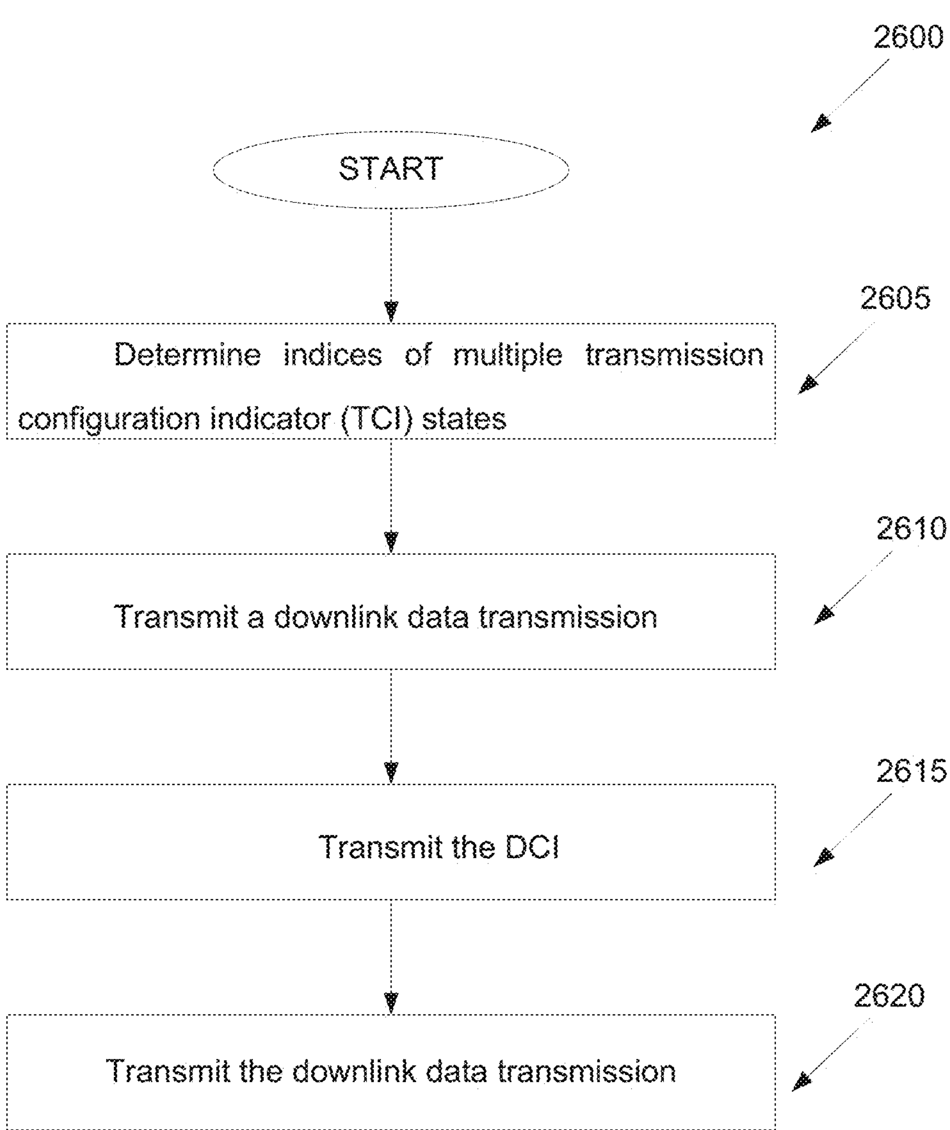
FIG. 26 illustrates another flowchart of a method for beam management according to embodiments of the present disclosure.

FIG. 26 illustrates a flowchart of a method 2600 for beam management, as may be performed by a TRP (e.g., 101-103 as illustrated in FIG. 1), according to embodiments of the present disclosure. The embodiment of the method 2600 illustrated in FIG. 26 is for illustration only. FIG. 26 does not limit the scope of this disclosure to any particular implementation.

As illustrated in FIG. 26, the method 2600 begins at step 2605. In step 2605, the TRP determines indices of multiple transmission configuration indicator (TCI) states based on a one bit-field to be transmitted to a user equipment (UE). In step 2605, the one bit-field is included in downlink control information (DCI).

In one embodiment, each value of the one bit-field in step 2605 corresponds to one or two TCI states.

In one embodiment, the TRP transmits a control resource set and a search space to monitor downlink control channels and higher layer signaling that configures the multiple TCI states and a monitoring pattern for monitoring the downlink control channels associated with the control resource set.

In one embodiment, the TRP determines one or more TCI states for a physical downlink control channel (PDCCH) detection occasion based on the configured multiple TCI states and the monitoring pattern.

In step 2610, the TRP transmits, to the UE, a downlink data transmission.

In one embodiment, a demodulation reference signal (DMRS) antenna port associated with a reception of a first codeword in the downlink data transmission is quasi co-located with reference signals configured in a first TCI state.

In one embodiment, a DMRS antenna port associated with a reception of a second codeword in the downlink data transmission is quasi co-located with reference signals configured in a second TCI state.

In step 2615, the TRP transmits the DCI that includes a beam indication configuration comprising the one bit-field that indicates the multiple TCI states. In step 2615, the multiple TCI states indicate a quasi-colocation (QCL) configuration for a downlink data channel transmitted to the UE.

In one embodiment, the TRP determines a QCL configuration for each of the multiple TCI states to transmit the downlink control channels.

In step 2620, the TRP transmits, to the UE, the downlink data transmission with the QCL configuration, wherein an association between the multiple TCI states indicated by the one bit-field and the downlink data transmission from the TRP is derived by the UE.

In one embodiment, each of the multiple TCI states is swept across symbols within the control resource set. In such embodiment, a number of consecutive symbols within the control resource set is configured by the higher layer signaling and the QCL configuration is configured for each of the symbols.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A method comprising:

receiving:

information for parameters of a first control resource set (CORESET), radio resource control (RRC) information indicating a plurality of transmission configuration indication (TCI) states for the first CORESET, wherein a TCI state provides quasi co-location (QCL) information for a demodulation reference signal (DM-RS) of a physical downlink control channel (PDCCH) in a CORESET, and a medium access control (MAC) control element (CE) indicating first and second TCI states from the plurality of TCI states;

determining, based on the first TCI state, first QCL information for a first DM-RS of a first PDCCH in the first CORESET;

receiving, based on the first QCL information, the first DM-RS of the first PDCCH in the first CORESET;

determining, based on the second TCI state, second QCL information for a second DM-RS of the first PDCCH in the first CORESET; and receiving, based on the second QCL information, the second DM-RS of the first PDCCH in the first CORESET.

2. The method of claim 1, further comprising:

receiving RRC information indicating a same TCI state for all CORESETs with same index in more than one bandwidth parts (BWPs) of a cell, wherein determining the first TCI state further comprises determining the first TCI state for all CORESETs with same index as the first CORESET in the more than one BWPs of the cell.

3. The method of claim 1, further comprising:

receiving information for parameters of a second CORESET, wherein the parameters of the second CORESET include a third TCI state;

determining, based on the third TCI state, second QCL information for a second DM-RS of a second PDCCH in the second CORESET; and receiving:

the second DM-RS of the second PDCCH in the second CORESET based on the second QCL information, the first PDCCH and the second PDCCH, a first physical downlink shared channel (PDSCH) that provides a first transport block (TB), wherein the first PDSCH is scheduled by a first downlink control information (DCI) format provided by the first PDCCH, and a second PDSCH that provides a second TB, wherein the second PDSCH is scheduled by a second DCI format provided by the second PDCCH and wherein the first and second PDSCH receptions are over same time resources and over same frequency resources.

4. The method of claim 1, further comprising:

receiving information for a set of reference signals (RSS);

determining a set of reference signal received power (RSRP) values, wherein the RSRP values in the set of RSRP values correspond to the RSs in the set of RSs, respectively; and transmitting information for the set of RSRP values, wherein the TCI states in the set of TCI states are associated with the RSs in the set of RSs, respectively.

5. The method of claim 4, wherein:
the first QCL information includes an index of an RS, and the RS is one of:
a synchronization signal and physical broadcast channel (SS/PBCH) block, or
a channel state information RS (CSI-RS).

6. A user equipment (UE) comprising:
a transceiver configured to receive:
information for parameters of a first control resource set (CORESET),
radio resource control (RRC) information indicating a plurality of transmission configuration indication (TCI) states for the first CORESET, wherein a TCI state provides quasi co-location (QCL) information for a demodulation reference signal (DM-RS) of a physical downlink control channel (PDCCH) in a CORESET, and
a medium access control (MAC) control element (CE) indicating first and second TCI states from the plurality of TCI states; and
a processor operably coupled to the transceiver, the processor configured to:
determine, based on the first TCI state, first QCL information for a first DM-RS of a first PDCCH in the first CORESET, and
determine, based on the second TCI state, second QCL information for a second DM-RS of the first PDCCH in the first CORESET,
wherein the transceiver is further configured to:
receive, based on the first QCL information, the first DM-RS of the first PDCCH in the first CORESET, and
receive, based on the second QCL information, the second DM-RS of the first PDCCH in the first CORESET.

7. The UE of claim 6, wherein:
the transceiver is further configured to receive RRC information indicating a same TCI state for all CORESETs with same index in more than one bandwidth parts (BWPs) of a cell; and
the processor is further configured to determine the first TCI state for all CORESETs with same index as the first CORESET in the more than one BWPs of the cell.

8. The UE of claim 6, wherein:
the transceiver is further configured to receive information for parameters of a second CORESET, wherein the parameters of the second CORESET include a third TCI state;
the processor is further configured to determine, based on the third TCI state, second QCL information for a second DM-RS of a second PDCCH in the second CORESET; and
the transceiver is further configured to receive:
the second DM-RS of the second PDCCH in the second CORESET based on the second QCL information,
the first PDCCH and the second PDCCH,
a first physical downlink shared channel (PDSCH) that provides a first transport block (TB), wherein the first PDSCH is scheduled by a first downlink control information (DCI) format provided by the first PDCCH, and
a second PDSCH that provides a second TB, wherein the second PDSCH is scheduled by a second DCI format provided by the second PDCCH and wherein the first and second PDSCH receptions are over same time resources and over same frequency resources.

9. The UE of claim 6, wherein:
the transceiver is further configured to receive information for a set of reference signals (RSs);
the processor is further configured to determine a set of reference signal received power (RSRP) values, wherein the RSRP values in the set of RSRP values correspond to the RSs in the set of RSs, respectively; and
the transceiver is further configured to transmit information for the set of RSRP values, wherein the TCI states in the set of TCI states are associated with the RSs in the set of RSs, respectively.

10. The UE of claim 9, wherein:
the first QCL information includes an index of an RS, and the RS is one of:
a synchronization signal and physical broadcast channel (SS/PBCH) block, or
a channel state information RS (CSI-RS).

11. A base station comprising:
a transceiver configured to transmit:
information for parameters of a first control resource set (CORESET),
radio resource control (RRC) information indicating a plurality of transmission configuration indication (TCI) states for the first CORESET, wherein a TCI state provides quasi co-location (QCL) information for a demodulation reference signal (DM-RS) of a physical downlink control channel (PDCCH) in a CORESET, and
a medium access control (MAC) control element (CE) indicating first and second TCI states from the plurality of TCI states; and
a processor, operably coupled to the transceiver, the processor configured to:
determine, based on the first TCI state, first QCL information for a first DM-RS of a first PDCCH in the first CORESET, and
determine, based on the second TCI state, second QCL information for a second DM-RS of the first PDCCH in the first CORESET,
wherein the transceiver is further configured to:
transmit, based on the first QCL information, the first DM-RS of the first PDCCH in the first CORESET, and
transmit, based on the second QCL information, the second DM-RS of the first PDCCH in the first CORESET.

12. The base station of claim 11, wherein:
the transceiver is further configured to transmit RRC information indicating a same TCI state for all CORESETs with same index in more than one bandwidth parts (BWPs) of a cell; and
the processor is further configured to determine the first TCI state for all CORESETs with same index as the first CORESET in the more than one BWPs of the cell.

13. The base station of claim 11, wherein:
the transceiver is further configured to transmit information for parameters of a second CORESET, wherein the parameters of the second CORESET include a third TCI state;
the processor is further configured to determine, based on the third TCI state, second QCL information for a second DM-RS of a second PDCCH in the second CORESET; and
the transceiver is further configured to transmit:
the second DM-RS of the second PDCCH in the second CORESET based on the second QCL information, the first PDCCH and the second PDCCH, a first physical downlink shared channel (PDSCH) that provides a first transport block (TB), wherein the first PDSCH is scheduled by a first downlink control information (DCI) format provided by the first PDCCH, and a second PDSCH that provides a second TB, wherein the second PDSCH is scheduled by a second DCI format provided by the second PDCCH and wherein the first and second PDSCH transmissions are over same time resources and over same frequency resources.

14. The base station of claim 11, wherein the transceiver is further configured to:

transmit information for a set of reference signals (RSS); and receive information for a set of reference signal received power (RSRP) values, wherein:

the RSRP values in the set of RSRP values correspond to the RSs in the set of RSs, respectively, and the TCI states in the set of TCI states are associated with the RSs in the set of RSs, respectively.

* * * * *